US010661274B2

(12) United States Patent
Viovy et al.

(10) Patent No.: US 10,661,274 B2
(45) Date of Patent: May 26, 2020

(54) COMPOSITE WOVEN FLUIDIC DEVICE

(71) Applicants: CENTRE NATIONAL DE LA RECHERCHE SCIENTIFIQUE, Paris (FR); INSTITUT CURIE, Paris (FR); UNIVERSITE PIERRE ET MARIE CURIE, Paris (FR)

(72) Inventors: Jean-Louis Viovy, Paris (FR); Bastien Venzac, Le Kremlin-Bicetre (FR); Laurent Malaquin, Ayguesvives (FR); Stephanie Descroix, Paris (FR)

(73) Assignees: CENTRE NATIONAL DE LA RECHERCHE SCIENTIFIQUE, Paris (FR); INSTITUT CURIE, Paris (FR); UNIVERSITE PIERRE ET MARIE CURIE, Paris (FR)

( * ) Notice: Subject to any disclaimer, the term of this patent is extended or adjusted under 35 U.S.C. 154(b) by 214 days.

(21) Appl. No.: 15/743,301

(22) PCT Filed: Jul. 22, 2016

(86) PCT No.: PCT/EP2016/067501
§ 371 (c)(1),
(2) Date: Jan. 10, 2018

(87) PCT Pub. No.: WO2017/017002
PCT Pub. Date: Feb. 2, 2017

(65) Prior Publication Data
US 2018/0200714 A1    Jul. 19, 2018

(30) Foreign Application Priority Data

Jul. 24, 2015    (EP) ..................................... 15306214

(51) Int. Cl.
*B01L 3/00*    (2006.01)
*B32B 7/00*    (2019.01)
(Continued)

(52) U.S. Cl.
CPC ... *B01L 3/502707* (2013.01); *B01L 3/502746* (2013.01); *B01L 3/561* (2013.01);
(Continued)

(58) Field of Classification Search
CPC ..... B01L 2300/0816; B01L 2300/0874; B01L 2300/123; B01L 2400/0406;
(Continued)

(56) References Cited

U.S. PATENT DOCUMENTS 5,803,963 A  *  9/1998  Dry ......................... A61L 27/48
                                                           106/677
6,558,665 B1    5/2003  Cohen et al.
(Continued)

FOREIGN PATENT DOCUMENTS

FR       2 942 041       8/2010
WO    WO 2006/027757    3/2006
(Continued)

OTHER PUBLICATIONS

European Search Report, EP15306214, dated Jan. 26, 2016.
(Continued)

*Primary Examiner* — Jennifer Wecker
(74) *Attorney, Agent, or Firm* — Young & Thompson

(57) ABSTRACT

Disclosed is a fluidic device including at least: a) a solid matrix; b) a textile component, embedded in the matrix and mechanically cohesive with the matrix; c) at least one channel embedded in the matrix and entangled with the textile component, the channel being at least partly open. A method for making a fluidic device includes providing a textile component including support fibers and at least a movable fiber entangled with the textile, embedding at least part of the textile and part of the movable fiber, in a matrix precursor material, applying a treatment in order to obtain a solid matrix.

19 Claims, 19 Drawing Sheets

(51) Int. Cl.

| | | |
|---|---|---|
| D03D 11/02 | (2006.01) | |
| F16K 99/00 | (2006.01) | |
| D03D 15/06 | (2006.01) | |
| D06M 15/15 | (2006.01) | |
| D06M 15/643 | (2006.01) | |
| F16L 11/08 | (2006.01) | |
| B29C 70/02 | (2006.01) | |
| B29C 70/22 | (2006.01) | |
| D03D 13/00 | (2006.01) | |
| B32B 5/02 | (2006.01) | |
| B32B 3/20 | (2006.01) | |
| B32B 5/26 | (2006.01) | |
| B32B 5/14 | (2006.01) | |
| B32B 3/08 | (2006.01) | |
| B32B 3/30 | (2006.01) | |
| D06M 101/06 | (2006.01) | |

(52) U.S. Cl.
CPC ............ *B29C 70/023* (2013.01); *B29C 70/22* (2013.01); *B32B 3/08* (2013.01); *B32B 3/20* (2013.01); *B32B 3/30* (2013.01); *B32B 5/022* (2013.01); *B32B 5/024* (2013.01); *B32B 5/026* (2013.01); *B32B 5/142* (2013.01); *B32B 5/26* (2013.01); *D03D 11/02* (2013.01); *D03D 13/002* (2013.01); *D03D 15/06* (2013.01); *D06M 15/15* (2013.01); *D06M 15/643* (2013.01); *F16L 11/085* (2013.01); *B01L 2300/0816* (2013.01); *B01L 2300/0874* (2013.01); *B01L 2300/123* (2013.01); *B01L 2400/0406* (2013.01); *B01L 2400/0487* (2013.01); *B01L 2400/0655* (2013.01); *B01L 2400/082* (2013.01); *B32B 2250/20* (2013.01); *B32B 2260/023* (2013.01); *B32B 2260/046* (2013.01); *B32B 2260/048* (2013.01); *B32B 2262/0238* (2013.01); *B32B 2262/0253* (2013.01); *B32B 2262/0261* (2013.01); *B32B 2262/0269* (2013.01); *B32B 2262/0276* (2013.01); *B32B 2262/04* (2013.01); *B32B 2262/062* (2013.01); *B32B 2262/065* (2013.01); *B32B 2262/08* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2266/122* (2016.11); *B32B 2307/202* (2013.01); *B32B 2307/302* (2013.01); *B32B 2307/412* (2013.01); *B32B 2307/414* (2013.01); *B32B 2307/7163* (2013.01); *B32B 2307/722* (2013.01); *B32B 2307/728* (2013.01); *B32B 2307/7265* (2013.01); *B32B 2307/73* (2013.01); *B32B 2535/00* (2013.01); *D06M 2101/06* (2013.01); *D10B 2201/02* (2013.01); *D10B 2505/02* (2013.01); *D10B 2509/00* (2013.01)

(58) Field of Classification Search
CPC ..... B01L 2400/0487; B01L 2400/0655; B01L 2400/082; B01L 3/502707; B01L 3/502746; B01L 3/561; B29C 70/023; B29C 70/22; B32B 2250/20; B32B 2260/023; B32B 2260/046; B32B 2260/048; B32B 2262/0238; B32B 2262/0253; B32B 2262/0261; B32B 2262/0269; B32B 2262/0276; B32B 2262/04; B32B 2262/062; B32B 2262/065; B32B 2262/08; B32B 2262/10; B32B 2262/101; B32B 2262/103; B32B 2262/105; B32B 2262/106; B32B 2266/122; B32B 2307/202; B32B 2307/302; B32B 2307/412; B32B 2307/414; B32B 2307/7163; B32B 2307/722; B32B 2307/7265; B32B 2307/728; B32B 2307/73; B32B 2535/00; B32B 3/08; B32B 3/20; B32B 3/30; B32B 5/022; B32B 5/024; B32B 5/026; B32B 5/142; B32B 5/26; D03D 11/02; D03D 13/002; D03D 15/06; D06M 15/15; D06M 15/643; D06M 2101/06; D10B 2201/02; D10B 2505/02; D10B 2509/00; F16L 11/085
See application file for complete search history.

(56) References Cited

U.S. PATENT DOCUMENTS

| | | |
|---|---|---|
| 2002/0183653 A1 | 12/2002 | Saint-Ramon et al. |
| 2005/0146076 A1* | 7/2005 | Alexander ............ D03D 1/0088 264/257 |
| 2008/0262472 A1* | 10/2008 | Lunn ................. A61M 25/0012 604/527 |
| 2010/0200400 A1* | 8/2010 | Revol-Cavalier .......................... A61B 5/14507 204/416 |
| 2011/0044864 A1* | 2/2011 | Kawazoe ............ B01J 19/0093 422/502 |
| 2011/0100472 A1 | 5/2011 | Juncker et al. |
| 2011/0189786 A1 | 8/2011 | Reches et al. |
| 2011/0270412 A1 | 11/2011 | Bellan et al. |
| 2012/0192952 A1 | 8/2012 | Shen et al. |
| 2013/0189888 A1* | 7/2013 | Patrick ................... B29C 73/22 442/71 |

FOREIGN PATENT DOCUMENTS

| | | |
|---|---|---|
| WO | WO 2012/004636 | 1/2012 |
| WO | WO 2012/150487 | 11/2012 |

OTHER PUBLICATIONS

Nilghaz et al., "Exploration of Microfludic Divices Based on Multu-Filament Threads and Textiles: A Review", Biomicrofluids, vol. 7, 051501 (2013).
Verma et al., "Embedded Template-Assisted Fabrication of Complex Microchannels in PDMS and Design of a Microfluidic Adhesive", Langmuir, 2006, vol. 22, 10291-10295.
Nilghaz et al., "Flexible Microfluidic Cloth-Based Analytical Divices Using a Low-Cost Wax Patterning Technique", Lab on a chip, vol. 12, No. 1., Jan. 2012, p. 209-218.
Dharmatilleke et al., "Three-Dimensional Silicone Device Fabrication and Interconnection Scheme for Microfluidic Applications Using Sacrificial Wax Layers", Mems proceedings ieee of the annual international workshop onmicro electro mechanical systems, vol. 2, Nov. 2000.
Song et al., "A Rapid and Simple Fabrication Method for 3-Dimensional Circular Microfluidic Channel Using Metal Wire Removal Process", 2010, vol. 9, 533-540.
Martinez et a., "Diagnostics for the Developing World: Microfuuidic Paper-Based Analytical Devices", Anal. Chem., vol. 82, No. 1, Jan. 1, 2010, 3-10.
Written Opinion, PCT/EP2016/067501, dated Sep. 28, 2016.
International Search Report, PCT/EP2016/067501, dated Sep. 28, 2016.

* cited by examiner

COMPOSITE WOVEN FLUIDIC DEVICE

FIELD OF THE INVENTION

The invention pertains to the field of mini-, micro, nano- and millifluidic systems and methods to prepare such systems. More specifically, the invention is directed to a fluidic system comprising a textile embedded in a solid matrix and at least one channel interwoven or entangled with said textile component. The invention also relates to a method for making a fluidic, and notably a minifluidic system, wherein said method is simple, economic and permits a precise, controlled design of the fluidic network.

BACKGROUND OF THE INVENTION

Microanalytical systems are gaining considerable importance, thanks to their possibility of performing analyses faster and with smaller amounts of material. Their range of application is increasing, together with the progress of diagnostic methods, which rely more and more on molecular biomarkers, but also with the need for on-site monitoring of food quality, environmental contamination, security, forensics, chemical, physical or biological processes. Another field of interest for the microanalytical systems is the development of portable or wearable devices for health monitoring, for persons in difficult environments, e.g. in military, scientific or humanitary operations, for sports, or for dependent persons.

Current microfluidic systems rely on networks of microchannels in which fluids circulate, and can be processed. Typically, said channels are prepared in solid substrates by different methods issued from the electronic industry, such as photolithography, electron-beam lithography, dry or wet etching. They can also be prepared by laser ablation, hot embossing, injection molding, micromachining, or by molding from a previously prepared negative master. Each of these different techniques have their advantages and disadvantages, but also important limitations. A strong limitation for many is the low production rate, and the cost, which make their use in cost-sensitive applications problematic. Injection molding allows for relatively fast and low-cost production, but it is limited to large series, and to a limited number of materials. Also, it requires metal microstructured masters, which are very expensive.

Various attempts have been made to develop solutions to these problems. For instance, WO2006027757 discloses a method for preparing, without expensive fabrication procedures, microfluidic connectors, by polymerizing an elastomer around capillaries in a planar configuration, and removing the capillaries after polymerization.

In Lab Chip, 2012, 12, 2638-3642, Lee et al. proposed a method for preparing complex microfluidic three dimensional networks by preparing connected wires of sucrose, embedding this network in a polymerizable matrix, and then removing the sucrose by dissolution in water. A similar approach, in which the sacrificial material is a metal wire removed by heating, was proposed in Microfluidics and Nanofluidics, 9(2-3), 533-540 (2010) by Song et al. These methods indeed require no sophisticated microfabrication instruments, but they are very labor intensive and require a lot of skills, for the preparation and positioning of the wires.

In the search for cheaper microfluidic devices, attempts have been made to develop microfluidic systems based on paper, popularized as «paper microfluidics». Some systems are reviewed for instance in Anal. Chem., 2010, 82 (1), pp 3-10, Martinez et al. These systems are indeed low cost, and they can be mass produced by printing techniques. They also do not require in general external pumps, since fluid motion is performed by wicking. However, the performances of these systems are limited by the poorly controlled definition of the «channel» walls, by a limited capacity, the importance of evaporation, and the large liquid-solid interface intrinsic to a wicking or capillary mobilization.

In order to improve upon this, various attempts have been made to replace paper by porous textile fibers or «yarn». Some of these attempts are reviewed by A. Nilghaz, et al., in Biomicrofluidics, 7, 051501 (2013): as an advantage, these fibers transport fluids unidimensionally, and this property has been put to work in several aspects. Fluids flow paths are wicking flow paths, consisting in hydrophilic cotton fiber zones delimited by hydrophobic wax patterns.

For instance, US2012192952 discloses a three-dimensional microfluidic system including at least one hydrophilic thread along which fluid can be transported through capillary wicking, and at least one hydrophobic substrate for supporting the hydrophilic thread.

US2011100472 also discloses similar systems, in which exchange of liquid between different yarns is controlled by knots of different topologies.

Along similar lines, US2011189786 to Reches et al. discloses a system for performing an assay on a sample comprising one or more hydrophilic testing threads defining a sample inlet zone at a proximal end, an intermediate zone distal to the inlet zone through which fluid sample is carried by capillary action, and a testing zone distal to the intermediate zone and comprising a detection reagent which reacts with a predetermined analyte to produce a detectable signal. This patent application also discloses a way of separating the threads from the outside world by pressing them between two sheets of plastic impermeable material.

Finally, WO2012150487 and WO 2012/004636 disclose a method of making a diagnostic device, said method comprising: providing at least one strand of a diagnostic-fiber composition; providing at least one strand of a hydrophobic fiber composition; inter-weaving the at least one strand of the diagnostic-fiber composition and the at least one strand of the hydrophobic fiber composition. These methods improve to some extent upon paper microfluidics, but they retain many problems. In particular the necessity of transporting the fluid by wicking along a thread or yarn typically yields strong dispersion. It increases considerably surface to volume ratio, and thus the risk of non specific absorption of contaminants or rare species. Finally, the transport of fluid cannot be easily controlled, and it is restricted to a very limited range of flow rates.

There is thus a strong need for methods for fabrication of microfluidic devices, or more generally minifluidic devices, that would retain the flexibility and low cost of paper or yarn-based microfluidics, but achieve the flexibility and performance of conventional microfluidics operating in open channels.

It was thus an aim of the invention to provide a method to make fluidic devices, and notably minifluidic devices, which is cheap, simple to implement, which provides a device or system comprising at least partly open channels. It was an aim of the invention to provide a method to make a fluidic device with a controlled design of the channel network, and with the possibility to create sophisticated channel designs. It was further an aim of the invention to provide a method to make a fluidic device based on materials of varied chemical nature.

SUMMARY OF THE INVENTION

In one of its aspects, the invention provides new fluidic components and devices, and methods to prepare such fluidic components and devices. In some aspects, the methods of the invention also provide ways to prepare fluidic components and fluidic devices, cheaper and more efficient than existing methods.

In some other aspects, the invention provides ways to integrate some functionalities in a fluidic device, which do not yet exist in fluidic devices, or may already exist in fluidics devices, but can be implemented more simply and at lower cost in this new family of components or devices.

In some of its aspects, the invention provides new fluidic devices with improved performances and/or functionalities.

In yet some other of its aspects, the invention also provides new methods for performing analyses, making products, or monitoring industrial processes, persons, animals, environmental elements.

The invention is directed to a fluidic device comprising at least:

a/ a solid matrix, b/ a textile, embedded in said matrix and mechanically cohesive with said matrix, c/ at least one channel embedded in said matrix and entangled with said textile component, said channel being at least partly open.

The invention is further directed to an instrument comprising a device as above disclosed, said instrument being any of, or any combination of, an analytical instrument, a medical instrument, a functional clothing, a wearable instrument, an implantable instrument, a monitoring instrument, a processing instrument.

The invention is directed to a fluidic device comprising at least:

a/ a solid matrix, b/ a textile component, embedded in said matrix, c/ at least one channel embedded in said matrix and said channel having a multiplicity of underpasses and overpasses with at least some fibers of said textile component, said channel being a tube or a pipe along at least part of its length.

The invention is also directed to a method for making a fluidic device, comprising the steps of:

a/ providing a textile component comprising support fibers and comprising at least a movable fiber entangled with at least one support fiber of said textile, b/ embedding at least part of said textile and part of said movable fiber in a matrix precursor material, c/ applying a treatment to the matrix precursor material of step b in order to obtain a solid matrix, or to increase a mechanical modulus or strength of said precursor material, wherein at least part of said movable fiber can move within said matrix, and at least part of said textile component is mechanically cohesive with said matrix.

The invention is also directed to a method for making a fluidic device, comprising the steps of:

a/ providing a textile component comprising support fibers and comprising at least a movable fiber said movable fiber having a multiplicity of underpasses and overpasses with at least one support fiber of said textile, b/ embedding at least part of said textile and part of said movable fiber in a matrix precursor material, c/ applying a treatment to the matrix precursor material of step b in order to obtain a solid matrix, or to increase a mechanical modulus or strength of said precursor material, wherein at least part of said movable fiber can move within said matrix, d/ moving said movable fiber at least along part of its length to create a channel embedded in said matrix, said channel being a tube or a pipe along at least part of its length.

The invention is also directed to a continuous textile sheet comprising a multiplicity of distinct zones embedded in a matrix and mechanically cohesive with said matrix, wherein each zone comprises at least one channel embedded in said matrix and entangled with said textile component, said channel being at least partly open.

The invention is also directed to a continuous textile sheet comprising a multiplicity of distinct zones embedded in a matrix, wherein each zone comprises at least one channel embedded in said matrix and said channel having a multiplicity of underpasses and overpasses with at least some fibers of said textile component, said channel being a tube or a pipe along at least part of its length.

The matrix and the textile component are distinct elements of the device.

According to a favorite embodiment, said channel is non linear.

According to a favorite embodiment, the device comprises at least an actionable fiber or a movable fiber.

According to a favorite embodiment, said movable fiber has at least one part protruding from a channel in which it is at least partly enclosed, outside of said matrix.

According to a favorite embodiment, said fiber is partly enclosed in a tubing protruding from said matrix.

According to a favorite embodiment, the device additionally comprises means for actuation of said fiber.

According to a favorite embodiment, said channel is in contact either with an actionable fiber or with a movable fiber, or wherein said channel is amenable to deformation.

According to a favorite embodiment, the fluidic resistance of said channel can be modified by the actuation of a movable fiber, of by a deformation of said matrix, or by a deformation of said textile.

According to a favorite embodiment, the device comprises at least one integrated valve, or at least one integrated pump.

According to a favorite embodiment, the device comprises an integrated window, in regard of at least a part of said channel.

According to a favorite embodiment, the matrix, or the textile, or both have a zone of preferred deformation.

According to a favorite embodiment, the matrix, or the textile, or both have a zone of lesser resistance to deformation.

According to a favorite embodiment, the device comprises at least a port connected to at least one extremity of said channel.

According to a favorite embodiment, the path of the channel is three-dimensional.

According to a favorite embodiment, the channel is part of a channels network.

According to a favorite embodiment, the device further comprises at least one fluidic element selected from: a fluid drop area, a chamber, a reservoir, a connector.

According to an embodiment, the channel is a straight channel.

According to an embodiment, the channel comprises at least a curved part.

According to a favorite embodiment, at least one extremity of said channel is open to one of the component's face.

According to a favorite embodiment, the device comprises at least two communicating channels.

According to a favorite embodiment, at least one of the matrix, the textile and the channel presents a part that is elastic.

According to a favorite embodiment of the method, the movable fiber or movable fibers are interwoven or entangled within the support fibers by the same process as used for preparing said textile.

According to an embodiment of the method, it further comprises sewing an actionable fiber to the matrix embedded textile.

According to a favorite embodiment of the method, it further comprises after step c/ a step of:

d/ at least partially removing the movable fiber from the matrix to form a channel.

According to an embodiment, the method comprises a step of making a continuous textile sheet comprising a multiplicity of distinct zones embedded in a matrix and mechanically cohesive with said matrix, and each zone comprises at least one channel embedded in said matrix and entangled with said textile component, said channel being at least partly open.

The invention is also directed to a method for analyzing any of a biological, a physical or a chemical agent, or for monitoring a process, an environment, a living species, a condition of a patient or for producing a product, or for discovering or testing a drug or an active product, or for cultivating cells, wherein said analysis, monitoring, production, discovery, or test, is performed using a device or an instrument of the invention.

According to a favorite embodiment, said method is an in vitro or an ex-vivo method.

According to a favorite embodiment, said partly open channel contains in addition at least a fiber able to undergo within said channel, at least along some part of said fiber, at least one action selected among a sliding, a deformation, and a rotation.

According to some preferred embodiments, said deformation may be any of a twisting, a stretching, a compression, a bending, or any combination thereof.

According to some preferred embodiments, the micro, mini or millifluidic component, or device comprises means suitable to induce onto said fiber at least one of a pulling, a pushing, a deformation, or a rotation, at least along some part of said fiber.

According to preferred embodiments, said solid matrix, or said textile component, or both, is sheetlike.

According to preferred embodiments, a device of the invention is a minifluidic device.

According to some preferred embodiments, said device is a microfluidic device.

According to some preferred embodiments, said device is a nanofluidic device.

According to some preferred embodiments, said device is a millifluidic device.

According to some preferred embodiments, said device is a minifluidic device.

According to some preferred embodiments, said device is a system, or a chip.

According to some preferred embodiments, said fluidic device is part of a system or of an instrument.

The invention is further directed to a kit for preparing, connecting or using a fluidic device or instrument, comprising, on the first hand, a fluidic device as above disclosed, and on a second hand, at least one component selected among:

a fluid,
a chemical product or a biological product, or
an additional physical component.

According to a favourite embodiment of the kit, said additional physical component is a disposable fluidic component.

According to a favorite embodiment of the kit, said additional physical component is capable of fluidic connectivity with the fluidic device.

According to a favorite embodiment of the kit, said disposable fluidic component is selected from: a tube, a fluidic connector, a fluid container, a duct, a fluid mobilization means, a syringe, a fluidic device, a pump, a valve, a sensor, a detector, a pressure source, an electric component, a magnetic component, an optical components, an information treatment components, a housing, a tag, an identification means, a barcode, a holder, a manipulation means, a mechanical manipulation means, a fiber manipulation means, a handle.

According to another favorite embodiment of the kit, the fluid is selected from: a solvent, a buffer, a nutritive medium, a medium appropriate for cell culture, a solution, an emulsion, an oil.

According to another favourite embodiment of the kit, the chemical product is selected from: an organic molecule, a mineral salt, a pharmaceutical active principle, a peptide, a protein, a fluorescent marker.

According to another favourite embodiment of the kit, the biological product is selected from: an AND fragment, an ARN fragment, a probe, an antigen, an antibody.

The method according to the invention is simple. It can be achieved with matrix materials of varied nature.

It provides fluidic components of varied designs, including three-dimensional designs.

The fluidic channels design can be controlled easily and complex channel patterns can be obtained.

The fluidic components according to the invention can also include flow-control means.

Fluidic components according to the invention find applications in all application fields of minifluidics, microfluidics, millifluidics, nanofluidics.

As will be seen later, the mobility of the movable fiber, will allow to perform within said channel some functions, for instance by displacing some specific parts of said fiber, within said channel. In particular, said mobility will allow said movable fiber, to undergo within said channel, at least along some part of said fiber, at least one action selected among a sliding, or a deformation, or a rotation.

The invention can yield its advantages in devices of different scales, notably minifluidic devices, microfluidic devices, nanofluidic devices, or millifluidic devices. It is particularly suitable for millifluidic devices or microfluidic devices, for which devices of the state of the art have to use expensive microfabrication means.

Also, in some preferred embodiments, said solid matrix, or said textile component, or both, is sheetlike. This has several interesting technical advantages: first, the textile industry produces mostly sheet-like textiles, and is thus best used in this format to create cheap devices. Second, this is an easy way to prepare flexible devices, easy to integrate in many integrated devices, notably but not necessarily portable devices, wearable devices, implantable devices, and the like.

DETAILED DESCRIPTION

The invention relates to the field of miniaturized fluidic devices, an emerging field in which some definitions may not have a fully universal acceptance, so to avoid ambiguities this description will rely on the following definitions and specifications.

In all the description, "comprising" followed by a list of characteristics means "comprising at least" these characteristics.

Definitions:

Fiber: By Fiber, or "wire", we mean any linear solid object, with one dimension much larger than the two others. Fibers in the invention may be made of a single, monolithic fiber, or of many smaller fibers or subfibers assembled together by any method, such as twisting, bundling, braiding, and the like. Objects called wires, ropes, yarns, strands, threads, filaments, in the art of fibers or textile, or materials, are also encompassed in the term «fiber», within the description of the invention.

Monofilament Fiber: In the description of the invention, we restrict the term «monofilament fiber» to monolithic elongated pieces of material.

Support fiber: a fiber of a solid material, which adheres strongly to, or can be wicked by the matrix of the invention. Typically, support fibers in the invention are mechanically cohesive with the matrix, and will thus deform following deformations of the matrix. In many preferred embodiments, said support fibers contribute to the mechanical properties of the fluidic component or chip as a whole, imparting it, for instance, additional performances in domains such as better tear resistance or a higher elongational modulus. Typically, support fibers in the invention can be a yarn, a thread, a fiber made, for example, of cotton, nylon, polyester, polyolefins (such as polypropylene), fluoropolymers (such as polyvinylidene fluoride), nitrocellulose, cellulose, cellulose acetate, and glass microfiber structures. This support fiber can be made of bundled subfibers, using various standard techniques known in the art, which may include, twisting, braiding, holding multiple strands together tightly, and the like, and combinations thereof.

In many preferred embodiments, too, support fibers are instrumental in defining the path of the channel(s) or guiding ducts embedded in the fluidic component or chip, by retaining and/or positioning movable or removable fibers as defined below, at precise locations or along precise paths during the preparation of the device, thus avoiding the need for expensive microfabrication tools. But they are not used to prepare in the matrix a reserve for the future position of the channel: the latter function is performed by movable or removable fibers Movable fiber: As opposed to a support fiber, we designate as a movable fiber, a fiber that does not adhere strongly to, cannot be wicked by, or is mobile with respect to, the matrix, as opposed to the threads or yarns used in the prior art in microfluidic devices, which adhere to the matrix when they are encompassed in such a matrix. Typically, movable fibers in the invention can be made of a monolithic material, for instance plastic, glass, ceramic, metal, or biopolymer. In some embodiments, movable fibers can also keep some porosity, or be made of multiple subfibers, but in this case they present interfacial properties that prevent adhesion or absorption of the matrix. We also encompass in the definition of «movable fiber», fibers that have the property of being movable as defined above, on part of their length within the fluidic device, and may not have this property on another part of their length in the fluidic device.

By "actionable fiber", we designate a fiber that has at least one part that can be manipulated by external means, said manipulation changing its position or shape within the device. For instance, said manipulation may be any of a pulling, a pushing, a twisting, a rotation, or a combination thereof. An actionable fiber is in general a movable fiber.

By "removable fiber", we designate a fiber that is fully removed from the matrix, after casting or hardening of the matrix. A removable fiber is also a movable fiber, but the opposite is not necessarily true Deformation: "amenable to deformation" or capable of "deformation" is said of a fiber, a textile, a matrix or a channel that changes shape when submitted to a mechanical stress, said change being for and in a non limitative manner, a bending, an elongation, a twisting, a bending, or a compression. This capacity of deformation distinguishes a fiber, a textile, a matrix or a channel as compared to another element that will break or be irreversibly damaged when submitted to the same mechanical stress.

Flexibility: A fiber, or a sheetlike device, is called "flexible", if it can be bent without permanent deformation or breaking, with a radius of gyration smaller than the fiber's or device's largest dimension.

A fiber or sheetlike device is called "highly flexible", if it can be bent without breaking or undergoing irreversible deformation, at essentially any angle and with essentially any radius of gyration compatible with steric hindrance. To fix ideas, a fiber or a device is considered "flexible", if it can be bent without breaking or undergoing irreversible deformation, with a radius of gyration smaller than five times its thickness along the axis defining the radius of gyration of the bending.

A fiber, or a sheetlike device, is called "semi-flexible" if it can be bent without permanent deformation or breaking, at arbitrary angles, and with a radius of gyration significantly larger than its smaller lateral dimension, e.g. at least 5 times said smaller lateral dimension, but still smaller than the fiber or device largest dimension. For a fiber, said largest dimension is for instance the fiber's length, or, in some embodiments, the length of the fiber embedded in the matrix. Except if specified otherwise, highly flexible and semi-flexible fibers, or devices, are encompassed within the term "flexible" fibers or devices.

Conversely, a fiber, or a sheetlike device, is called "rigid", if it cannot be bent without permanent deformation or breaking, with a radius of gyration smaller than the fiber's or device's largest dimension.

Textile: by «textile», we designate in the description an object made of a multiplicity of threads or fibers, or made of a single fiber or thread with a multiplicity of bends or folds, so that said object involves multiple combinations of overcrosses and undercrosses. Preferably, said combination of overcrosses and undercrosses contribute to give said object its shape and mechanical properties.

Objects designated as «fabric», «cloth», «felt» in the industry are also encompassed in the definition of «textile» within the invention, provided they comprise a multiplicity of over and undercrosses between fibers, or a multiplicity of over and undercrosses of the same fiber. As a matter of example, the woven or non-woven fabrics or textiles used in clothing, but also woven and non-woven technical textiles or geotextiles, are encompassed in the definition of textile, and usable as such within the invention.

Interwoven or Entangled: we define a fiber or a channel, as «interwoven» or «entangled» with a textile or a fabric or another fiber or an ensemble of fibers, when it has a multiplicity of underpasses and overpasses with said fiber or at least some fibers of said textile or fabric, or ensemble of fibers. This is used in a general sense, and is thus not necessarily restricted to devices prepared by a textile weaving method, although said textile weaving methods can advantageously used in some embodiments.

Matrix: a solid material in which the textile and any of the guiding ducts or the channels of the invention are embedded at least in part. Matrices of the invention can be made of a large variety of materials.

By «solid» we designate a matrix constituted by a material that is able to keep a memory of its shape over long time periods, as opposed to a gas or a liquid. Besides this, solid matrices in the invention can have all kinds of viscoelastic properties, notably they can be rigid, elastic, viscoelastic, thermoplastic. By long time periods, we mean in general one to several minutes, hours or even years.

By "embedded", designating a channel in a matrix, we mean that said channel is surrounded by said matrix on all its perimeter on at least part of its length, notwithstanding the fact that there may be some local places at which said channel is not surrounded by the matrix, due to a local unwanted defect, or in contrast, to produce some specific functionality, such as an access port to the channel, or a window for observation, or a way to specifically manipulate one or a multiplicity of fibers.

By "embedded", or "embedding", regarding a textile in a matrix, we mean that in at least part of the device, the matrix penetrates intimately said textile, being present at least in part between the fibers constituting said textile. For clarity, this opposes the invention to some devices of the prior art, e.g. US2011189786 to Reches, in which threads or yarns could be sandwiched between two layers of polymer, without penetration of this polymer material in the heart of the threads or yarns.

Hardenable material: As used herein, a material is said "hardenable", if it can undergo a transition from a fluid, e.g. liquid or pasty, state, to a solid state, a gel state, a viscoelastic state, and generally speaking a state in which it is able to keep its shape, as opposed to the behavior of a liquid. This also designates a material already having some limited solid-like properties, such as a physical gel, or a thixotropic material, and can undergo under some treatment a strengthening of some of its solid-like characteristics. Men in the art have different ways of characterizing solid-like characteristics, for instance, but not limitatively, by measure of elastic modulus, yield stress, indentation resistance, and the like. This hardening can be achieved by using as material a polymerizable material, or a crosslinkable material, or a material that can increase its viscosity or elastic modulus by loss of a solvent, or by a change of temperature, or by irradiation. More preferable, this polymerization or crosslinking can be triggered e.g. by photoactivation, e.g. if said polymerizable material contains a photoactivator, or by thermal activation, e.g. by bringing at least a part of the device to a high temperature. As a second embodiment, this can be achieved by using a material that can change its viscosity or elastic modulus by application of a change of temperature. As an example, the material could be a melted material that can recover a glassy, crystalline or semicrystalline state by a decrease in temperature. The material could also be a material that can transit to a gel state by a decrease in temperature, such as e.g. a water suspension of agarose. Oppositely the material can comprise a material able to gelify by an increase in temperature, such as poly-N-Isopropyl Acrylamide (PNIPAM). Various additional types of hardenable material, usable for the invention, are recited e.g. in U.S. Pat. No. 6,558,665 to Cohen, or in the "Polymer Handbook", J. Brandrup et al. ed. Wiley, incorporated herein by reference. Hardening of said material can also be obtained by a combination of the above effects, first hardening the material by a fast thermal effect, and then making the hardening irreversible by a chemical effect, such as crosslinking or polymerizing.

Matrix precursor material: We designate here as precursor matrix material, a material that can embed a fiber, a multiplicity of fibers, or a textile, or any combination thereof, in a first state, and then be subjected to a treatment to reinforce its mechanical properties. Typically, the matrix precursor material is a hardenable material. The precursor matrix material can be selected, depending on the desired application, to be, after the hardening step, permeable or impermeable to specific species. The precursor matrix material can also be hardened by diffusion in said material of a reagent.

The precursor matrix material can be a coating paste, capable of hardening under specified conditions, which is in a fluid state, or in a gel state, allowing for its casting, spreading, spraying, lamination, and more generally any methods usable to coat or enduct a textile or another material.

Mechanically cohesive: When it is stated that a component, for example a textile component is mechanically cohesive with another component of the microfluidic device, notably the matrix, it means that any mechanical action applied to one or the other of said elements is simultaneously and necessarily sustained by the other element. A mechanical action may for example be a deformation, a pulling, a pushing, a folding. The textile component is mechanically cohesive with the matrix on account of the matrix material being hardened around the textile fibers, further to impregnation of the textile fibers by the matrix precursor material.

By "sheetlike", designating an object such as a minifluidic device, or a matrix, or a component, or a chip, we mean that said object can be typically defined by two extended surfaces substantially parallel to each other, and separated by a given thickness. Usually, said thickness is small as compared to the surface's length and width. This must be considered, though, in a broad sense: for instance, the thickness may not be the same everywhere, and the surfaces may have all kind of shapes: in preferred embodiments, said surfaces are developable. Indeed, it is one of the objects of the invention, to provide minifluidic devices, that present all or some of the advantages of textiles and fabric, regarding their mechanical and manipulation properties, and thus to provide said properties to the matrix constituting the device.

By "channel", we mean any elongated space, tube, duct, pipe, conduit, along which a fluid substance can be transported. More specifically, we designate channels as microchannels if they are micrometric, i.e. if at least one dimension of their section is comprised between 1 µm and 1 mm. We designate channels as millichannels if they are millimetric, i.e. if at least one dimension of their section is comprised between 1 mm and 1 cm. We designate channels as nanochannels if they are nanometric, i.e. if at least one dimension of their section is comprised between 1 nm and 1 µm. Channels according to the invention are delimited, at least along part of their length, by walls that define an interior space. Further, channels in the devices according to the invention, are open along at least part of their length.

Minichannels: In many preferred embodiments, the invention is particularly interesting for microchannels. However, for the sake of terseness and completeness, in the following we shall design as minichannels channels that comprises along their length at least a portion that is either millimetric, micrometric, or nanometric.

Channels within the invention are designated as "substantially enclosed" within a fluidic component or chip, or within a device, or within a matrix i.e. they represent a fluidic path substantially contained and circumscribed by walls constituted by said fluidic component, chip, device or matrix, however a substantially enclosed channel can include inlets, outlets, exposed contact regions, and the like.

"Interconnected channels," as used herein, refers to two or more channels within the structure that are able to communicate fluid between and through each other.

A channel, or a multiplicity of non-connected or interconnected channels, defines in the device according to the invention one or several "flow paths", i.e. paths that a fluid can follow under the action of external forces.

A "non-linear" path or channel, as used herein, refers to such flow path or channel having a longitudinal axis that deviates from a straight line along its length by more than an amount equal to the minimum cross-sectional dimension of the channel or flow path.

The definition of non-linear paths encompasses paths with sharp angles, but also paths having along at least some of their length a continuous variation of the direction of their tangent, the latter paths being called here "curved". Typically, the curvature of a curved path in the invention, has a radius of curvature larger than one time, preferably two times of five times, the local lateral dimension of the channel along the direction of the radius of curvature.

A "longitudinal axis" of a channel or flow path as used herein refers to an axis disposed along the entire length of such a channel or flow path, which is coextensive with and defined by the geometric centerline of the direction of any bulk fluid which would flow through the channel or flow path should such channel or flow path be configured for a fluid to flow therethrough or which is coextensive with and defined by the geometric centerline of the direction in which a fiber contained in said channel could slide along said channel.

A "longitudinal axis" of a fiber as used herein refers to an axis essentially following the 2D barycenters of consecutive cross-sections of said fiber.

As opposed to the longitudinal axis, a "lateral" direction or axis is any direction transverse to the longitudinal axis. In particular, a direction of axis perpendicular to the longitudinal axis of a channel, or fiber, is said "lateral".

Open flow path or channel: by "open" we designate a flow path or channel, in which a fluid can be transported as a whole, without being separated in many ramifications. An open flow path or channel can be defined as a space of a longitudinal shape, surrounded by walls, said space being free of any material except possibly fluids. This corresponds for instance to tubes or pipes, in contrast with e.g. channels filled with a porous material, or a wicking material. The open flow path or channel can present, at its extremities, or along its length, openings that connect the inside of the path or channel to another fluidic element or to the outside of the fluidic device. The open flow path or channel is deprived of any wicking material.

By contrast, we designate by "wicking flow path", a path that contains a wicking material for a fluid, and said path can be followed by a fluid thanks to capillary action.

By "porous flow path", we designate more generally a path for fluids constituted by a porous material contained in a channel. A porous material can be wicking for a given fluid, if it has good wetting properties with regards to such fluid, or non-wicking, if pressure is needed to push said fluid in said material. Wicking flow paths are encompassed in porous flow paths, of which they are a subcategory. It must be noted that the property of being "wicking" is relevant to a specific fluid, whereas the property of being "open" or "porous" is intrinsic to the path and to the material in said channel, and does not depend on the fluid.

A channel filled with a wicking or porous material can present at its extremities, or along its length, openings that connect the inside of the channel to another fluidic element or to the outside of the fluidic device, without constituting by this sole feature an "open channel" or an "open flow path" in the sense of the invention, which is characteristic of tubes or pipes not obstructed by such porous or wicking material.

Typically, the flow in an open flow path or channel obeys Poiseuille's law, whereas the flow in a porous flow path obeys Darcy's law.

By "partly open", we designate a channel or a flow path, which is of the open type on part of its length. It may be filled on other parts of its length either by porous material, or by a wicking material, or by a solid, impermeable material. In the latter case, the solid impermeable material is at least partly mobile with respect to the channel.

Thus, in preferred embodiments of the invention, at least one channel is partly open, i.e. it constitutes along part of its length an open flow path and not a pourous flow path. Following the above definition, this means that along at least part of its length, said channel does not contain a porous material or a wicking material By "Minifluidic chip", or more tersely "chip", or "minifluidic component", we designate an object comprising at least one channel, or at least one combination of channels, said channel or combination of channels being embedded at least in part in a matrix, said channel being a minichannel. However, for the sake of simplicity, in the following we shall encompass in the designation "minifluidic" chips or devices that are either microfluidic chips or devices, i.e. comprise at least one microchannel, millifluidic chips or devices, e.g. that comprise at least one millichannel, or nanofluidic chips or devices, i.e. that comprise at least one nanochannel, or chips comprising any combination of millichannels, nanochannels or microchannels.

By "chamber", we designate a channel, or a part of a channel, integrated into a fluidic chip, with one dimension, call the "thickness", significantly smaller than the two other dimensions. Such chambers can be millichambers, microchambers, or nanochambers, if at least one of the other dimensions is millimetric, micrometric, or nanometric, respectively. Millichambers, microchambers, and nanochambers are encompassed under the common name of "minichambers".

By "drop zone", we designate a part of the device which is at least in part at the surface of the device, or open to the exterior of the device, and where a fluid can be deposited. Generally, a drop zone is connected to at least a channel or a chamber, possibly through a valve or a connector. It can be a slightly curved surface, or a surface treated with a coating that has an affinity with the drops, like a hydrophilic surface in case of an aqueous fluid. It can be an open chamber.

By "reservoir", we designate a volume that can contain fluids. In the invention, reservoirs can be integral to the component or chip, or be separated from said chip. In all cases, however, reservoirs as designated here, involve at least one fluidic connection means allowing to put them in fluidic connection with at least one channel of the invention, continuously or at some specific times during the operation of the device.

Typically, drop zones, chambers or reservoirs in the invention, in consistency with the current use of the term "reservoir", are intended to be able to contain a larger volume of fluid by unit length, than the channel with which they are in fluidic connection. This is achieved by having, for instance at least one lateral dimension larger than the smallest lateral dimension of said channel. In some preferred embodiments, said one lateral dimension of the chamber, drop zone or reservoir, is smaller than all lateral dimensions of said channel.

Instrument: by «instrument», we designate an integrated device that is able to perform at least one function without the addition of additional components other than components available in the operational environment, such as for instance an energy source, or consumables. In our description, instruments are thus a subcategory of integrated device.

Device: by "device", we designate any of a chip, a component, an instrument, or a system.

By "system", we designate a combination of instruments associated to exert one or several tasks.

By "Minifluidic device" (resp. Microfluidic, millifluidic, nanofluidic), we designate a device comprising at least one minichannel (resp. Microchannel, Millichannel, Nanochannel), but optionally comprising other components, wherein said other components are not necessarily fluidic or minifluidic in their nature or function. Minifluidic devices of the invention may involve different levels of integration. For instance, they can be restricted to a single minifluidic chip or component, integrating one or several functionalities. Minifluidic devices of the invention may also comprise all other kinds of elements and components, some of which explicitly described here, such as pumps, valves, sensors, actuators, detectors, and many others known in the art, which are encompassed within the field of the invention. In particular, minifluidic devices of the invention may also be full instruments, and integrate for instance any of holders, housings, power sources, control software and hardware, communication means, storage means, manipulation means, human-machine interfaces. In the description, when the word "component" is used without any specifying adjective such as "textile component", or additional component", it is intended to designate a minifluidic component of the invention.

Integrated fluidic device and integrated minifluidic device: We designate by the term «integrated device», and respectively "integrated minifluidic device" a device comprising a fluidic chip, respectively a minifluidic chip, of the invention, and at least one additional component.

By "electric power generator", we designate any device or component able to deliver to at least one electrode, or to at least one electrically conducting element, electric energy. Said delivery may be in any form, such as current, potential, or a combination thereof. Also said power, current, potential, may have any temporal characteristics, i.e. it can be AC, DC, or have more complex time-dependent structure.

We define a conducting element as "in electric connectivity" with a first fluid or a volume, if it can, thanks to the overall configuration of the device, transmit electric energy to said fluid or volume. For example, this can be achieved by putting said conducting element in direct contact with said fluid or volume. In other embodiments, this can be achieved by placing said conducting element in the vicinity of said fluid or volume, and separated from them by a dielectric layer with a permittivity and thickness suitable for allowing said transmission of energy. This suitability will depend on various factors, such as the frequency of the electric field applied to the conducting element, relative conductivity of the fluid and the dielectric layer at such frequency, the amplitude of the potential difference, and the global geometry of the system. Engineers know various means to determine in each case the parameters, for instance the thickness of dielectric layer, suitable for achieving such transmission of electric energy, by application of the laws of electrokinetics and electrostatics. In some preferred embodiments, said dielectric layer may have a thickness comprised between 10 nm and 100 nm, or between 100 nm and 1 µm, or between 1 µm and 10µ, or larger than 10 µm. In other embodiments, this can be achieved by creating a contact between said conducting element and a conducting second fluid, for instance an electrolyte, said second fluid being in continuous fluidic connection with said first fluid or volume.

Additional component: By "additional component," we designate components that are not integral part of the fluidic device of the invention, but may be necessary or advantageous for operating the invention, or for exerting some advantages of the invention. Said components may comprise for instance mechanical manipulators or holders, fluid containers, ducts or mobilization means, electric components or optical components or information treatment components, user interfaces, housings, and the like. As a common characteristic, additional components of the invention are in connection or in relation with the invention's fluidic chip or fluidic device or fluidic channel or actionable fiber by some means, for instance mechanical, electrical, electromagnetic, optical, fluidic, and are involved in at least one potential way of operation of the invention's device.

At least: "at least one xxx", or "at least some xxx", are used indifferently to designate one or several xxx.

The Textile Component:

Preferably, textiles in the invention comprise interwoven or entangled support fibers.

Textiles in the invention can be prepared by any means know in the art to prepare textiles from fibers, and/or to embed them in a matrix.

In some preferred embodiments, textiles in the invention are prepared by any of means known in the art to prepare textiles, such as, non limitatively: weaving, felting, knitting, sewing, knotting, braiding, plaiting, stitching, interlock, 3D weaving, filament winding, or multiaxes filament winding.

In some preferred embodiments, textiles in the invention can be composite, and be prepared by any combination of means known in the art to prepare textiles, such as, non limitatively, weaving, felting, knitting, sewing, knotting, braiding, plaiting, stitching, interlock, 3D weaving, filament winding, or multiaxes filament winding.

Essentially, all types of textiles (also named «fabric», or cloth in the common language) can be used within the invention.

In some preferred embodiments, textiles in the invention are woven textiles.

In some preferred embodiments, textiles in the invention are knitted textiles.

In some preferred embodiments, textiles in the invention are felts.

Preferably, but not necessarily, textiles used in the preparation of the invention are flexible.

Also, textiles used within the invention may involve any kind of shapes and structures, they can be single layer, multilayer. They can involve any conventional but also any non-conventional or technical textiles. Also, textiles used in the invention may involve all kinds of structural specificities that will be useful to impart to the devices of the invention specific advantages or functionalities.

In some preferred embodiments, a textile component used in the invention may involve fibers of different diameters, and/or of different elasticities.

In some preferred embodiments, textiles of the invention may involve at least some areas with no fibers, or a lower density of fibers.

In some preferred embodiments, said area with no fibers or a lower density of fibers is traversed by at least one channel.

In some preferred embodiments, which can be combined with the above, textiles involved in the invention are based at least in some parts of said devices, textiles with a semi-transparent or open appearance, such as tulle, illusion, voile, lace, net, English net, French net, birdcage, chiffon, organza, However, other types of textiles may also be used, such as, non limitatively, Bengaline, Faille, Brocade, Chiffon/Georgette, Cloque, Crepe, Embellishments, English Net, Eyelet, Linen, Matalasse, Organdy, Peau de Soie, Point d'Esprit, Pongee, Satin, Shantung, Sheer Stretch, Taffetas, Velvet.

In some preferred embodiments, textiles used in the invention are advantageously obtained by textile preparation technologies used for the preparation of lace, or textile with a semi-transparent texture, or textiles with fiber-free-areas. This corresponds, for instance, and non limitatively, to techniques such as Leavers, Heathcoat, Bobin, William Cotton, crochet, knitting. embroidering.

In some preferred embodiments, textiles of the invention may involve at least some areas with no fibers, or a lower density of threads traversed by at least one channel.

In some preferred embodiments, textiles of the invention may involve at least some areas with a higher density of fibers. A large number of ways to impart to textiles such structural specificites are known in the textile industry, and can be used within the invention, as will be made more clear in the detailed description.

In various preferred embodiments, fibers of which are made the textile components, called support fibers, can have different types of sections, circular, square, parallelepipedal (cuboid), ribbon-like, or have more complex shapes.

However, said support fibers may not necessarily have the same section or size all over their length.

In some preferred embodiments, said support fibers have a non uniform section, or are corrugated along at least part of their length, or comprise a corrugated surface.

Said support fibers may also be monofilament, or multifilament.

The textile fulfils the following function: the fibers of which the textile is made, named support fibers, provide a support to the construction of the channel.

In a first step of the method for making a fluidic component or chip according to the invention, the textile provides a support to the weaving of the mobile fiber.

Textiles used in the invention may involve all kinds of structural specificities that will be useful to impart to the devices of the invention specific advantages or functionalities.

Indeed, an advantage of the invention, is to provide fluidic devices with an almost infinite variety of shapes and properties, without expensive fabrication, using the power of the textile industry. Using a textile as a structural support, devices of the invention share with both textiles and reinforced composite materials a combination of the properties of the support textile and of the matrix.

As a non-limiting series of examples, http://en.wikipedia.org/wiki/List of fabric names, or «http://en.wikipedia.org/wiki/Category: Technical_fabrics» provide some examples of known types of textiles that can be used in the invention. However, in many embodiments, the invention may involve other, more specific designs, while retaining its advantages, and notably the possibility to use the structural properties of textile type materials, and the industrial production methods of the textile industry.

Textiles used in the invention may also be prepared by any of the textile fabrication methods and instruments known in the art, or modifications of said methods or instruments. For instance, said instruments may include, but not be limited to: jacquard looms, dobby looms, bracelet looms, power looms, and the like. Example of looms and weaving methods usable in the invention are described e.g. in «http://en.wikipedia.org/wiki/Loom»

Jacquard type textiles and looms are particularly interesting, since they can help to easily confer specific properties in different areas of the device, and also to generate specific complex paths to specific threads, or to specific channels by removal of specific movable threads, within the textile.

In other embodiments, textiles used in devices of the invention may be prepared by knitting. Non limited examples can be found in http://en.wikipedia.org/wiki/Knitting machine, or in http://en.wikipedia.org/wiki/List of knitting stitches, In some preferred embodiments, textiles used in the device according to the invention are made with technologies currently used for knitting, or for making lace, or socks, or stockings, such as, and non limitatively: weft knit, warp knit, using machines based e.g. on the principles of Leavers, Heathcoat, Bobin, William Cotton, Raschel, crochet. Some examples of the basic thread patterns that can be obtained with such machines are given in FIGS. 19 (principle), and 20.

FIG. 18, in particular, shows that fibers with different types of paths can be prepared within the textile. Then by removing one of these fibers after embedding the textile within a matrix, one can obtain linear paths, as in FIG. 18 A (simple woven), or more contorted paths, as in FIGS. 18 B (weft knit) and C (warp knit).

The design of FIG. 18 D (entangled hexagonal tulle) shows that one can obtain entangled fibers with paths close to linear, that are not necessarily perpendicular, which can be useful in some embodiments.

Also, this design shows that by removing at least two fibers with different orientations, one can create intersecting channels that are not perpendicular and have a fluidic communication.

It should be noted that the schemes in FIG. 18 are here only to represent the mutual topology of fibers, and in particular to exemplify the presence of a multiplicity of overpasses and underpasses between different fibers, but that within the invention, one or several fibers, especially but not limitatively, the fibers that are planned to be removed after embedding the textile in the matrix in order to create a channel, can be given any kind of paths without changing its topology with regards to other fibers, as long as the characteristic of having overpasses and underpasses with said fibers is conserved. For instance, in FIG. 18 B, C, or D, one particular fiber can be straightened to confer it a more linear, or even a fully linear path, before embedding the textile in the matrix. This can be achieved during the textile preparation itself, by suitably tuning the machine, e.g. by playing with fibers tension, as known by those skilled in the art, or after textile preparation, by pulling on some specific fibers, as also known by those skilled in the art, and indeed used in some traditional embroidering methods.

FIG. 19 shows different non limiting examples of types of textiles that can be used within the invention, prepared by different techniques and having different type of denominations in the art.

Notably, in some preferred embodiments, textiles used in the invention may have on at least part of their surface an "open" texture, i.e. fibers only cover a part of the area of the textile. This is reflected in the fact that, in said part of their surface, said textiles have a percent coverage by fibers, that is lower than 100%. This percent coverage is measured in a plane parallel to the main plane of the textile. This is advantageous notably for reducing fibers consumption, and to allow easy observation of the channels created within the matrix and having overpasses and underpasses with the textile. For instance, in some preferred embodiments, as exemplified in FIG. 19 A (tulle), B (French net), E (low coverage warp knit), fibers in the textile cover between 0% and 20%, or between 0% and 30%, of the area of the textile. In other embodiments, such as presented in FIG. 19 C (low coverage weft knit) fibers in the textile cover between 0% and 50% of the area of the textile. In some other embodiments, though, the coverage must be higher. In FIG. 19 D (medium to high coverage weft knit) or F (medium to high coverage warp knit), fibers in the textile cover between 0% and 80% of the area of the textile. Finally, in some embodiments, fibers can cover up to 100% of the area of the textile. Textiles with high coverages, on all or part of their surface or volume, may be interesting, for instance to provide more mechanical strength to the final device, in all or part of their surface or volume Also, in some preferred embodiments, the above coverage properties of textiles used as components of the invention may differ in different areas of the textile, to provide the final device different properties at suitable places. For instance, a low coverage may be used at some places where observation is needed, or "window", and high coverage may be used at places where the device must have stronger mechanical properties, e.g. and not limitatively, for handling, or for creating connection with the outer world.

Thus, it is also an object of the invention, to propose devices in which the textile has different percentages of fiber coverage at different places of its area. Examples of such textiles are presented in FIG. 20.

Also, textiles used in the invention may have all kind of structures allowed by the art, from very regular ones and simple ones, as displayed in FIG. 19, to textiles with different levels of complexity, as shown e.g. in FIG. 20, or even more complex. This is indeed a major advantage of the invention, to use the power of textile industry to prepare devices with complex channel structures.

FIGS. 20 A, B, C, D and E illustrate in a non limitative manner some complex textile structures known to the skilled professional. FIG. 20 A: Tarlatane, FIG. 20 B: complex warp knit, FIG. 20 C: Irregular net, FIG. 20 D: Point d'Esprit, FIG. 20 E: Complex raschel with variable coverage.

All the above features, regarding for instance percent coverage by fibers, or regularity of pattern, or inducing different mechanical properties, and notably higher or lesser resistance to deformation, at different places of the device, or changing the flow resistance along a channel, or more generally achieving different properties at different places of a device comprising at least a textile and at least a channel, can be achieved, by using as a support a textile that has, at different places of the device, or in different areas of the device, different patterns of weaving, or different patterns of knitting.

Thus, it is also an object of the invention, to propose a fluidic device comprising at least:
  a/ a solid matrix,
  b/ a textile component embedded in said matrix,
  c/ at least one channel having a multiplicity of underpasses and overpasses with at least some fibers of said textile component,
  said channel being a tube or a pipe along at least part of its length wherein said textile presents different weaving patterns or different knitting patterns at different places of said device.

In other embodiments, textiles used in devices of the invention may be prepared by felting, for instance and non limitatively: wet felting, needle felting, carroting, nuno felting, and others.

Essentially all kinds of fibers can be used to prepare textile components entering the fabrication of the invention, some of which can be found for instance in http://www.apparelsearch.com/fibers.htm, or in http://en.wikipedia.org/wiki/List_of textile_fibres. This comprises, as a matter of example, fibers commonly used in the textile industry such as polyester, viscose, acetate, rayon, cotton, silk, linen, wool, jute, sisal, hemp, polyamide, polyaramide, all kinds of modified cellulose, polyolefins, such as polyethylene, polypropylene. However, due to the specificities of the invention, it may also use, alone or in combination with the common types of fibers used in the textile or fiber industry, other types of fibers, and notably metal, monofilament, or more advanced materials, fibers used in the technical industry, such as glass fiber, Kevlar, carbon fiber, metal wires, ceramic fibers, fluoropolymers such as plyvinylidene fluoride, fibers drawn from liquid crystals, silicon wires and the like.

In some preferred embodiments, a textile component used in the invention may involve fibers of different diameters, and/or of different elasticities. This can be useful, for instance to define, in the final device, zones with specific shapes, such as bends, protrusions, recesses, grooves, ridges, holes, windows. In other embodiments, this can be useful to prepare, in the final device, zones with different mechanical properties, for instance zones of preferred bending, or alternatively zones with a higher rigidity or thickness for instance for holding said device.

In some preferred embodiments, textiles of the invention may involve at least some areas with no fibers, or a lower density of fibers: this can be useful, for instance, for preparing in the device a window for observation or detection, or a zone of bending, or a recess.

In some preferred embodiments, said area with no fibers or a lower density of fibers is traversed by at least one channel. This can be particularly interesting, e.g. for observation in this channel, or for access to this channel by a needle, or for localized action on this channel.

In some preferred embodiments, textiles of the invention may involve at least some areas with a higher density of fibers. This can be useful for instance to impart to the device a more rigid or thicker zone, for mechanical properties, or holding, or for loading material, or any kind of required structural property.

In various preferred embodiments, fibers of which the textile component is made, called support fibers, can have different types of sections: circular, square, parallelepipedal (cuboid), ribbon-like, or have more complex shapes.

However, said support fibers may not necessarily have the same section or size all over their length.

In some preferred embodiments, said support fibers have a non uniform section, or are corrugated in some part along their length, or present a corrugated surface. This can be useful, for instance in order to strengthen their adhesion to the matrix.

In some other preferred embodiments, however, this is not necessary, and the interweaving of the support fibers is sufficient to ensure this adhesion.

Said support fibers may also be monofilament, or multifilament. In some preferred embodiment, said fibers are multifilament, in order to facilitate their intimate embedding in the matrix, and the cohesion with the matrix.

In some other preferred embodiments, said support fibers may be monofilament. Good embedding of the textile into the matrix can be obtained in some embodiments by having wetting properties between the support fibers and the matrix, that allow the support fibers to be wicked or wetted by the matrix precursor material. In other embodiments, this can be obtained by having some adhesion between the support fibers and the matrix. Many ways to tune the adhesion between a support fiber and a matrix are known from those in the art, for instance surface treatment by chemicals or radiation, or playing with the relative hydrophilic/hydrophobic character of the matrix and support fibers, respectively.

The Matrix:

In some embodiments, the matrix results from the hardening of a precursor material after impregnation of the textile component. It can also result from the impregnation or coating of the fibers constituting the textile by a precursor material before their use for making a textile, and further treatment suitable for transforming said precursor material into a cohesive matrix. Said treatments are known by those skilled in the art, and may consist, for instance and non-limitatively, by a heating leading to softening of said precursor material, followed by cooling (for instance if the precursor material is thermoplastic), or oppositely a heating leading to hardening and/or bonding of said precursor material (for instance if said precursor material is a thermocrosslinkable material), or light treatment, or plasma treatment, or chemical treatment.

Matrix Precursor Material:

Essentially, all types of materials that can be cast, spread, coated, molded, projected, bonded, onto a textile, and are capable of hardening to a solid material, can be used as matrix precursor material within the invention.

In some preferred embodiments, said matrix or its precursor material is elastic, elastomeric, plastic, thermoplastic, thermoformable, vitreous, crosslinked or vitrimeric.

In some preferred embodiments, said matrix precursor material is made of, or comprises any or any combination of a thermofusible material, of a thermoplastic material, or of a resin, or of an elastomer, or of a thermopolymerizable material, or of a photopolymerizable material, or of a chemically crosslinkable material, or a hot melt, or an adhesive, or a vitrimer.

Some examplary materials usable as matrix precursor material within the invention are silicones, rubbers, polyenes, polyanes, materials based on epoxys, polyurethanes, norbornenes, polyesters, polyethers, polystyrene, polyacrylates, polymethacrylates, polyvinyls, thermoplastic polyolefins.

Naturally or artificially sourced materials, or biodegradable materials, such as various gums, waxes, inks, hardenable oils, siccatives, glues, or materials derived from natural products, such as Ecovio® or Ecoflex®, and more generally materials derived from cellulose, starch, polylactic acid, lignin, may also be used, notably in order to prepare devices of the invention that are environment friendly, biodegradable.

In some other preferred embodiments, matrices in the invention are biocompatible.

In some other preferred embodiments, matrices in the invention are biodegradable.

As a non-exhaustive list of matrix material, one can mention collagen, agarose, agar gum, polylactic acid, polyglutamic acid, gelatin, matrigel.

In some preferred embodiments, matrices of the invention may comprise biomolecules, or living cells.

In some preferred embodiments, said matrix is flexible or semiflexible. Indeed, many microfluidic devices of the current art, in particular low cost ones, are rigid, which creates all kind of problems, such as easy breaking, difficulties to adapt in wearable devices, risk of injuries to the users, etc.

In some other preferred embodiments, however, said matrix is rigid: this can be useful, for instance if accurate positioning with regards to a holder, or standalone operation, is needed.

Biocompatible materials, or biodegradable materials, may also be used advantageously, notably for applications involving the culture or analysis of living cells in devices of the invention. Said materials may also be advantageous notably for usage of the invention in implantable devices, or for the use of the invention to prepare implantable devices, of for the preparation of «tissues or organ on chips», for modeling biological processes, for drug discovery, or screening for cell biological studies, or more generally for applications in regenerative medicine, or biotechnology. As a non-exhaustive list, one can mention collagen, agarose, agar gum, polylactic acid, polyglutamic acid, gelatin, matrigel.

Preferably too, especially in applications related with implantable devices, regenerative biology, or cell culture, said material is non toxic or weakly toxic, or releases only non toxic or weakly toxic products during its biodegradation.

Matrices of the invention may also have in at least part of their volume various ranges of mechanical properties.

In some embodiments, matrices of the invention are rigid, for instance they have in at least part of their volume a young modulus, or a bending modulus, comprised between 100 and 10,000 MPa. In some other embodiments, matrices of the invention are hard elastic materials, i.e. said modulus is typically comprised between 100 kPa and 100 MPa, or between 200 kPa and 3 MPa, or preferably between 1 MPa and 100 MPa In some other embodiments, matrices are moderately hard elastic materials, i.e. said modulus is comprised between 20 and 100 kPa, or preferably between 20 kPa and 500 kPa.

In some other embodiments, said matrices are soft elastic materials, as is the case for instance for gels, i.e. said modulus may be comprised between 50 Pa and 100 kPa, or between 50 Pa and 50 kPa, or between 50 Pa and 20 kPa.

In some embodiments, said matrices may combine several parts with different properties so matrices may comprise any combinations of the different types of properties recited above Patterning:

Depending on the embodiment, the term «matrix», may not necessarily mean that this matrix is uniform all over components, chips or devices of the invention. On the contrary, in many preferred embodiments, components, chips and devices of the invention may involve a matrix that is patterned and/or multi-materials, and presents different compositions or properties at different places of the component, chips or device.

In some embodiments, said patterning involves the presence on the surface of said matrix of reliefs, for instance protrusions, recesses, ridges, posts, wells, and the like In some other embodiments, said patterning involves the creation on the surface or in the volume of the matrix of different properties, such as optical properties, wetting properties, chemical properties, adhesion properties, electric properties, magnetic properties.

If the device of the invention is essentially sheetlike, said pattern may involve variations of said properties along the sheet, or across it. Typically, variations along the sheet may be used in order to impart specific properties at such places.

Matrices of the invention may also involve differences of composition across its thickness, everywhere or in some places, for instance to insulate an internal material from the outside environment. However, even in such embodiments, and in contrast with prior art, the matrix as a whole, i.e. at least one of the inner and outer constituent(s) or parts of said matrix, is embedding the textile and mechanically cohesive with it.

Matrices of the invention may be monolayer, or multilayers, in order to impart different properties across its thickness. For instance, when the matrix is constituted of or comprises a hydrogel, it may be advantageous to insulate such hydrogel by an external layer of the matrix impermeable to water.

In some preferred embodiments, said matrix is transparent to light in at least some places, or translucent in some places.

In some preferred embodiments said transparency is combined with a zone of the textile made at least in part of transparent fibers.

In some even more preferred embodiments, said matrix and said fibers are index matched in at least some places In some also preferred embodiments, the matrix is transparent in a zone where the textile presents no fibers, or a lower density of fibers.

In some preferred embodiments, said matrix is transparent at a place traversed by at least one channel of the invention.

In some other preferred embodiments, said matrix is opaque in at least some places.

All these different variants provide flexibility in preparing devices of the invention with different optical properties for various functions.

Matrices of the invention may also have different properties with regards to different fluids.

In preferred embodiments, matrices of the invention are impermeable and resistant to a fluid, notably to a fluid that will be transported along a channel of the invention.

In preferred embodiments, said fluid is an aqueous fluid. In some other embodiments, it can be an organic, or a hydroorganic, or a fluorinated solvent.

In some preferred embodiments, said matrix is hydrophilic in at least some places In some preferred embodiments, said matrix is hydrophobic in at least some places.

In some embodiments combining the two above, matrices of the invention may comprise a hydrophilic zone surrounded by hydrophobic material.

In other embodiments, matrices of the invention may involve on parts of the device some porous zone. In such case, it is often, but not always, preferred that said porous zone is enclosed by a non-porous layer, so that the fluid contained in some porous zone does not leak out of the component, chip or device.

Said porous zones may be interesting e.g. to help fluid loading by capillary action, or to preload in the device some reagents.

Matrices of the invention may also be, in full or in part, made of a gel.

In different types of embodiments, said gel may be swellable, or swelled by some specific fluids or solvents.

In some preferred embodiments, said gel is a hydrogel.

Exemplary preferred embodiments of hydrogels advantageous in the invention are acrylamide based, such as substituted or non substituted polyacrylamides, functionalized polyalkoxydes, such as polyethylene glycol diacrylate, polysaccharides, polypeptides, and the like.

In preferred embodiments, combinations of different materials may be used in the invention for specific applications. Such combination may be at the micro or nanoscale, e.g. as a mixture or composite.

In some preferred embodiments, components, chips and devices of the invention may advantageously involve different types of materials or different types of properties, at different places.

In yet other embodiments, components, chips and devices of the invention may involve in some places a transparent matrix, to allow for an optical window.

In yet other embodiments, components, chips and devices of the invention may involve in some places a heat conducting, or an electrically conducting, matrix.

In yet other embodiments, components, chips and devices of the invention may involve in some places a meltable, or dissolvable matrix.

In preferred embodiments, the matrix precursor material is made of a hardenable material.

According to some embodiment, devices of the invention may involve a matrix that is patterned and/or comprises multiple components, and present different compositions or properties at different places of the device.

For instance, patterning or variations of properties of the matrix at some places may be used in order to provide specific properties at such places. For instance, a window, or a transparent matrix component, may be interesting to allow optical observation, in devices that cannot be transparent at other places.

Matrices of the invention may have different optical properties, and notably different optical properties at different places. All these different variants provide flexibility in preparing devices of the invention with different optical properties for various functions, such as windows for observation or detection, or for excitation.

Matrices of the invention may also have different properties regarding different fluids, i.e. be impermeable to some fluids, or swellable by some fluids. They may also comprise some parts impermeable with regards to a fluid, and some other parts swellable to said fluid, or permeable to said fluid.

In some preferred embodiments, devices of the invention may advantageously involve different types of materials, or different types of properties, at different places. As non-limitative examples, devices of the invention may involve in some places a matrix that is rigid or with a higher modulus than the rest, e.g. to provide stable dimensionality, or for holding. Oppositely, devices of the invention may also involve in some places a low modulus or high elasticity zone, to induce localized and controlled deformability, such as stretchability, or bendability, or a septum effect.

In yet other embodiments, devices of the invention may involve in some places a heat conducting, or an electrically conducting, matrix. This can be useful, for instance for controlling temperature, as needed for many protocols in chemistry or biology.

In yet other embodiments, devices of the invention may involve in some places a meltable, or dissolvable matrix. This can be useful for instance to open a valve or port at a selected time.

In preferred embodiments, matrix of the invention is made from a hardenable material. This is indeed a very interesting way to embed easily the textile in the matrix, as will be seen in more detailed in the methods of the invention.

The Channels:

Channel Positioning:

A key feature of the invention is the presence of at least one channel embedded in a matrix and interwoven or entangled with a textile component, said channel being at least partly open. Being embedded in said matrix, said channel is advantageously not part of or in contact with any of the support fibers constituting the textile layer. Also, according to the invention, channels in the matrix either contain a movable fiber, or are void, or contain a fluid, along at least part of their length. They are delimited by walls, at least along part of their length. In some embodiments, said walls may consist in the edges of a hollow left in the matrix material by the removal of a fiber. In some other embodiments, they may consist in the walls of a tube of a plastic material that has been interwoven with the textile fibers.

Channels in the invention can have a multiplicity of shapes, topologies and sizes. As non limiting examples, they can have circular, square, parallelepipedal (cuboid), ribbon-like, or have more complex shapes.

In a particularly preferred embodiment, at least one channel has a circular section on at least part of its length.

In many preferred embodiments, channels in the invention have a constant cross-section In some other preferred embodiments, channels may have a non-uniform or non-constant cross-section.

In general, too, channels of the invention comprise at least a part in which they are elongated in at least one direction, said direction defining a main axis, in order to transport fluid along their main axis.

In some preferred embodiments, though, channels in the invention may also be chamber-like, or comprise a chamber-like zone.

In some preferred embodiments, especially for sheet-like devices, said chamber-like channel or chamber-like zone may be essentially flat, i.e. have a smaller dimension in the direction perpendicular to the plane tangent to the sheet.

Channels in the invention may also have all kinds of dimensions, notably, they can be microchannels, or millichannels, or nanochannels.

In some particularly preferred embodiments, channels are microchannels, i.e. at least one dimension of their cross-section or, equivalently, one of their lateral dimensions, is comprised between 1 µm and 1 mm.

In some other preferred embodiments, channels are millichannels, i.e. at least one dimension of their cross-section or, equivalently, one of their lateral dimensions, is comprised between 1 mm and 1 cm.

In some other preferred embodiments, channels are nanochannels, i.e. at least one dimension of their cross-section or, equivalently, one of their lateral dimensions, is comprised between 1 nm and 1 µm.

In some preferred embodiments said dimension is along some part of the channel comprised between 10 µm and 1 mm, and more preferably between 20 µm and 100 µm, or between 20 µm and 200 µm, or between 20 µm and 500 µm, or between 50 µm and 200 µm, or between 50 µm and 500 µm, or between 50 µm and 1 mm, or between 50 µm and 2 mm, or between 100 µm and 500 µm, or between 100 µm and 1 mm, or between 100 µm and 2 mm, or between 100 µm and 3 mm, or between 100 µm and 5 mm.

In some preferred embodiments, devices of the invention comprise several channels as described above, embedded in the same matrix, the ensemble of said channels constituting a fluidic network.

In some embodiments at least some channels of said network can be interconnected.

In some other embodiments, at least some channels of said network may not be interconnected In yet some other embodiments, said fluidic network may comprise a combination of interconnected and non-interconnected channels.

In some preferred embodiments, the state of connection between channels in a fluidic network comprised in a device of the invention, may be changed by action on a movable fiber.

In some preferred embodiments, channels in the invention are non-linear.

Channels in the invention are entangled in or interwoven in the textile support fibers constituting part of the device. As will be seen below, in the description of some processes that can be used to produce devices of the invention, this method of building the channel has, as compared to the prior art, the advantage of offering the possibility of integrating well defined and calibrated channel networks in a device, without expensive microfabrication.

Interweaving or entanglement of the channel in the textile directly results from interweaving or entanglement of the removable fiber with the support fibers. This ensures that the removable fiber is accurately guided by support fibers of the textile. The embedding matrix avoids direct contact of the channel with the fibers, which could cause leakage or contamination. Also, thanks to the power and flexibility of weaving technologies, this also allows to impart to a channel complex, linear or nonlinear, paths within the device.

Channels in the components, chips and devices according to the invention can have a multiplicity of shapes, topologies and sizes, which results from the selection of the removable fibers on the one hand, and on the type of interweaving of entanglement of said fibers with the support fibers, on the other hand.

In a particularly preferred embodiment, at least one channel has a circular section on at least part of its length. Circular sections are interesting in numerous cases. For instance, they are very efficient for preventing leakage, for allowing stable flow of droplets, or for modeling a vascular system.

In many preferred embodiments, channels in the components, chips and devices according to the invention have a constant cross-section. This is interesting in particular if species must be flown at constant velocities, or also for many applications involving movable fibers.

In some other preferred embodiments, channels may have a non-uniform or non-constant cross-section. This can be instrumental, for instance for reserving in a channel chamber-like areas, or detection zones, or for trapping movable fibers in order to induce their deformation.

In general, too, channels in the components, chips and devices according to the invention comprise at least a part in which they are elongated in at least one direction, said direction defining a main axis, in order to transport fluid along their main axis.

In some preferred embodiments, though, channels in the invention may also be chamber-like, or comprise a chamber-like zone, or comprise a reservoir or a reservoir-like zone, or be connected to a reservoir or a reservoir-like zone. This can be useful e.g. to cultivate cells, or to perform detection, or to perform reactions, or to store or load reagents.

In some preferred embodiments, especially for sheet-like devices, said chamber-like channel or chamber-like zone or reservoir-like zone may be essentially flat, i.e. have a smaller dimension in the direction perpendicular to the plane tangent to the sheet, than in a direction tangent to said plane.

Channels in the components, chips and devices according to the invention may also have all kind of dimensions, notably, they can be microchannels, or millichannels, or nanochannels.

In some particularly preferred embodiments, channels in the components, chips and devices according to the invention are microchannels, i.e. at least one dimension of their cross-section is comprised between 1 µm and 1 mm The invention is particularly interesting for creating devices with microchannels, because known prior art methods to create microfluidic devices are expensive, and thus reduce the field of potential applications.

In some other preferred embodiments, however, channels are millichannels, i.e. at least one dimension of their cross-section is comprised between 1 mm and 1 cm; the invention there is particularly interesting in its possibility to prepare complex and self-sustained devices, still at low cost, as compared e.g. with prior art devices, based on tubes.

In some other preferred embodiments, channels are nanochannels, i.e. at least one dimension of their cross-section is comprised between 1 nm and 1 µm. As for microchannels, this is interesting for instance for cost reasons, or also for preparing systems difficult to make by photolithography, using e.g. nanofibers, for instance carbon fibers, as movable fibers.

However, in some other preferred embodiments, channels in the invention can have intermediate ranges of sizes. In some preferred embodiments, for instance, at least one dimension of their cross-section is comprised between 10 µm and 2 mm, or between 20µ and 5 mm.

In some preferred embodiments, devices of the invention comprise several channels as described above, embedded in the same matrix, the ensemble of said channels constituting a fluidic network, in which channels can have various states of interconnection or insulation.

The invention is indeed very interesting for preparing networks, and notably complex networks, thanks to its potential to prepare simply and at low cost devices with complex architectures with undercrosses and overcrosses thanks to its potential to precisely position and hold non linear channels.

Indeed, it is another advantage of the invention, to allow the easy fabrication of microfluidic devices comprising crossing non-interconnected channels, since channels can be separated from each other by some fibers within the textile, directly in the fabrication process.

It is thus another object of the invention, to provide a fluidic device wherein channels are separated from each other at a crossing point by at least one fiber of a textile.

It is thus another object of the invention, to propose fluidic devices comprising crossing channels that are not fluidically connected at the crossing point.

In addition, the invention provides the possibility to modify dynamically the state of connection between channels in a fluidic network comprised in a device of the invention, by action on a movable fiber, thus avoiding the need of complex integrated valves, pressure control, and the like, used in prior art.

Said change of fluidic connectivity may, depending on the embodiment, comprise for instance an action of putting in communication at least two elements of the network, or insulating at least one element of the network, or changing the flow rate in an element of the network, or changing the flux of a species in an element of the network, or any combination thereof.

Thanks to the entanglement of removable fibers with support fibers, directly resulting in the entanglement of channels with support fibers, it is easy to create connection, or oppositely crossings without connection, or a combination thereof.

Content of Channels:

In some other preferred embodiments, channels of the invention can be open on the totality of their length, or can be open on a part of their length, and contain some other components along some other part of their length.

In some preferred embodiments, said other components may be porous material, non porous material, packed colloidal material, powders, solid material, or more generally any material restricting the motion of fluid, and impairing open flow path in said channel.

In some preferred embodiments, channels of the invention may comprise, in their volume or at their surface, different types of compounds suitable for imparting to said channels specific properties.

In some preferred embodiments, said compounds may be any of polymers, microparticles, nanoparticles, metals, molecules, catalysts, colloids, ions, molecular assemblies, antibodies, nucleic acids, proteins, polysaccharides, proteoglycans, antibodies, viruses, bacteria, cells, mammal cells.

In some preferred embodiments said compounds may be present in specific portions of said channel. This can be useful e.g. to induce in said channel a localized chemical reactor, or bioreactor, or sensing zone, or concentrating microcolumn.

In some preferred embodiments, advantageously combined with embodiments in which the matrix is a hydrogel, said compounds are mammal cells. This embodiment is advantageous in order to prepare a device of the invention that is a bioreactor, or an implantable device.

In some preferred embodiments, said compounds are disposed along said channel as a layer surrounding a lumen, thus retaining the open character of the channel.

In some other preferred embodiments, said compounds are adsorbed or grafted onto a fiber, or a porous pad, partly filling a channel of the invention. This can be advantageous, for instance for doing functionalization in a batch process prior to the making of the chip In other embodiments, said compounds can be immobilized or adsorbed or grafted in the channel by any of temperature, light, chemical reaction, electrostatic forces, magnetic forces, packing, after of during the fabrication of the channel.

According to the invention, channels in the matrix either contain a movable fiber, or are void, or contain a fluid, along at least part of their length. At least along part of their length, channels do not contain a wicking material. A channel may at some moment in time contain a movable fiber that is removed and leaves a void. Said void may be filled in by a fluid at any time, or the removal of the fiber may induce the filling of the channel by a fluid. This opposes the invention to some prior art devices involving yarns, fabric or textiles in microfluidic devices, and in which a fluid is transported by wicking along yarns or fibers, i.e. porous material. This brings to the invention significant advantages with regards to said prior art. Notably, transport of fluid in an open channel can be better controlled by external means, for instance a pump, than wicking along a yarn as taught in the prior art, because wicking is strongly dependent on the wetting properties of the yarn. Also, transport along an open channel can be performed at much higher speeds, up to several meters/second, than capillary wicking. Finally, open channels involve much lower surface to volume contact, and thus less risk of contamination and non-specific fluid-surface interactions.

Various types of contents, and means to introduce and/or immobilize said compounds within said channels, were recited in the short description of the invention. Generally, the invention allows to transpose to a simpler and less expensive format, most of the protocols already used in analytical or bioanalytical chemistry, chemistry, biology, biochemistry, pharmacy, toxicology, environment analysis, and so on. Notably, the invention allows the transposition of protocols used in expensive microfabricated devices. Many of these protocols involve the presence of specific compounds in the device, and so in this transposition, it will be suitable to also integrate in channels of the components, chips and devices according to the invention said specific compounds, or others more adapted to the invention. In this respect, the invention also provides additional advantages, such as lower products consumption, or easier storage, for instance thanks to the possibility of devices of the invention to be folded, in some embodiments.

Also, as mentioned above, the invention is particularly suitable for preparing easily and at low cost channels with a circular cross-section. In turn, such circular cross-section is particularly interesting for protocols involving biphasic or multiphasic systems, because they do not present angles, which are causes for leaks between e.g. droplets, in conventional microfabricated systems.

Also, the invention offers a lot of flexibility regarding the fluidic content of the channel or channels.

Thus, in some preferred embodiments, channels in the invention contain an aqueous medium, or an oil, or a hydro-organic medium, or a fluorinated medium. In some other preferred embodiments, the channel or channels of the invention contain a multiphasic system, notably a biphasic system. In some embodiments, said biphasic system combine two immiscible fluids. In some preferred embodiments, said immiscible fluids are an aqueous fluid and an oily fluid. In some preferred embodiments, said oily fluid is a fluorinated fluid.

In some other embodiments, which can be combined with the above, a fluid contained in a channel of the invention is a colloidal suspension In some preferred embodiments, at least one channel in the invention contains at least a movable fiber, or an actionable fiber.

This has several advantages. First, this opens the possibility to perform in the components, chips and devices of the invention numerous protocols already developed in more conventional systems, but with the advantage of the additional functionalities of the invention, such as pumps, valves, patterning and the like. Also, using biphasic systems, for instance, may help to transport inside devices of the invention, some liquids without contact with the wall. For instance, water-based droplets can be carried by an oil fully wetting the walls of the channel, so that species in said droplets cannot touch the walls. This provides thus additional flexibility in choosing the material of the device. Devices of the invention may also be used to insulate different droplets in separate chambers.

In some other embodiments, which can be combined with the above, a fluid contained in a channel of the invention is a colloidal suspension. This can be interesting, for instance to introduce in components, chips and devices of the invention the possibility to perform miniaturized heterogeneous phase reactions or extractions.

In some embodiments, channels of the invention enclosing movable fibers may also contain some liquid. This may be interesting e.g. for lubrication, for better sealing, or for transmitting volume changes to channels. In some preferred embodiments, said fluid is miscible with the fluid contained in at least one channel. In some other embodiments, said fluid is non miscible with the fluid contained in at least one channel.

Movable Fibers

The invention rests on the combination of at least one movable fiber entangled with support fibers, both types of fibers being embedded in the matrix, the movable fibers giving birth to the channels after their partial or complete removal from the matrix. Further, some movable fibers are meant to remain in the component or chip or device according to the invention and perform the function of actionable fiber: according to the embodiment chosen, some action on one or several actionable fibers results, non limitatively, in a modification of the geometry of the channel(s), of their connectivity, of the geometry of the component or chip or device.

As for the materials constituting movable fibers, they can be constituted by any kind of material, including those that have been recited above regarding fibers used to constitute the textile.

This comprises, as a matter of example, polyester, viscose, rayon, cotton, silk, linen, wool, jute, sisal, polyarmide, all kinds of modified cellulose, polyolefins, such as polyethylene, polypropylene. However, due to the specificities of the invention, it may also use, alone or in combination with the common types of fibers used in the textile or fiber industry, other types of fibers, and notable metal, or more advanced materials, or fibers used in the technical industry, such as glass fiber, Kevlar, carbon fiber, metal wires, ceramic fibers, fluoropolymers such as polyvinylidene fluoride, fibers drawn from liquid crystals, and the like, and more generally any kind of organic, synthetic, mineral, material, having properties that make them amenable to shaping in the form of fibers.

In particularly preferred embodiments, said movable fiber is made totally or in part, of an organic material.

However, in most of preferred embodiments, said movable fibers differ from the fibers constituting the textile by at least some properties. In particularly preferred embodiments, said properties facilitate the motion of the movable fibers with regards to the matrix and/or to the textile.

In many preferred embodiments, said movable fibers are more rigid than the support fibers constituting the textile. In some preferred embodiments too, movable fibers used in the method according to the invention can be made of a monolithic material. This prevents their wicking by the matrix, and thus facilitates their motion.

In some preferred embodiments, said movable fiber is fully rigid.

This may be advantageous, for instance if the length of the channel enclosing the movable fiber is relatively large, and/or if its cross-section is relatively narrow, to allow said movable fiber to be manipulated without too much deformation. This is particularly the case, in particular embodiments in which movable fibers must be rotated or pushed.

In some preferred embodiments, said movable fiber is flexible, or semi-flexible.

To fix ideas, in some preferred embodiments, said movable fiber can be bent without breaking or without irreversible deformation with a radius of gyration smaller than five times the fiber thickness along the axis bearing the radius of gyration of the bending. More generally, for instance for fibers with complex shapes in which said axis cannot be defined easily, in some preferred embodiments, said movable fiber can be bent without breaking or undergoing irreversible deformation with a curvature smaller than five times the fiber thickness perpendicular to the axis along which the main deformation induced by the bending occurs.

In some other preferred embodiments, said movable fiber can be bent without breaking or undergoing irreversible deformation with a radius of gyration larger than one time, or larger than two times, or larger than five times, or larger than ten times, or larger than 20 times, or larger than 50 times, the fiber thickness along the axis bearing the radius of gyration of the bending, and smaller than the length of the fiber, or smaller than the length, or one half of the length, or one fifth of the length, or one tenth of the length, or one twentieth of the length of the fiber comprised in the matrix.

In some other preferred embodiments, said movable fiber can be bent by at least 30°, or by at least 90°, or by at least 180°, on its total length without breaking or without irreversible deformation.

More generally, in some other preferred embodiments, said movable fiber can be bent without breaking or without irreversible deformation with a radius larger than one time, or larger than five times, or larger than ten times, or larger than 20 times, or larger than 50 times, the fiber thickness in the direction perpendicular to axis along which the main deformation induced by the bending occurs, and smaller than the length of the fiber, or smaller than the length, or one half of the length, or one fifth of the length, or one tenth of the length, or one twentieth of the length of the fiber comprised in the matrix.

This flexibility, or semi-flexibility may be advantageous, in particular if the channel enclosing the movable fiber is non-linear, in order to avoid too much stress to be transmitted to said channel, or to the surrounding matrix during the actuation of the fiber.

In preferred embodiments, movable fibers in the method and devices according to according to the invention can be made of a monolithic material. This prevents their wicking by the matrix, and thus facilitates their motion.

In some other embodiments, movable fibers can keep some porosity, or be made of multiple fibers.

As will become more apparent below, this can be advantageous for instance for using movable fibers to control the transport of fluids or species.

In this case, mobility is preferably facilitated by conferring to said movable and actionable fibers interfacial properties that prevent their adhesion to or absorption of the matrix.

In some other preferred embodiments, movable fibers may be constituted on part or all of their length from a multifibers fiber, encompassed in, or enducted with, a material that does not adhere strongly to the matrix.

In some preferred embodiments, movable fibers preferably present a smooth surface on at least part of their length.

In some preferred embodiments, they present a uniform cross-section to facilitate their sliding.

These different embodiments may be useful to facilitate the motion or deformation of the movable fibers, notably if the channels enclosing the movable fibers are long, or nonlinear, nor narrow, or a combination thereof.

In various preferred embodiments, movable fibers in the method according to the invention can have different types of cross-sections, circular, square, parallelepipedal (cuboid), ribbon-like, or have more complex shapes.

In a particularly preferred embodiment, at least some of the movable fibers have a circular cross-section on at least part of their length.

In some other embodiments, movable fibers may present a non uniform cross-section.

In yet some other preferred embodiments, movable fibers present on some part of their length properties facilitating their motion, such as a smooth surface, a uniform cross-section, a non-wicking property or non-wetting property with regards to the matrix, a monolithic character, or providing a lubrication layer on the surface of the fibers, or a combination thereof, In yet some preferred embodiments, movable fibers present on some part of their length properties preventing their motion, such as a rough surface, a non-uniform cross-section, a wicking property or wetting property with regards to the matrix, a multi-fibers character, or a combination thereof.

In some other preferred embodiments, movable fibers in the method and devices according to the invention may have along some part of their length, properties facilitating their motion inside a channel, and in some other part of their length, properties preventing their motion inside said channel, or making said motion more difficult.

For instance, movable fibers may present on some part of their length properties facilitating their motion, such as a smooth surface, a uniform cross-section, a non-wicking property or non-wetting property with regards to the matrix, a monolithic character, or a combination thereof, and in another part of their length properties preventing their motion, such as a rough surface, a non-uniform cross-section, a non-circular section, a wicking property or wetting property with regards to the matrix, a multi-fibers character, or a combination thereof.

Thus, in some embodiments, movable fibers, in the method and devices according to the invention, have the property of being actionable on part of their length within the device, and do not have this property on another part of their length within the device.

In some other embodiments, movable fibers of the invention may present in continuity at least two portions, one in which they are immobilized in the matrix, and another one in which they are mobile with regard to the matrix.

The above embodiments may be interesting e.g. to induce specifically desired deformation, either of the fiber, or of the device, or both.

In some embodiments, this may be used to "hold" on side of an actionable fiber while manipulating another side, in order to deform it, e.g. by stretching or twisting.

In yet other embodiments, this can be useful to exert forces on the matrix, and for instance to deform the device.

In some other embodiments, movable fibers may be wickable by some fluids on part of their length, and non-wickable by the same fluid on another part of their length or section.

In some other embodiments, movable fibers may be porous to some fluids on part of their length, and non-porous to the same fluid on another part of their length or section.

In some other preferred embodiments, movable fibers in the method and devices according to the invention present a section that decreases continuously or stepwise, from the entrance of the fiber into the matrix of the device.

In some other preferred embodiments, movable fibers in the method and devices according to the invention present several increases and decreases of section along their length.

All these embodiments, in which movable fibers have properties varying along their length, can produce different technical effects and advantages. For instance, as will become more apparent below, the presence of some changes in cross section, or in porosity, or in shape, may help to control transport properties between two channels or channel portions or chambers, by acting on the fiber.

In some other preferred embodiments, movable fibers are elastic, which may be interesting e.g. to induce a change of diameter or shape upon mechanical action, e.g. pulling or twisting.

Changes of shapes can be used to control transport, or to effect diverse actions in devices of the invention, such as cell manipulation or positioning, or sensing, notably mechanical, optical or electrical sensing.

In some preferred embodiments, removable fibers can be fully removed from the channel in which they are contained. This is interesting in the invention, e.g. to prepare after hardening of the matrix, a void channel, or to pump fluid in a channel. This can also be useful for instance to open a new port.

In some other embodiments movable fibers can be removed only partly from the channel in which they are contained. This can be useful for instance in pumping operations, or valving operations, as will become clearer in the following of the description.

In yet other embodiments, movable fibers can slide along a channel of the invention, without freeing any section of said channel. This can be useful for instance for deforming the device locally, e.g. for pinching another channel, or for deforming the device globally, for instance for chip bending. This could also be useful for instance for pinching another channel.

In some preferred embodiments, change of shape or position of movable fibers may be used to exert within a component, chip or device of the invention, mechanical or electrical actions on materials, fluids or species contained in said device. As non exhaustive examples, this can be useful for instance for displacing cells, or performing local electrical or optical measurements, or for delivering fluids or species locally within the device.

In some other preferred embodiments, change of shape or position of movable fibers may be used to perform inside said device a local sensing.

For instance, if the movable fiber is elastic, its deformation can be a reporter of some force or shape.

If the movable fiber is electrically conducting, its displacement or deformation may be used to perform local sensing of a potential, or conductivity.

If the movable fiber is magnetic, it can be used to collect or record magnetic material in the chip, or more generally to exert an action on magnetic material contained in the device. Alternately, if the movable fiber is magnetic, the application of an external magnetic field can be used to displace or deform said magnetic fiber within the device.

If the movable fiber is optically conductive, for instance is an optical fiber, its manipulation can be used to shine light at specific positions within the device, or to record light emission at specific positions in the device, or a combination thereof.

An advantage of the invention, is that all the above operations consisting in applying mechanical or electrical or optical stimuli, or measuring mechanical, optical, electrical or magnetic properties, can be performed very locally, and at multiple positions that can be selected and changed after the fabrication of the chip.

Devices of the invention comprising magnetic movable fibers, may advantageously comprise or be operated together with, additional magnetic field generating elements.

Also, devices of the invention comprising electrically conducting movable fibers, may advantageously be operated together with at least an external power source.

In some preferred embodiments, movable fibers of the invention have at least one part protruding from a channel in which it is at least partly enclosed, outside of said matrix.

In some preferred embodiments, said protruding part is a dangling end

In some preferred embodiment, said protruding part is a loop.

Said protrusion is advantageous, in the fact that it allows manipulation by external means, and in particular by mechanical external means, For this, it is sufficient that one element of surface of said fiber be in contact with the outside of the chip or component in which said channel is defined, without necessarily constituting a convex protrusion. For instance, said protrusion may be an element of surface of said fiber, level with the surface of the matrix from which it exits. Optionally, said element of surface may comprise an additional structure, such as a dent, a hole, a hole with a thread, a handle, to facilitate its manipulation. Thus, in some preferred embodiment, said protruding part is an element of surface of said fiber, in contact with the outside of the device or chip containing the channel in which said fiber is enclosed at least in part.

Preferably said protrusion occurs from said one port of said channel.

In some preferred embodiments, movable fibers can be fully removed from a channel in which it is at least partly enclosed. This can be useful for instance to open a new port.

In some other embodiments, movable fibers can be removed from said channels only partly. This can be useful for instance in pumping operations, or valving operations.

In yet other embodiments, movable fibers can slide along a channel of the invention, without freeing any section of said channel. This can be useful for instance for deforming the device locally, e.g. for pinching another channel, or for deforming the device globally, for instance for chip bending.

In some preferred embodiments, components or chips or devices of the invention comprise a multiplicity of movable or actionable fibers, at least partly enclosed in a multiplicity of channels.

In some preferred embodiments, said multiplicity of fibers are connected to each other.

It is indeed an advantage of the invention, to allow the simple and inexpensive production of fluidic devices, and particularly minifluidic devices and even more preferably microfluidic devices, and thus to perform highly multiplexed operations, or oppositely simple operations, while remaining in a common format, or in similar format.

More specifically, in some preferred embodiments, devices of the invention may comprise only one, or at least two, or at least 5, or at least 10, or at least 50, or at least 100, or in some cases at least 200, or at least 500, or event 1000 or more channels.

In some preferred embodiments, devices of the invention may comprise only one, or at least two, or at least 5, or at least 10, or at least 50, or at least 100, or in some cases at least 200, or at least 500, or event 1000 or more movable fibers.

When a device of the invention comprises a multiplicity of movable fibers, in some embodiments, at least some of them may be actuated together. In some other preferred embodiments, movable fibers are actuated as several subsets, wherein fibers in a subset are actuated simultaneously, and fibers in another subset are actuated at different times or differently. This allows for the implementation of complex and/or high throughput protocols.

In some preferred embodiments, said multiplicity of fibers are connected to each other. For instance this may help to move more easily said fibers together.

In some exemplary embodiments, said multiplicity of fibers can be connected to each other by any combination of weaving, felting, knitting, sewing, knotting, braiding, plaiting, stitching, interlock, 3D weaving, or filament winding or by additional components able to maintain the fibers together, such as glue or mechanical holders or tweezers, and more generally by any means known in the art to assemble objects and/or fibers.

In some other embodiments, said multiplicity of fibers may be prepared as a single component, e.g. in the shape of a comb. In some preferred embodiments, said comb, or more generally said multiplicity of fibers are attached to a handle. By actuating the handle of the comb, one actuates all of the movable fibers. The length of all the fiber do not need to be the same, providing additional flexibility on the positioning of the functional elements associated with said fibers.

In some preferred embodiments, said comb or said multiplicity of fibers connected together is essentially two dimensional: This embodiment is interesting for its simplicity, and also for its compatibility with conventional imaging methods such as microscopy, and also for its compatibility with conventional microfabrication methods such as embossing, microlithography, molding, and the like. However, said two dimensional comb may not necessarily be flat: it may for instance consist in a series of movable fibers, attached to a handle along a line, but following guiding ducts with axes with all kinds of topologies and shapes.

Indeed, in many preferred embodiments, at least some of the channels in which movable fibers are guided are non linear. This not only allows to chose freely the orientation of the functional elements with regards to that of the means suitable to induce motion or deformation to the fiber(s), but it also allows overcrossings and undercrossing of channels and/or fibers, in order to create complex topologies. All of these advantages can be obtained in the invention, while keeping handles, or actuation means, that are simple to fabricate and operate.

In other embodiments, said comb or said multiplicity of fibers connected together can have a more complex 3D shape, comprising a multiplicity of movable fibers that are not all on the same plane. In particular, movable fibers can be guided by channels interwoven or entangled in a textile, allowing them to be guided along complex, and optionally non linear paths, while being actuated together by simple mechanical means, and without the need of complex microfabrication. This family of embodiments, which are new and advantageous features of the invention as regards to former minifluidic systems, notably former microfluidic systems with integrated functionalities, allows to prepare and actuate simply complex 3D networks of channels. This can be useful for higher multiplexing and higher compacity. This type of embodiment is advantageous for instance in combination with methods of preparation of the device, involving methods of the textile industry.

In some preferred embodiments, the connection between said multiplicity of fibers may be prepared within the same preparation method as used for preparing said matrix embedding the support fibers. This provides a simple way to prepare in one single process both the matrix comprising the channel, and the means to actuate the movable fibers.

In some preferred embodiments, devices of the invention may also comprise more than one comb as described above. This can be advantageous, for instance, to operate different subsets of movable fibers at different times, and thus to implement more complex protocols than possible with one single comb, or with prior art devices. Also, some fibers of the invention, either of the support fiber or of the movable fiber type, may present differences in physical, chemical or biological properties, between themselves, or in different zones of a given fiber, or a combination thereof.

For instance, in some preferred embodiments, fibers may present within the device an end.

In some preferred embodiments, at least an end, or a change in shape or composition of a movable fiber, can be positioned at or in the vicinity of the intersection between said fiber and a first channel In some yet preferred embodiments, said end or change in shape or composition can be moved to or move from the intersection between said fiber and a first channel, by a motion of said fiber within a second channel.

In some preferred embodiments, the displacement of said fiber within said second channel changes the fluid transport properties between the two portions of said first channel comprised on each side of the intersection of said second channel with said first channel.

In some other preferred embodiments, advantageously combined with embodiments comprising a least a movable fiber, components, chips and devices of the invention comprise a fiber manipulation means.

In some preferred embodiment, said fiber manipulation means comprises a movable tweezer, or holder, or hook, with such specification and position as to grab at least one movable fiber protruding from the invention's matrix, and to pull, push or twist said fiber.

In some other preferred embodiment, components, chips and devices of the invention comprise a multiplicity of said fiber manipulation means, able to act differently on different fibers protruding from the invention's matrix.

Functionnalised Fibers

In some preferred embodiments, some fibers of the invention, either of the support fiber or of the movable fiber type, may present differences in physical, chemical or biological properties, between themselves, or in different zones of a given fiber, or a combination thereof. Said differences can be imparted for instance by treatment of said fibers, before fabrication of the textile or of the device, or during the fabrication of the textile or of the device, or after said fabrication, some examples being given below, in the sections dealing with methods to prepare devices of the invention.

For instance, in some preferred embodiments, fibers may present an end within the device. In some preferred embodiments, at least an end, or a change in shape or composition of a movable fiber, can be positioned at or in the vicinity of the intersection between said fiber and a channel.

In some yet preferred embodiments, said end or change in shape or composition can be moved to or from the intersection between said fiber and a first channel, by a motion of said movable fiber within a second channel.

In some preferred embodiments, the displacement of said movable fiber within said second channel changes the fluid transport properties between the two portions of said first channel comprised on each side of the intersection of said second channel with said first channel.

For instance, said movable fiber may create in said first channel a complete or partial obstruction within said first channel, when it is positioned at a specific first position, or in a specific first orientation along the length of the second channel. In some yet preferred embodiments, said movable fiber can additionally create in said first channel a level of obstruction different from the level of obstruction obtained in said first position, when said movable fiber is positioned at a second position, or in a specific second orientation, along the length of the second channel different from said first position.

In some preferred embodiments, advantageously combined with the previous one, said movable fiber presents at the intersection with said first channel a non-cylindrical section, so that its translation or rotation changes the level of obstruction created in said first channel.

In some preferred embodiments, at least one fiber in the invention presents along its length at least one via, able to allow fluid passage from one side of said fiber to the other.

By this we mean any particular structure onto said fiber, able to allow, or to facilitate, transport of fluid or species, from one side of the fiber to another, as compared to the transport achievable across a fiber at a place where such a via is not present. Via within the invention may be of different natures, and take for instance the form of a change of shape, or a change of composition in a fiber, or a combination thereof. Said change of shape can be for instance a through-hole or window or any shape, or a change of section along at least one direction, or an indentation, or a recess. Said via may also take the form of a porous zone, or of a through-hole or recess filled with a porous medium. By "transverse", we mean that said via allows transport of species of liquid along a direction that does not follow the axis of the fiber. By "via", we also mean that at the level of said via, fluid or species can be transported by said via from a space that does not belong to the fiber, towards another space that also does not belong to the fiber. Said spaces that do not belong to the fiber may be, for instance, chambers, or channels, or reservoirs, or different areas within a chamber or a channel, separated by said fiber. A transverse via may, for instance, allow transport perpendicular to the axis of the fiber. It may also, however, permit transport in another direction tilted with regards to the axis of the fiber. In some embodiments, a via in the invention can be seen as a void or porous volume along the fiber, connecting one side of said fiber with another side of the fiber. By "side" we also do not signify that the transport should necessarily occur between two spaces that are opposite with regards to the axis of the channel. For instance, a via as considered here, can allow transport from a first channel impinging sideways onto a second channel containing the fiber with a given angle, to a third channel impinging on said second channel at any other angle.

In some embodiments, at least some fibers in the invention may also comprise on part of their length, a longitudinal lumen. This may be instrumental, for instance, in helping the transport of fluids or of species from a first channel intersected by a second channel, to a third channel also intersected by said second channel.

In some embodiments, said lumen connects the inside of the fiber to the outside of the chip, or device. In some other embodiments, said lumen does not connect the inside of the fiber to the outside of the chip, or device.

The Fluidic Devices:

Different Shapes and Properties of the Devices

The devices of the invention themselves may have different types of properties, depending of the application, including different types of properties at different places of said devices. Notably, and non exhaustively, they can be flexible, semi-rigid or rigid, be planar, non-planar or have different types of patternings.

For instance devices of the invention may be non planar and non developable. This can be achieved for instance starting from a textile prepared by multi-axes filament winding.

In yet some other embodiments, the devices of the invention are fully three-dimensional. This can be prepared, for instance starting from a textile woven using a 3D weaving textile In some preferred embodiments, said properties may be localized, i.e. devices are bendable, foldable or stretchable in a preferred direction, or along at least one predefined line.

This can be achieved easily in the invention, by preparing during the textile weaving or preparation process, a zone of lower density or resistance, or by patterning during coating by the matrix precursor material a zone where the matrix has different mechanical properties, or a different thickness, or is absent.

In some preferred embodiments, the devices of the invention are rigid.

In some other embodiments, the devices have some rigid and some non rigid areas.

In some embodiments, the devices of the invention are planar.

In some other embodiments, the devices of the invention are non planar and developable.

In some other embodiments, the devices of the invention are non planar and non developable.

In yet some other embodiments, the devices of the invention are fully three-dimensional.

In some preferred embodiments, devices of the invention comprise at least one protrusion, or at least one recess, usable for accurate device positioning.

In some preferred embodiments, the device of the invention may be bendable, foldable, or stretchable.

In some preferred embodiments, said properties may be localized, i.e. devices are bendable, foldable or stretchable in a preferred direction, or along at least one predefined line.

In some preferred embodiments, deformation of the device may be induced by external mechanical manipulation.

In some other preferred embodiments, deformation of the device may be induced by injecting pressurized air, or a pressurized fluid, in at least one channel within the components, chips or device.

Thus, in some embodiments, the invention involves a movable fiber at least partly entangled with the textile, and at least embedded in the matrix, that can impart deformation to the component, chip or device.

In some preferred embodiments, said movable fiber is movable in some part of its length, which can be pulled or pushed, and non-movable with regards to the device along some other part of its length. This may induce reversible or irreversible deformation of the device when said fiber is pulled or pushed.

In some preferred embodiments, said movable fiber presents a zone where it is not embedded in the matrix, and that can be pulled or manipulated in order to induce said deformation to the device.

In some preferred embodiments, said deformation is a bending, or a stretching, or a folding, In some other preferred embodiments, such bending, stretching or folding of the device can be induced by the pulling or twisting of at least one fiber or fiber, which is not embedded in the matrix, but is still entangled with the textile of the device. This can be achieved, for instance by sewing after matrix hardening.

The textile industry also offers the possibility to prepare devices by continuous processes.

It is also another object of the invention, to provide a multiplicity of minifluidic devices, in the form of a roll, or in the form of a sheet, or in the form of a stack, or in the form of a folded stack.

In some preferred embodiments, said roll or sheet, or stack, may present some predefined zones for cutting.

In some preferred embodiments, said predefined zones are devoid of matrix.

Functionalities

The invention allows the easy implementation of functionalities within fluidic devices, especially within mini, micro, milli or nanofluidic devices.

The invention is also helpful in constituting, at low cost and without microfabrication environments, fluidic devices or integrated fluidic devices with a number of different functionalities.

In some preferred embodiments, said functionalities may be produced by specificities of any of or any combination of the matrix, textile, movable fiber(s) or channel(s) of the invention, i.e. be integral to the invention's chip.

In some other preferred embodiments, said functionalities may be produced by a combination of specificities integral to the invention's chip, and of one or several additional components acting together with the invention's chip, thus being part of an integrated device of the invention.

A first family of functionalities relates to fluid transport.

Ports:

In some preferred embodiments, devices of the invention comprise at least a channel with at least one end open to the exterior of the device, also known as a port.

In some preferred embodiments, in which the device is sheet-like, said port can be on the side of the device. In some other preferred embodiment, said port can be at the top, or at the bottom, of the device. By "top" or "bottom", or "side", we mean that ports can be on different limiting surfaces of the device, and notably but not necessarily, on two opposite surfaces, for convenience of visualization and not with any specific reference to any orientation in space, with regards to the chip holder, or the vertical direction. In general, indeed, the invention can exert its advantages in any orientation.

In some other embodiments, said port is constituted by a tube, or more generally a piece of material with a lumen, embedded at one of its side in the matrix with its lumen fluidically connected with the channel, and protruding from the system at the other side.

This latter design is convenient, for instance for sucking fluid from an outer vial, or on the contrary for delivering fluid from the device to an outer vial, or for connecting a channel in the device to an outer pump, or other means for fluid circulation.

In some other preferred embodiments, said port is a septum in connection with the channel. In some preferred embodiments, said septum is integrated in the matrix, or constituted by a part of the matrix itself, at a position devoid of textile threads.

Connector:

In some preferred embodiments, devices of the invention advantageously comprise a connector, allowing the connection of fluidic tubings, or more generally fluid transport or fluid containment components, between at least a port of a channel of the device, and a reservoir, or a pump, or a valve.

Reservoirs:

In some preferred embodiment, devices of the invention comprise reservoirs or chambers. In some preferred embodiments, at least one of said reservoirs or chambers are integral to the device. In some other preferred embodiments, at least one of said reservoirs or chambers is an additional component fluidically connected or fluidically connectable with at least one channel of the chip or the component or the device.

The choice between these different configurations will depend, for instance, on the volume of fluid to be manipulated, as compared to the dimensions of the device or of the channels. For instance, integrated reservoirs will be preferred for volumes of less than 1 ml, preferably less than 500 µl or less than 200 µl, or less than 100 µl, or less than 50 µl, or less than 20 µl, or less than 10 µl. Oppositely, external reservoirs may be preferred for volumes larger than 10 µl, preferably larger than 50 µl, preferably larger than 100 µl, or larger than 200 µl or larger than 500 µl, or larger than 1 ml, or larger than 5 ml.

Open Flow:

Another advantage of the invention, notably with regards to prior art using yarns or threads, is the possibility to transport by open flow, fluid inside a textile-base fluidic component, chip or device and notably a minifluidic chip or device, and even preferably a microfluidic chip or device.

Thus, in one of its embodiments the invention proposes a fluidic system comprising a textile layer and at least one channel, wherein said textile layer and said channel are embedded in a continuous matrix, and wherein fluid can be transported in said channel by open flow. Preferably, this transport is used without capillary wicking.

Fluidic Connection:

The invention also provides new ways to implement fluidic connection, or fluidic isolation, between channels.

In some embodiments, the fluid connection is achieved by an open fluidic path between said channels.

In some other preferred embodiments, channels of the invention can be fluidically connected by a capillary bridge, i.e. with a wicking element, or by a porous element.

More generally, components, chips and devices of the invention may involve capillary wicking for some functionalities, and notably to induce flow.

Thus, in some embodiments, channels in the invention can be in fluidic contact with at least one wicking element, wherein said element is capable of wetting with the fluid contained in said channel. Said wicking element can be a pad, a paper piece, a yarn, a porous material, or a gel, and the like. This can be useful, for instance for using the wicking element as an integrated pump, as known in the prior art, or for increasing surface area, e.g. for creating inside the device a micro-reactor in connection with the channel.

In some preferred embodiments, said wicking element is also surrounded by the matrix.

In some other embodiments, said wicking element is only partly embedded in the matrix, or not embedded in the matrix.

In some other embodiments, said wicking element is constituted by at least a part of the textile of the invention, i.e. it comprises fibers interwoven or entangled in said textile.

In some preferred embodiments, said wicking element is a porous fiber, or a porous part of a fiber.

In some preferred embodiments, said porous element is a gel.

In some preferred embodiment, said wicking element or porous element is part of a movable, and notably an actionable fiber.

In some other preferred embodiments, said fluidic connection may be induced by providing said channels a topology in which they are in close contact along part of their length, by e.g. twisting, braiding, knotting, and the like, of the removable fibers used to prepare the channel inside the matrix.

Oppositely, in some other embodiments, components, chips and devices of the invention involve crossing of two fluidic channels without fluidic connections, wherein said channels are separated by at least one fiber of the support textile.

Valves

It is also an object of the invention, to provide minifluidic devices with at least one valve integrated in the device or chip.

As will be shown in some examples below, it is indeed an advantage of the invention, to provide means to integrate valves that can be actuated externally, and operate at essentially any place within components, chips and devices of the invention, thanks to the positioning and guiding effect of the channels surrounding the movable fibers, on the one hand, and thanks to the possibility to impart some specific transport properties at some places along movable fibers, on the other hand. Various embodiments make use of these possibilities.

In some preferred embodiments, said valve is a check valve. In some other embodiments, it is a progressive valve, allowing the control of flow in a continuous manner. In some other embodiments, it is a bi-state valve, presenting an open and a closed state. In some other embodiments, it is a selection valve, able to direct fluid in one channel or another.

In some preferred embodiments, said valve involves a first channel intersecting a second channel, said second channel containing at the point of intersection a movable fiber, and means for pulling or twisting said fiber.

In some preferred embodiments, said fiber has an end that can be moved past the intersection between the first and second channel.

In some other preferred embodiments, said fiber can change diameter upon pulling or twisting, at the intersection between the first and second channel In some preferred embodiments, said valve involves a first channel in fluidic connection with a second channel, said second channel containing a movable fiber comprising a change of properties along its length, and means to move the location of this change of properties to or from a point of intersection between said first and second channel In some embodiments, said means comprise any of pulling, pushing bending or twisting of the movable fiber.

In some preferred embodiments, said change of properties is a change in cross-section, or a change of shape.

In some other embodiments, said change of properties is a change in wicking properties, or porosity.

In some other embodiments, devices of the invention involve at least one integrated pinch valve along a channel.

In some preferred embodiments, said pinch valve involve a zone in which the device is bendable, traversed by said channel.

In some preferred embodiment, said bendable zone is a line non co-linear with the axis of the channel, notably transverse to the axis of the channel.

In some preferred embodiment, the above is facilitated by preparing during the preparation of the fabric, a weaker zone, for instance a zone with a lower density of fibers, which crosses the path of the channel, or a zone with a thinner matrix or textile, or a zone with a matrix with a lower elastic modulus. This way, upon bending, the device will make a sharp angle at the weak zone, and pinch the channel.

The weak zone may have different shapes. In some preferred embodiments, it is elongated along a direction transverse to the channel axis. In some preferred embodiments, said valves involve a fiber, or a multiplicity of fibers, that are entangled with the fabric or textile, and are actionable.

In some preferred embodiments, the component, chip or device also comprises means to selectively bend the component, chip or device at a zone traversed by said channel.

In some preferred embodiments, said bending is achieved by a mechanical action on a movable fiber in the component, chip or device.

In some other embodiments, the component, chip or device comprises means for compressing the component, chip or device, in a zone traversed by the channel. In some preferred embodiments, said zone is a zone of reduced elastic modulus, or a zone of reduced thickness of the matrix, or of the component, chip or device.

In some other embodiments, said zone comprises no textile fibers, or a lower density of textile fibers.

In some preferred embodiments, said means for compressing the component, chip or device comprises at least a moving piston, or a solenoid actuator, or an electromagnetic actuator.

In some preferred embodiments, said means for compressing the component, chip or device comprises a Braille display, In other preferred embodiments, actionable fibers are used to pinch the channel at preferred location, without overall deformation of the component, chip or device. This can be achieved, for instance by wrapping an actionable fiber around the channel at the point of valving, or by squeezing the channel between two actionable fibers.

In some other preferred embodiments, said valve comprises at least a movable fiber, or a combination of movable fibers, surrounding said channels, and means to pull or twist said movable fiber or said combination of movable fibers.

In some embodiments, devices of the invention comprise at least a valve along one of said channels.

In some other embodiments, said valve is a shot valve.

This can be achieved for instance by intersecting a first channel with a second channel comprising a movable fiber, wherein said movable fiber is either breakable, or fusible at a temperature at which the textile and the matrix are not fusible.

In some other preferred embodiments, components, chips and devices of the invention may also involve any kind of valves known in the art, as additional components in fluidic connection or fluidically connected to at least one channel of the device.

In some other embodiments, integrated devices of the invention may comprise at least one valve non-integral to the chip. Said valve may be of any kind known in the art, such as pinch valve, solenoid valve, manual, electric, at least one of said non-integral valve being an additional component fluidically connected or fluidically connectable with at least one channel of the chip.

Various embodiments have been already described, and additional ones are described in examples, for instance examples 3 and 4.

Pump:

Some preferred components, chips and devices of the invention involve at least one integrated pump. In some preferred embodiment, said pump comprises a channel, open on one side to a fluid source, and containing on the other side a movable fiber actionable by external means. For instance said external means may be an actuator able to pull or push a part of said movable fiber protruding from the device. Said movable fiber thus acts as a piston pump In the embodiment described in example 5 for instance, the invention can be used for pumping. This is achieved by creating at one end of a channel, such as a protruding tube dipped in a reservoir, or a reservoir in direct contact with said port. When pulling a movable fiber along said channel, fluid can be pumped from said reservoir into said channel. Of course, this is only a demonstration example, and more complex architectures, with several pumping elements and valves, can be constructed, in order to achieve more elaborate operations.

In some other embodiments, integrated pump involves a series of three pinch valves as described above along a channel, actuated in sequence in order to induce peristatic pumping. In some other embodiments, the device includes a rotating wheel pressed against the device, inducing peristaltic pumping.

Wicking Pump or Pad:

However, devices of the invention may also involve capillary wicking for some functionalities, and notably to stimulate open flow in the open part of the channel.

Thus, in some embodiments, one is described in example 9, channels in the invention can be in fluidic contact with at least one wicking component, wherein said component is wetting for fluid contained in said channel. Said wicking component can be a pad, a paper piece, a yarn, a porous material, and the like. This can be useful, for instance for using the wicking element as an integrated pump, as known in prior art, or for increasing surface area, e.g. for creating inside the device a micro-reactor in connection with the channel.

In some preferred embodiments, said wicking component is also embedded in the matrix.

In some other embodiments, said wicking is only partly embedded in the matrix, or not embedded in the matrix.

Electrokinetic Pumping:

In some preferred embodiments, devices of the invention comprise means to drive fluids or species by electrokinetic actuation.

Depending on the preferred embodiment, said actuation may be electrophoretic, electroosmotic, or dielectrophoretic.

In some preferred embodiments, said actuation is performed by electrodes electrically connected to an electric power generator, and in electric connectivity with fluid contained in the at least one channel of the device. Said electrodes may be external to the channel. For instance, they can be located in reservoirs, connected to two ends of a channel of the invention, by tubings and ports. In other embodiments, said electrodes may be at least in part embedded in the matrix of the invention, and in electric connectivity with the inside of a channel of the invention.

In some preferred embodiments, devices of the invention may also comprise at least one pump that is not integrated into the chip, said at least one pump being an additional component fluidically connected or fluidically connectable with at least one channel of the chip. Said pump may be of any type know in the art, such as peristaltic pump, syringe pump, pressure pump, gear pump, piston pump, centrifugal pump, electroosmotic pump In some preferred embodiment, devices of the invention, or integrated devices of the invention, comprise at least a vibrating pump Optical:

In some preferred embodiments, devices of the invention comprise at least a window transparent to some radiation, like visible light, UV light, infrared light, X rays.

Preferably, said window is traversed by at least a channel.

Preferably, said window is associated with a zone in which the matrix is transparent or translucent, Preferably, said window is associated with a zone in which the textile has no fibers, or a lower density of fibers Preferably, said window is associated with a zone in which the textile fibers are transparent or translucent Yet preferably, said window is associated with a zone in which the textile fibers and the matrix are index-matched.

In some other preferred embodiments, components, chips and devices of the invention can comprise at least one light-conductive element, such as an optical fiber, able to bring light at predefined positions inside the component, chip or device, or collect light therefrom, or a combination thereof.

In other preferred embodiments, components, chips and devices of the invention may comprise at least one optical assembly. Said assembly can be used, for instance, to condition light to be impinged in the at least one channel, or to condition and analyze light collected from said at least one channel of the invention. Said assembly can comprise, for instance, any or any combination of lenses, mirrors, filters, prisms, chromatographic elements, gratings, light-emitting devices, light sources, light-sensitive devices, diodes, photodiodes photomultipliers, cameras, light intensifiers, waveguides, microscope objectives, optical fibers, polarizers, and more generally any of optical components known in the art.

Windows or light conducting elements, or optical components, allow observation by optical imaging or detection means, or photostimulation, inside of channels, and thus opens for the invention a multiplicity of applications, such as optical imaging, fluorescence, luminescence, photostimulation, light absorption, crystallography, scattering, spectroscopy, chemiluminescence, electrochemiluminescence, or all kinds of optically activated chemical or biological reactions, such as light-induced transconformation, uncaging, polymerization, degradation, optogenetics, electro-optic surface modifications, and the like.

Electrical:

In some other preferred embodiments, components, chips and devices of the invention, or integrated devices of the invention, may comprise electrically conducting elements associated in the invention's device. In some preferred embodiments, they are in electric connectivity with the interior of the channel In some preferred embodiments, said conducting elements are in direct electric contact with at least one channel.

In some other preferred embodiments, said electrically conducting elements are insulated from channels in the component, chip or device by a dielectric layer.

In some preferred embodiments, said conducting elements may comprise, or be part of, or be connected to, any electronic device, or any device involving the measure of a current, or the measure of a potential. As a non exhaustive list of examples, said conducting elements may comprise pH sensors, ion-sensitive sensors, biosensors, chemical sensors, electrochemically active electrodes, piezoelectric elements, deformation sensors, position sensors, components of an impedance metric sensor, temperature sensors, field effect transistors, and the like.

In some preferred embodiments, said electrically conducting element is a heating element.

In some other preferred embodiments, said electrically conducting element is a solenoid, or a spire, generating a magnetic field.

Magnetic:

In some other preferred embodiments, components, chips and devices of the invention, or integrated devices of the invention may involve at least a magnetic element.

In some preferred embodiments, said magnetic element is a wire of a magnetic material.

In some preferred embodiments, said wire is interwoven or entangled with the component, chip or device's support textile.

In some other preferred embodiments, said magnetic element is a magnetic core of soft magnetic material, or a magnet.

In preferred embodiments, said electrically conducting elements, or said magnetic elements, or said light conducting elements, may be embedded at least in part in the matrix, or may be interwoven or entangled at least in part with the textile.

Mechanics:

In some preferred embodiments, components, chips and devices of the invention may comprise at least one additional mechanical component.

In some preferred embodiments, said additional component a chip holder.

In some preferred embodiments, components, chips and devices of the invention comprise a chip manipulation means.

In some other preferred embodiments, advantageous in combination with devices of the invention provided in the form of rolls, stacks or folds, said additional element may comprise a dispenser of individual fluidic systems from said roll, stack or fold.

In some other preferred embodiments, advantageous in combination with devices of the invention provided in the form of rolls, stacks or folds, integrated devices of the invention comprises means for automatic positioning of chips, or means for automatic positioning of electric, optic or fluidic connections to the chip, or a combination thereof.

In some other preferred embodiments, advantageous in combination with devices of the invention provided in the form of rolls, stacks or folds, integrated devices of the invention comprise means for refolding or re-winding and storing chips.

In some preferred embodiments, devices of the invention comprise at least one additional component that is an electric power generator. Said embodiments are particularly interesting in order to perform electrokinetic displacement within the device, or electrochemical or impedance metric detection.

In some preferred embodiment, devices of the invention or integrated devices of the invention comprise, or are connected to, a digital or analogic signal processor.

In some preferred embodiments, devices of the invention or integrated devices of the invention comprise, or are able to exchange information with any of information processing systems, such as microprocessors, microcontrollers, computers, smartphones, tablets, and the like. In various preferred embodiments, said exchange of information may be wireless, or through electronic connection.

Of course, in preferred embodiments, any of the above features, chips, additional components or functionalities can be combined in a device of the invention, in order to achieve a given function, or to implement a selected protocol.

Instrument:

Of course, the invention's advantage become more fully evident, when the device of the invention, comprising at least a matrix, a textile and a channel, entangled with the textile support fibers, is integrated in a full apparatus to achieve some aims, and perform some operations. Thus, in some preferred embodiments, fluidic devices of the invention constitute an instrument.

The invention can be useful for the construction of various types of instruments, preferably miniaturized instruments. Many miniaturized instruments have already been implemented in microfluidics, but in a more complex or less effective fashion, than allowed by the invention.

The invention is particularly interesting for portable, wearable or implantable instruments. The possibility to effect various operation, and notably fluidic operations, within the matrix and thus directly within the textile component, is of course a strong advantage of the invention, as compared to other wearable devices, such as e.g. FR2942041.

In another range of applications, components, chips and devices of the invention are very suitable to cultivate cells, because they can be made from biomaterials, or biocompatible materials, which are very difficult to structure accurately by conventional methods.

In some preferred embodiments, an instrument of the invention is a capillary electrophoresis or microchannel electrophoresis instrument.

In some preferred embodiments, said instrument is an analytical instrument.

In some preferred embodiments, said instrument is able to analyze any or any combination of biological, physical or chemical agents. Said agents may be any of atoms, ions, molecules, macromolecules, molecular assemblies, living organisms, chemical or biological compounds, species or molecules or molecular assemblies or organelles issued from living organisms, microparticles, nanoparticles.

In some preferred embodiments, said instrument is nucleic acid analysis instrument.

In some preferred embodiments, said instrument is protein analysis instrument.

In some preferred embodiments, said instrument is chemical or biochemical analysis instrument.

In yet some other preferred embodiments, a system, components, chip or device of the invention, and notably an instrument of the invention, are production instruments transforming at least one product into at least a transformed product.

In yet some other preferred embodiments, said instrument is a production instrument transforming at least one raw material into at least a transformed product.

In yet some other preferred embodiment, a system of the invention, and notably an instrument of the invention, is a medical instrument In some preferred embodiments, a system, components, chip or device of the invention, and notably an instrument of the invention, constitutes, or is part of, a functional clothing, or a wearable instrument, or an implantable instrument.

Functional clothing, wearable instrument, implantable instruments of the invention may be for instance and as a non limiting list of examples, instruments for monitoring of certain body fluids, for monitoring of a certain condition or illness of the wearer, or for monitoring of physical activity, or for monitoring of certain environmental factors, of a chemical, physical or biological nature.

Functional clothing, wearable instrument, implantable instruments of the invention may also be delivery instruments: as non limiting examples, they may deliver to an organism some active compounds. In some preferred embodiments, said delivery is transdermal. In some other preferred embodiments, said delivery is by direct diffusion.

In yet some other embodiments, said delivery is made by microneedles. In yet some other embodiments, said delivery is done by a catheter.

These different functions can be advantageously combined. For instance, a functional clothing, wearable instrument, or implantable instrument of the invention, may combine the function of monitoring a biological biomarker, for instance sugar content, and delivering some active compound, for instance insulin, in response to said measure.

In some other preferred embodiments, instruments of the invention may be, or be part of environment monitoring instruments. In various preferred embodiments, the environment parameters monitored may be any, or any combination of biological, physical or chemical agents. Said agents may be any of atoms, ions, molecules, molecular assemblies, living organisms, chemical or biological compounds, species or molecules or molecular assemblies or organelles issued from living organisms, microparticles, nanoparticles.

In some preferred embodiments, instruments of the invention, and notably environment monitoring instruments functional clothing, wearable instrument, or implantable instrument of the invention are autonomous.

In some preferred embodiments, instruments of the invention, and notably functional clothing, wearable instrument, or implantable instrument of the invention comprise a power source. Said power source can have its energy embarked, such as in batteries, or draw its power from mechanical action, or draw its power from electromagnetic radiation.

In some preferred embodiments, instruments of the invention, and notably environment monitoring instruments, functional clothing, wearable instrument, or implantable instrument of the invention comprise a wireless communication means.

In some other embodiments, fluidic chips of the invention may be used as implantable devices, for regenerative medicine, or as a step for the preparation of an implantable device. In such cases, matrices of the biocompatible type, or of the biodegradable type, or matrices that are biocompatible and biodegradable, are particularly advantageous. Also, matrices or channel may advantageously contain cells, and/or biological substrates suitable for stimulating cell adhesion and/or growth, such as for instance matrigel, growth factors, laminin, fibronectin, and the like.

In some other preferred embodiments, the system of the invention is a cell culture system.

As for the cells usable in devices of the invention, they can be any cells or combinations of cells, notably mammal cells, for instance neural cells, glial cells, cardiomycetes, endothelial cells, epithelial cells, fibroblasts, chondrocytes, hepatocytes, and more generally any differentiated cells involved in mammals organs.

In some preferred embodiments, cells used in devices of the invention are stem cells, Pluripotent Embryonic Stem Cells or reprogrammed adult somatic cells (iPS cells), from animals, and notably from humans.

Methods

It is an object of the invention to propose a method for preparing a fluidic device, notably comprising the steps of:
Providing a textile component comprising at least a movable fiber interwoven or entangled with at least a support fiber of said textile, or entangled within said textile,
Embedding at least part of said textile and part of said movable fiber in a matrix,
wherein said movable fiber can slide within said matrix, and said textile component is mechanically cohesive with said matrix.

In some preferred embodiments, said movable fiber may be directly integrated into the textile component during its preparation. In some other embodiments, the movable fiber may be entangled or interwoven with said textile after a first step of preparation of the textile.

In some other embodiments, the movable fiber may be sewn to said textile after a first step of preparation of the textile. Thus, it is an object of the invention to propose a method for preparing a fluidic device, comprising the steps of:
a/ Providing a textile component
b/ interweaving or entangling a movable fiber with said textile component.
c/ Embedding at least part of said textile and part of said movable fiber in a matrix,
wherein said movable fiber can slide within said matrix, and said textile component is mechanically cohesive with said matrix.

The invention also provides different embodiments, to prepare within devices of the invention channels, and notably microchannels, or minichannels or nanochannels.

In some preferred embodiments, methods of the invention also provides a step of moving said movable fiber within said matrix, after embedding of said textile and said movable fiber in said matrix.

In some preferred embodiments, said step of moving said movable fibers create a channel embedded in said matrix.

Preferably, the at least one movable fiber is different from at least one of the support fibers constituting the textile.

Thus, it is also an object of the invention to provide a method for preparing a fluidic device, comprising the steps of:
a/ Providing a textile comprising a first type of fibers, and at least one fiber of a second type entangled or interwoven with said textile
b/ Embedding at least part of said textile and part of said fiber of a second type in a hardenable matrix precursor material
c/ hardening said matrix precursor material,
wherein said fiber of a second type can slide within said matrix after the hardening of said matrix, and said fibers of the first type cannot slide within said matrix after the hardening of said matrix.

In some preferred embodiments, said method comprises an additional step, of moving said fiber of a second type within said matrix, after completion of step b.

In some preferred embodiments, said method comprises an additional step, of moving said fiber of a second type within said matrix, after completion of step c.

In some preferred embodiments, the movable fiber is fully removed from the matrix, thus creating an open channel.

In some other preferred embodiments, the movable fiber is partly removed from the matrix, thus creating a partly open channel.

In some other preferred embodiments, the movable fiber is displaced within said matrix without creating a channel.

In this latter embodiment, the motion of the movable fiber can be used for one of the functions of actioning a valve, actioning a pump, deforming the fluidic device.

In some preferred embodiments, the method involves at least two removable fibers, one of which is removed to create an open or a partly open channel, and another one is displaced within said matrix without creating a channel.

In some preferred embodiments, removal of the movable fiber is performed by pulling.

In some other preferred embodiments, removal of the movable fiber is performed by melting or by dissolving.

Thus, in some preferred embodiments, said movable fiber is constituted in a material with a melting temperature lower than the melting temperature of the matrix, and lower than the melting temperature of the textile. In some preferred embodiments, said movable fiber is soluble in a solvent that does not dissolve the matrix.

The invention also proposes different types of entangling methods:

Textile components used in the invention may be made by many manual, mechanical or automated way of interweaving fibers.

In various preferred embodiments, the textile component is prepared by any of, or any combination of, weaving, tag weaving, multilevel weaving, knitting, sewing stitching, interlock, 3D weaving, felting, mixing, knotting, braiding, plaiting, filament winding, multiaxes filament winding.

In some other preferred embodiments, entangling or interweaving can be achieved by less conventional means, such as electrospinning, a combination of mixing and pressing, sputtering.

In some embodiments, the method for preparing the textile may comprise any combination of the above.

The invention also proposes different modes of interweaving mobile fibers:

In some preferred embodiments, advantageous for simplicity and cost, as well as accuracy of positioning, the movable fiber or movable fibers are interwoven or entangled within the textile by the same process as use for preparing said textile.

In some other preferred embodiments, advantageous to provide additional flexibility for the choice of preparation process, at least one movable fiber is interwoven or entangled with the textile component after preparation of said textile component, and possibly with a different technique.

Depending on the embodiment, said different technique may be any of the techniques for interweaving already recited with regards to the fabrication of the textile.

In some preferred embodiments, said movable fiber is interwoven or entangled by sewing, or by stitching.

In some embodiments, it may also be useful to electrically connect devices of the invention with additional elements. In some preferred embodiments, this can be done by various methods, and notably any combination of electronics printing, wire bonding, sewing, soldering, wave soldering, and the like.

In some preferred embodiments, channels may be filled with a metal that is liquid at room temperature, or at a temperature lower than the melting temperature of the matrix and of the textile.

Different Ways of Treating Fibers:

In some preferred embodiments, support fibers or mobile fibers used in the invention are advantageously treated prior to their integration in the device, in order to impart to them some properties or combination of properties. Said treatment may be any kind of treatment, chemical, physical or biological.

In some preferred embodiments, said treatments impart to said fibers properties on their surface that are different from the volume properties. The relevant surface or volume properties may be for instance, texture, hydrophilic/hydrophobic balance, adhesion, color, transparency, biocompatibility, reflectivity.

Said treatments may involve, as a non limiting list: chemical treatment in liquid or vapor phase, light irradiation, plasma treatment, printing, screen printing, spraying, electrospray, corona treatment, heating, flash heating, cooling . . .

Said treatments may be performed on individual fibers, or in parallel on many fibers.

Said treatments may also be performed on support fibers before their assembly into a textile, or after said assembly, on the textile as a whole.

Said treatments may also be performed on mobile fibers before their interweaving into the textile, or after said assembly.

Also, fibers and textiles in the invention may not be treated uniformly along their length or surface. In some advantageous embodiments, said treatment impart along the length of a fiber, or across the surface or volume of a textile, different zones with different properties.

Textile Embedding in the Matrix:

The invention may also use various means, for combining textile and a matrix, in order to achieve the objective of embedding said textile in the matrix, and/or creating between said textile and said matrix mechanical cohesion.

In some embodiments, said means may involve methods already known in the art for the enduction of textiles, such as spraying, painting, direct coating, transfer coating, online coating, melt coating, calendering, rolling, lamination, printing, screen printing.

In preferred embodiments, said embedding comprises the step of providing the matrix precursor material in a liquid, gel, pasty of fluid form, embedding the textile in said matrix precursor material by various means, and then letting said matrix harden. Said fluid form of the matrix precursor material may be obtained by melting, by dissolution of a solvent, or by providing the matrix precursor material with not yet reacted reactive function.

Hardening of the matrix precursor material may be achieved by drying, solvent removal, solvent evaporation, heating, cooling, or by triggering a chemical reaction by heating, by electromagnetic radiation.

In some embodiments, said enduction is achieved in a single step. In some other embodiments, said enduction is achieved in several steps. In some embodiments, enduction is combined with a process in which the matrix is patterned. In some embodiments, said patterning involves the creation on the surface of said matrix of reliefs, for instance protrusions, recesses, ridges, posts, wells, and the like. This creation of reliefs is advantageously obtained by applying during the device preparation any or any combination of step of embossing, of molding, of roll embossing, of injection molding, of microcontact printing, of microlithography.

In some other embodiments, said patterning involves the creation on the surface or in the volume of the matrix of different properties, such as optical properties, wetting properties, chemical properties, adhesion properties, electric properties, magnetic properties. Said properties may be obtained by any step of, or any combination of, printing, light insulating, spraying, screen printing, photographic printing, offset, lithography, microlithography, irradiation.

The invention provides new ways of preparing fluidic systems, starting from specially prepared textile material.

As one of its aspects, the invention uses the property of textile to provide mechanical stability to a material in which it is embedded. This property has been extensively used in the industry, notably to prepare composite objects. It has also been used in the textile industry, e.g. to prepare oil cloth and coated or impregnated textiles, which are both impermeable and resistant. Devices of the invention may in some embodiments take advantage of such possibilities, but the invention also uses textile in a matrix for processes and for preparing devices not known in the prior art.

In some embodiments of the invention, a textile support is used to provide guidance, positioning and specific mechanical properties to channels within a matrix.

In some particularly useful embodiments, described in more detail in FIG. 1, and commented in example 1, said channel is prepared by first interweaving at least a movable fiber 2 in a textile component made of support fibers 1, then embedding said textile component together with its interweaved movable fiber in a hardenable material 5, letting the hardenable material to create a matrix 5 embedding the textile and the movable fiber, and then removing the support fiber by pulling.

This process presents numerous advantages, as compared to processes known in prior art to prepare microfluidic devices.

First, the textile and technology industry proposes ways to prepare textile components with various shapes and properties, comprising fibers interweaved along complex and perfectly predefined mutual paths.

The fibers can have very accurate sizes and shapes, in a wide range of diameters, so that a given fiber in the textile can be programmed to follow accurately a complex pattern. The size of fibers can be tuned down to micrometers, or even nanometers, so this control of shape can be made with a very high accuracy.

The invention then stems from the discovery, that providing in a textile fibers with two different types of properties, a first type that will adhere with a matrix, and a second type that will not adhere to said matrix, called movable fiber, it is possible to remove said fibers of the second type from the matrix after embedding the whole textile in said matrix, thus leaving inside said matrix a channel that accurately reproduces the shape and path of the movable fiber in the initial textile component. It is thus possible by this means, to create, in a matrix, channels with complex shapes and various sizes, without requesting any expensive microfabrication means.

By using a multiplicity of movable fibers, it is also possible to prepare networks.

In the prior art, some authors have described methods in which a wire was embedded in a matrix, and then a channel was created in said matrix by removing the wire (M. K. S. Verma et al., Langmuir 2006, 22, 10291-10295). However, in such prior art, complex means were needed to keep said wire in place during the molding of the matrix, and the accuracy of positioning was not good. In the invention, said positioning is achieved simply by the initial design of the textile, and of the path of the movable fiber in said textile. Also, in said prior art, the removal of the wire required a swelling of the matrix by a solvent such as chloroform, increasing the complexity and the toxicity of the process. Surprisingly, by using a suitable combination of support fibers and movable fibers in said design, it is possible to remove said movable fiber, in spite of its interweaving with the support fibers, which would have suggested that the removal would be even more difficult, due to additional friction.

The interweaving of the channels of the invention with support fibers provide other advantages also not known in prior art. For instance, if two removable fibers are in direct contact during matrix hardening, and are then removed, they will create fluidic interconnection between two channels, as described in example 8.

It is also very easy, however, to create channels that cross each other without fluidic interconnections, i.e. create complex 3D networks, by placing by design of the textile at least one support fiber between the two movable fibers at the place of their crossing.

Also, with looms and other machines used in the textile industry, it is possible to interweave a large variety of materials with different properties, notably hollow fibers, metal fibers, optical fibers, ceramic fibers, carbon fibers, etc. and thus integrate very easily and accurately functional elements inside the fluidic device.

It is also well known in the art, that the textile industry is very efficient at producing high volumes of textiles, including complex ones, at a low cost. As another advantage, this industry is able to produce complex textiles on large areas and in a continuous process, thus alleviating a major problem of conventional methods for fabricating fluidic devices, which prepare components one by one and of a limited area.

When multiple fluidic chips are thus prepared in continuous rolls or sheets, it may then be advantageous to anticipate in the production, specific areas with a fiber arrangement different from that of the body of the chip, in order to facilitate cutting, or to facilitate the removal of movable fibers. This can be achieved, for instance, by keeping in some places only the warp, or by patterning the enduction by the matrix, or a combination of said methods.

For instance, movable fibers can be left as «fringes» dangling from at least one side of the chip, allowing for their easy pulling.

In some other embodiments, they may be left as protruding loops, as done e.g. in the carpet knitting industry, in order to protrude from the matrix, and be pulled easily.

The invention also proposes ways not previously known in the art, to integrate in fluidic devices valves as described in more detail in examples 3 and 4.

Example 5 (FIG. 11) also describes a way to prepare an integrated pump, in the form of an integrated syringe pump. A movable fiber 20 is interweaved with a fabric 22, and the ensemble is embedded in a matrix. When pulling the movable fiber, it creates at the top of the device a port, by which a liquid (20) deposited on the top of the port can be pumped into the channel 23.

For some applications, and notably to manipulate movable fibers, it may be convenient to provide devices in which said movable fibers have dangling ends or dangling loops, not embedded in the matrix.

Selection and manipulation of specific fibers, either to remove them, or to create such dangling ends or dangling loops, or to manipulate them, may be made by various methods, such as for instance dobby, jacquard, treadle loom, power loom, spring-beard needle, knitting, and the like.

In some other embodiments, one may prepare during the interweaving process, or during the matrix casting process, a zone in which a subset of fibers are solidary, said zone being not mechanically bonded to the rest of the device. Thus, by moving said zone, it is possible to move simultaneously said subset of fibers, which are preferably movable fibers, within, or out of the rest of the device.

It is also an object of the invention to propose methods to prepare components, chips and devices of the invention, methods without which many embodiments of the invention would not have been possible to make, or would not have had the same advantages. In particular, methods of the invention provide ways, not known in the art, for preparing in a fluidic device channels with well-defined sections and architectures, and without the need for microfabrication.

The invention may also use various means for combining textile and a matrix, in order to achieve the objective of embedding said textile in the matrix, and/or creating between said textile and said matrix mechanical cohesion, while allowing the possibility, unknown in the prior art, of having an open or partly open channel embedded in said matrix.

In some embodiments, said means may involve methods already known in the art for the enduction of textiles, such as spraying, painting, direct coating, transfer coating, online coating, melt coating, calendering, rolling, lamination, printing, screen printing.

In spraying, the matrix precursor material is deposited on the textile as a spray of droplets that coalesce, wet the textile to create a continuous layer, and then harden in place.

By painting, the matrix precursor material is deposited on the textile by a brush or a roll, wets the textile to create a continuous layer, and then hardens in place.

In direct coating, a coating paste is directly applied to the fabric.

In transfer coating, a coating paste is applied to the fabric via a carrier. The carrier can be a textile, a felt, a knitted fabric, another film or paper.

In some preferred embodiments, particularly interesting in combination with transfer coating, or with coating by printing or screen printing, matrix precursor material is transferred onto the textile in a patterned way, covering only some parts of the textile.

With online coating the open fabric is dipped in a coating bath containing the coating paste, for instance once it comes off the loom.

For melt coating one uses a film of a precursor material, which is then laminated onto a carrier, from which it is then transferred to the textile by transfer coating.

Lamination consists in pressing said textile with at least one film, optionally with more than one films, in order to transfer said film, or some component initially born on the surface of said film, onto said textile.

In some other embodiments, said film comprises a support, which bears on its surface the material of the matrix. During lamination, said material of the surface is in a fluid form and can thus be intimately bonded into said textile, in order to embed it.

In some embodiments, said support is removed from the device after embedding of the textile in the matrix precursor material.

In some other embodiments, said support is not removed, and is retained as an external layer of the device.

Support fibers or mobile fibers used in the invention are advantageously treated prior to their integration in the device, in order to impart to them some properties or combination of properties. Said treatment may be any kind of treatment, chemical, physical or biological. Treatment of fibers is indeed an important aspect of the know-how in the textile industry, and said know how can advantageously be put to work within the invention.

Also, fibers and textiles in the invention may not be treated uniformly along their length or surface. In some advantageous embodiments, said treatment imparts along the length of a fiber, or across the surface or volume of a textile, different zones with different properties.

This can be advantageous for different means. For instance, a movable fiber may be treated in order to make it adhesive to the matrix in some places, and non adherent in some other places. Such fibers may be interesting to deform the device by pulling on the non adherent side.

A movable fiber may also be treated in order to graft onto it some ligands, catalysts or reagents, at specific locations. Different ligands, catalysts or reagents can be grafted in different places, providing a possibility to implement multiplexing, or complex processes.

Textile fibers may also be treated differently in different places. This can be useful, for instance to make the textile adherent to a matrix in some places, and not adherent in some other places. Such non-adherent parts can in turn be useful to anticipate in a device a port, or a positioning mark, or a zone for cutting of the textile to separate different devices, in a parallel production process.

In other embodiments, this can be useful in order to create locally some wicking pads or some wicking paths, in order to bring in the device some reagents.

In other embodiments, this can be useful in order to create locally conductive, or magnetically active parts or paths.

In some preferred embodiments, a movable fiber may be directly integrated into the textile component during its preparation. These methods using movable fibers interwoven or entangled with textile may be interesting for several reasons. First the textile can impart to the chip additional mechanical properties, such as shear resistance and mechanical stability. Second, by interweaving or entangling the movable fiber with the support fibers, it is possible to guide the movable fibers, and optionally the channels if they are prepared from removable fibers, along well-defined and potentially complex paths, without any need for microfabrication means.

In some other embodiments, for instance in cases in which sophisticated textile fabrication tools are not available, or the number of devices needed does not justify their use, the movable fiber may be interwoven or entangled with said textile after a first step of preparation of the textile.

Methods of Use

It is also another object of the invention to provide methods taking advantage of devices of the invention.

In some embodiments, the method of the invention is a method for analysing any of biological, physical or chemical agents, wherein analysis is performed using a device of the invention. Said agents may be any of atoms, ions, molecules, macromolecules, molecular assemblies, living organisms, chemical or biological compounds, species or molecules or molecular assemblies or organelles issued from living organisms, microparticles, nanoparticles, explosives, chemicals, gases, toxins, drugs, nucleic acids, polypeptides, metabolites, drugs, polysaccharides, proteoglycans.

In some other embodiments, the method is a method of monitoring any of a process, an environment, a living species, a patient, wherein monitoring is performed using a device of the invention In some other embodiments, the method is a method for producing a product, wherein said production is performed using at least one device of the invention In some other embodiments, the method is a method for discovering a drug or an active product, wherein said discovery is performed using at least one device of the invention In some other embodiments, the method is a method for testing a drug or an active product, wherein said test is performed using at least one device of the invention In some preferred embodiments, the method is a method for cultivating cells, or tissues, or organs, or organisms, or parts of tissues, organs or organisms.

In some preferred embodiments, said cells comprise stem cells, or dedifferentiated cells, or iPSCs pluripotent cells.

In some other embodiments, the method is a method for discovering a drug or an active product, wherein said discovery is performed using at least one device of the invention In some other embodiments, the method is a method for testing a drug or an active product, wherein said test is performed using at least one device of the invention.

Textiles presenting different percentages of fiber coverage at different places of its area may be used advantageously to cultivate cells: for example, cell culture chambers may be designed in areas of zero or low fiber coverage.

Kits:

The invention is also directed to a kit for making a fluidic instrument, said kit comprising at least:
- a fluidic device as above disclosed, and
- at least one component selected among:
  - a fluid,
  - a chemical product or a biological product,
  - a disposable fluidic component.

The kit is a collection of parts, generally disposable parts, or consumable parts, that can be inserted in a fluidic instrument, and are appropriate for the uses and methods that have been above disclosed.

Notably, the kit can comprise a fluid that can be introduced into the fluidic network. The fluid can be a solvent, like water, or an organic solvent, it can be an aqueous saline solution, a buffer, an oil, an emulsion (Oil-in-Water or Water-in-Oil), a dispersion. The fluid can be a solution of a chemical reactant in a solvent. Alternately, the kit can comprise solvents in a first conditioning, and reactants, of biological or chemical nature, in a separate conditioning.

Among reactants, one can mention any reactant of interest for making chemical reactions, colorants for observing fluidic flow in the fluidic network. One can also mention mediums appropriate for cells culturing, buffers, probes of any type, antibodies, antigens, proteins, peptides, fluorescent markers etc.

The kit can comprise several of these components, separate or combined. Reactants or fluids can be presented in any type of container, like for example a reservoir, a syringe, a cone. Chemicals can be grafted on a chip or located in the wells of a titration plate. Cells can be provided directly on a chip or in a micro titration plate.

Kits generally have the advantage of providing the components necessary for performing a reaction or a culture or any other type of experiment. Kits generally have the advantage of providing these components in amounts appropriate for achieving these reactions or cultures or experiments.

It will be convenient to further describe the invention with respect to the accompanying figures, which illustrate preferred embodiments of the fluidic system according to the present invention. Other embodiments of the invention are possible, and consequently, the particularity of the accompanying figures is not to be understood as superseding the generality of the preceding description of the invention.

FIGURES

Figure 18:
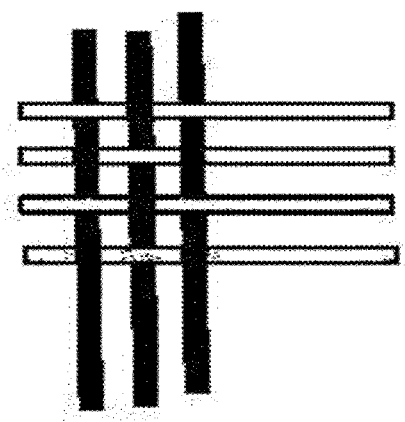
Figure 18:
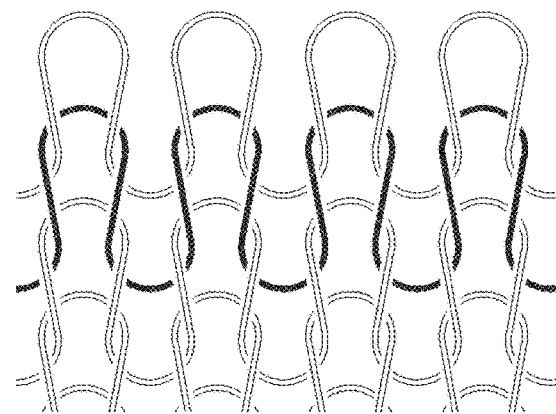
Figure 18:
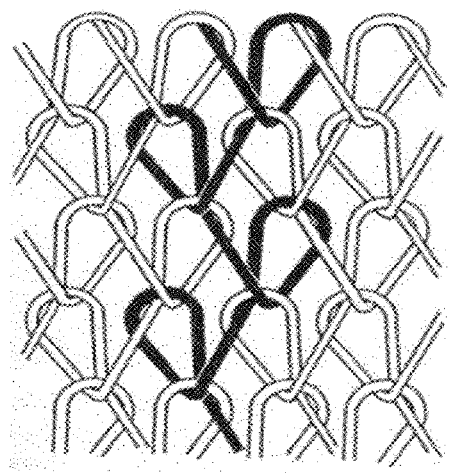
Figure 18:
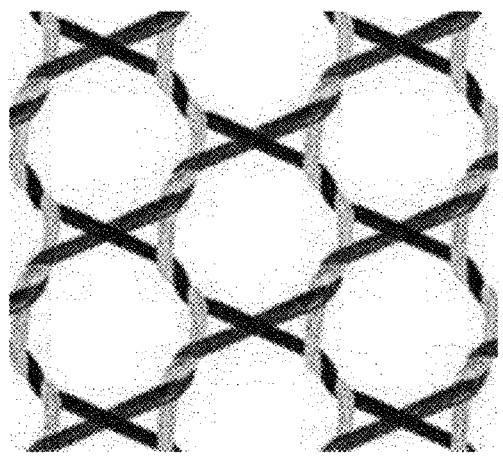

FIG. 18 A, B, C, D shows a few examples of structures of fibers entanglement that can be used in the invention.

Figure 19:
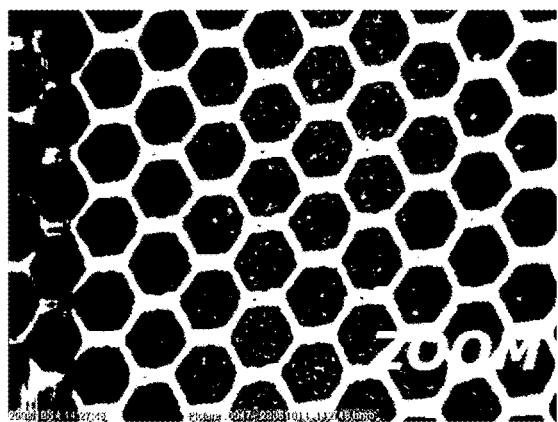
Figure 19:
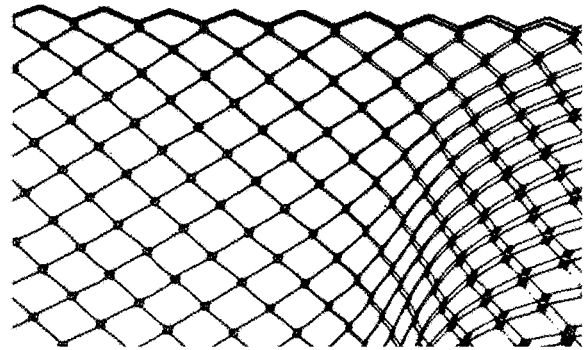
Figure 19:
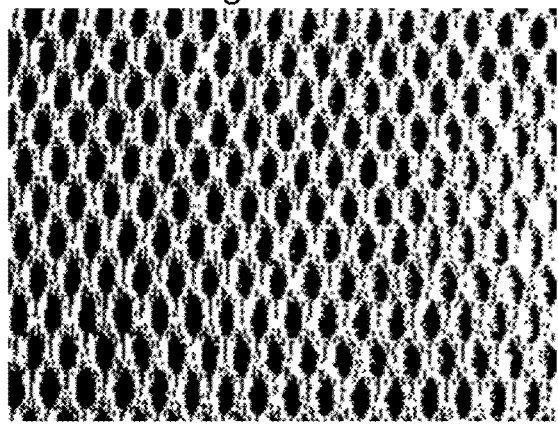
Figure 19:
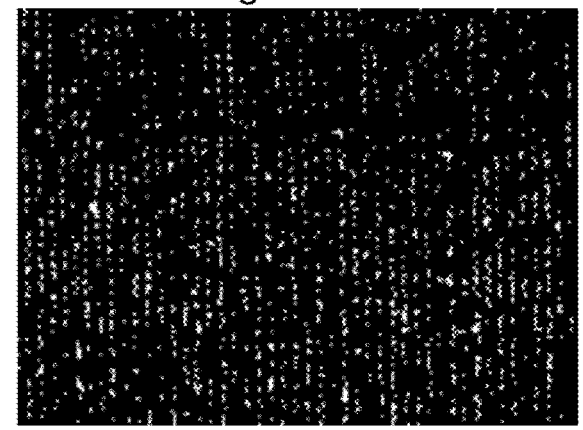
Figure 19:
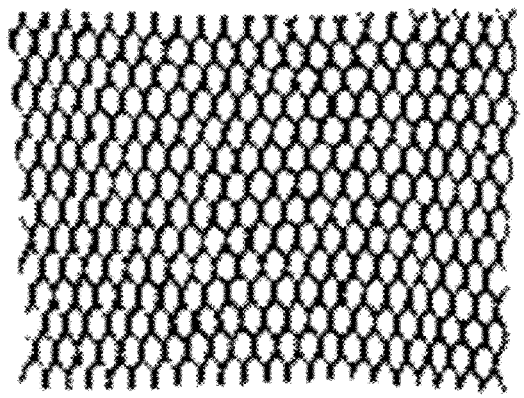
Figure 19:
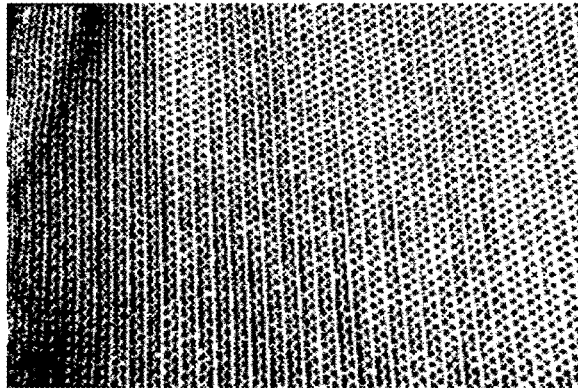
Figure 20:
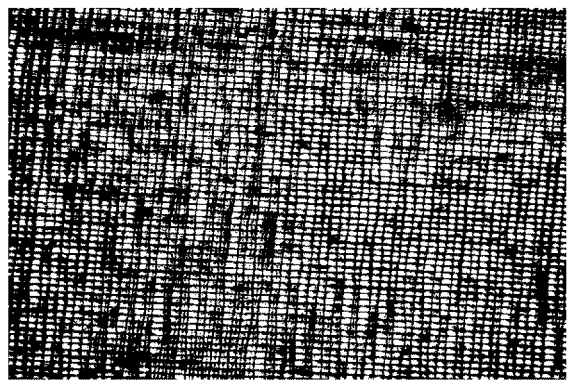
Figure 20:
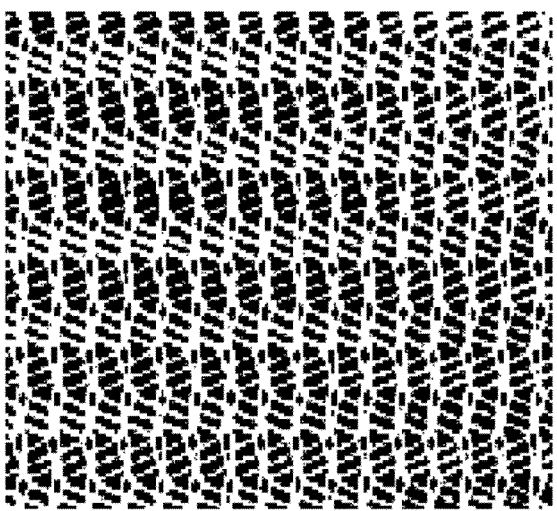
Figure 20:
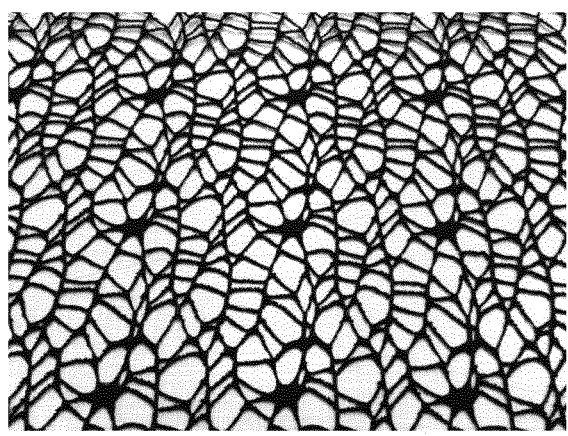
Figure 20:
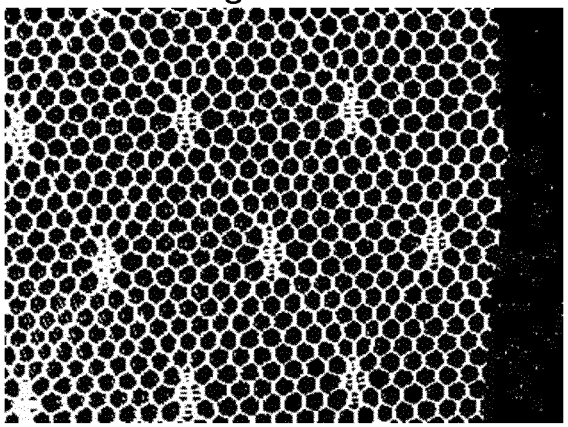
Figure 20:
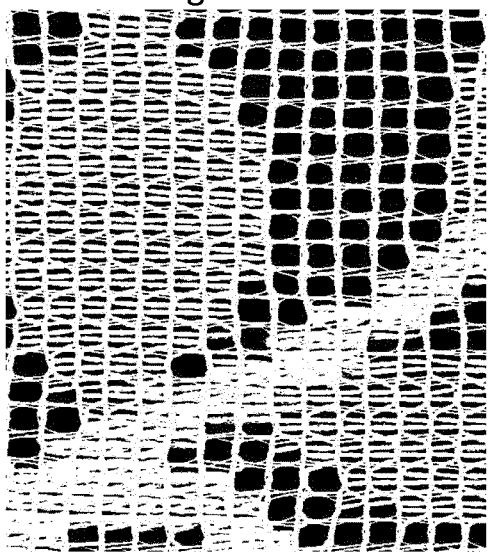

FIG. 19 A, B, C, D, E, F shows different examples of weaved or knitted textiles that can be used in the invention, with different percent coverages of fibers FIG. 20 A, B, C, D, E shows additional examples of textiles that can be used in the invention, with more complex patterns, and in particular with different percent coverage of fibers in different places.

In the figures, a same object is designated with a same reference on distinct figures.

EXPERIMENTAL PART

Example 1

Figure 1:
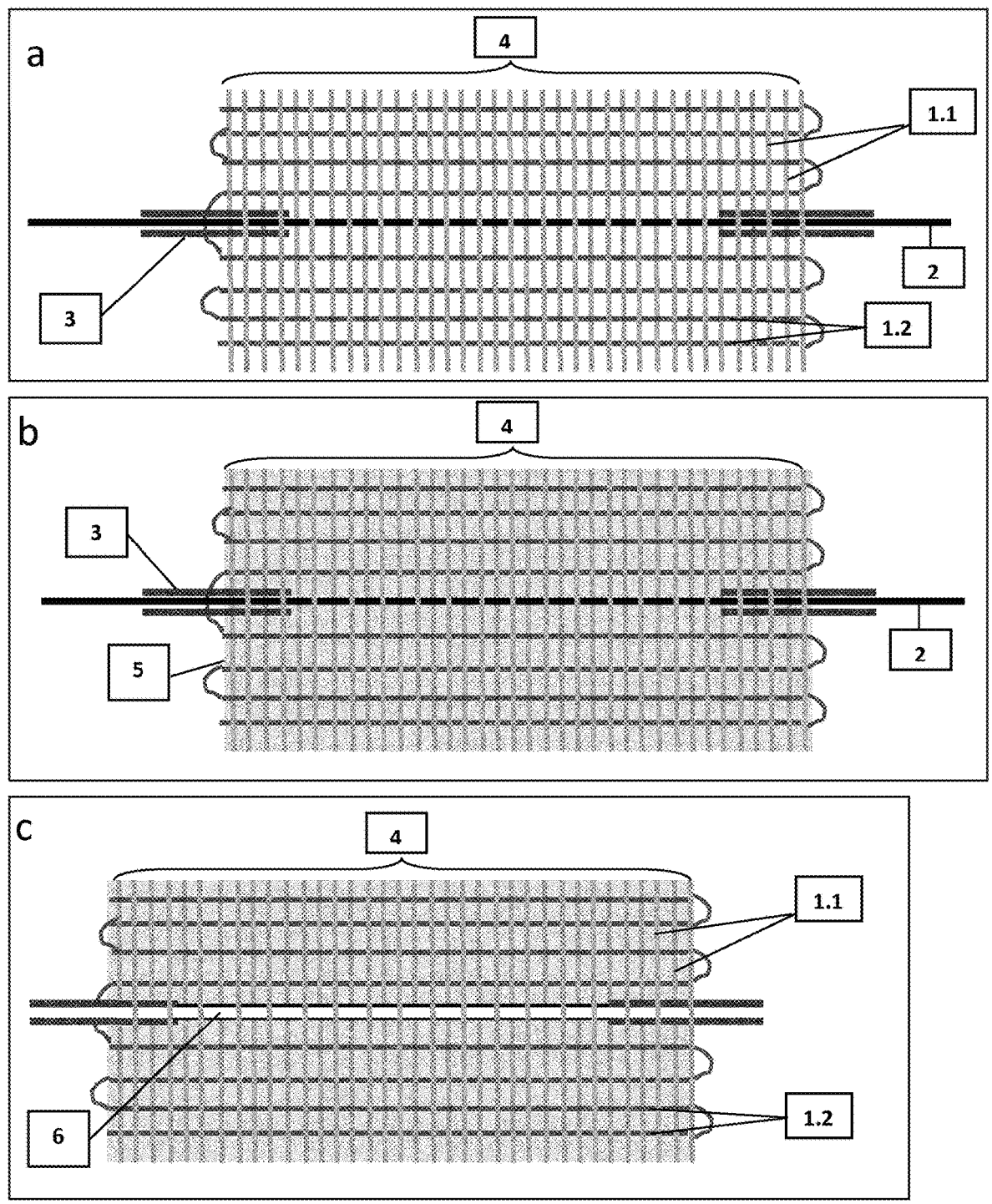
FIG. 1 shows a schematic fabrication protocol of a microfluidic chip according to the invention comprising a single straight microchannel.

The first example, shown in the FIG. 1, illustrates a fabrication method that can be employed to create a microfluidic chip of the invention, of the type of a loomed chip, containing one single microchannel with an axis that is straight on a large scale. First, a fabric [4] made with support fibers [1.1] is woven with a loom (Ashford, NZ).

Apart of the looming, a movable fiber [2] is inserted into two short silicone tubings [3].

This movable fiber is then inserted between the longitudinal support fibers (the weft) [1.2] of the fabric between two passages of the looming shuttle, as shown in FIG. 1a.

After completion of the looming, the fabric [4] is detached from the loom and immerged into a matrix precursor material [5]. The matrix wicks the support fibers and its spatial extension is limited to the fabric [4], as shown in FIG. 1b. The matrix precursor material is then solidified by an appropriate treatment (heat, UV, etc.). A device is obtained which comprises a solid matrix [5], a fabric [4] embedded in the matrix [5], a movable fiber [2] parallel to one axis of the fabric [4], the extremities of said moveable fiber [2] being inserted into two short silicone tubings [3]. The short silicone tubings [3] themselves are partly inserted in the fabric.

To obtain a microchannel [6] inside the matrix-embedded fabric [4], the movable fiber [2] is retrieved from the fabric as shown in the FIG. 1c. The microfluidic chip is then cut from the whole fabric.

The global path of the microchannel [6] is straight. However, depending on the relative rigidity of the movable fiber [2] and of the support fibers [1.1] and [1.2], and depending also on the tension in the fibers during the looming, on a more local scale, due to the interweaving of the movable fiber [2] and the support fibers [1.1] and [1.2], the path of the movable fiber may comprise more or less pronounced wiggles, which may render the axis of the channel prepared after removal of the movable fiber non-linear on a local scale.

Figure 2:
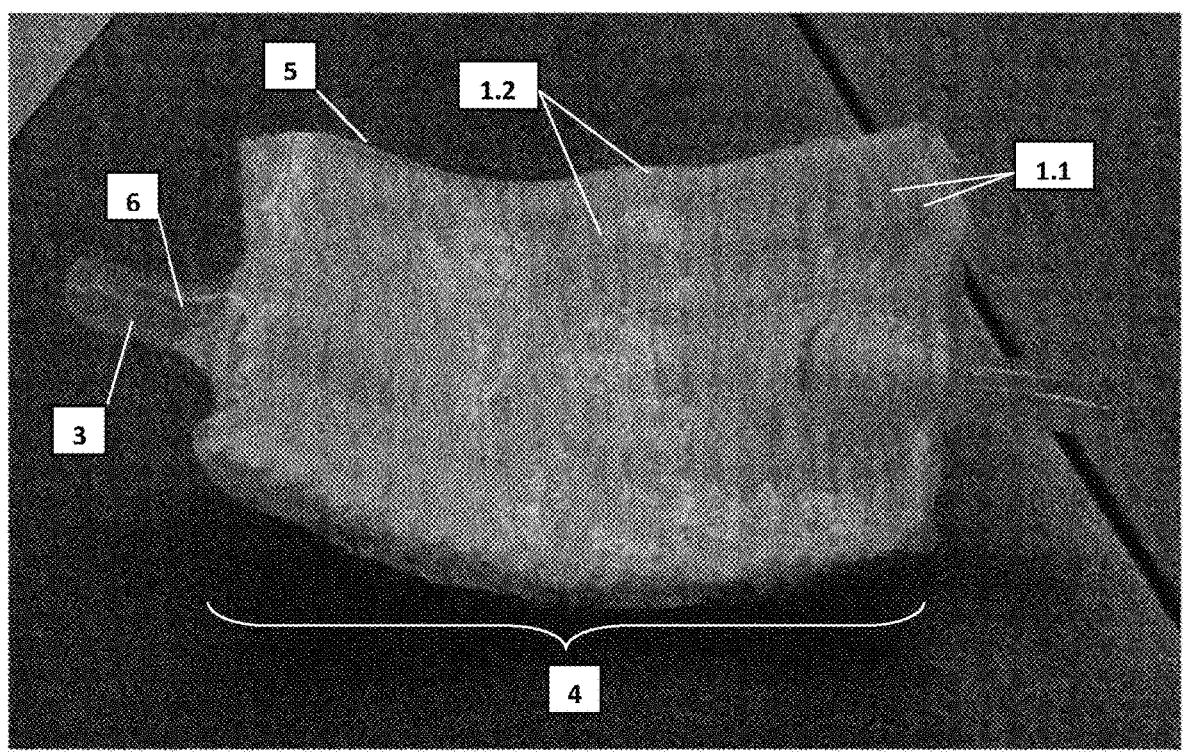
FIG. 2 shows a picture of a microfluidic chip resulting from the protocol schematized in FIG. 1.

FIG. 2 shows an embodiment of a device (microfluidic chip) of the invention, prepared by the method described above. For this example, the support fibers [1.1] and [1.2] are white cotton threads (n° 7, Phildar, FR). The movable fiber [2] is a fluorocarbon monofilament fishing line (Varivas Super Tippet, 3X, Morris Co, JP) with a 200 µm diameter. The matrix precursor material [5] is a 10:1 mix of polydimethylsiloxane (PDMS) base and curing reagent (Sylgard 184, Dow Corning, USA). The fabric [4] is immerged into a fresh mix of base and curing reagent, then put under a vacuum belt for 1 hour, and then suspended in an oven at 65° C. for 5 h. Short silicone tubings [3] are inserted in two sides of the fabric [4]. The microchannel [6] has its extremities in those silicone tubings [3].

Example 2

Figure 3:
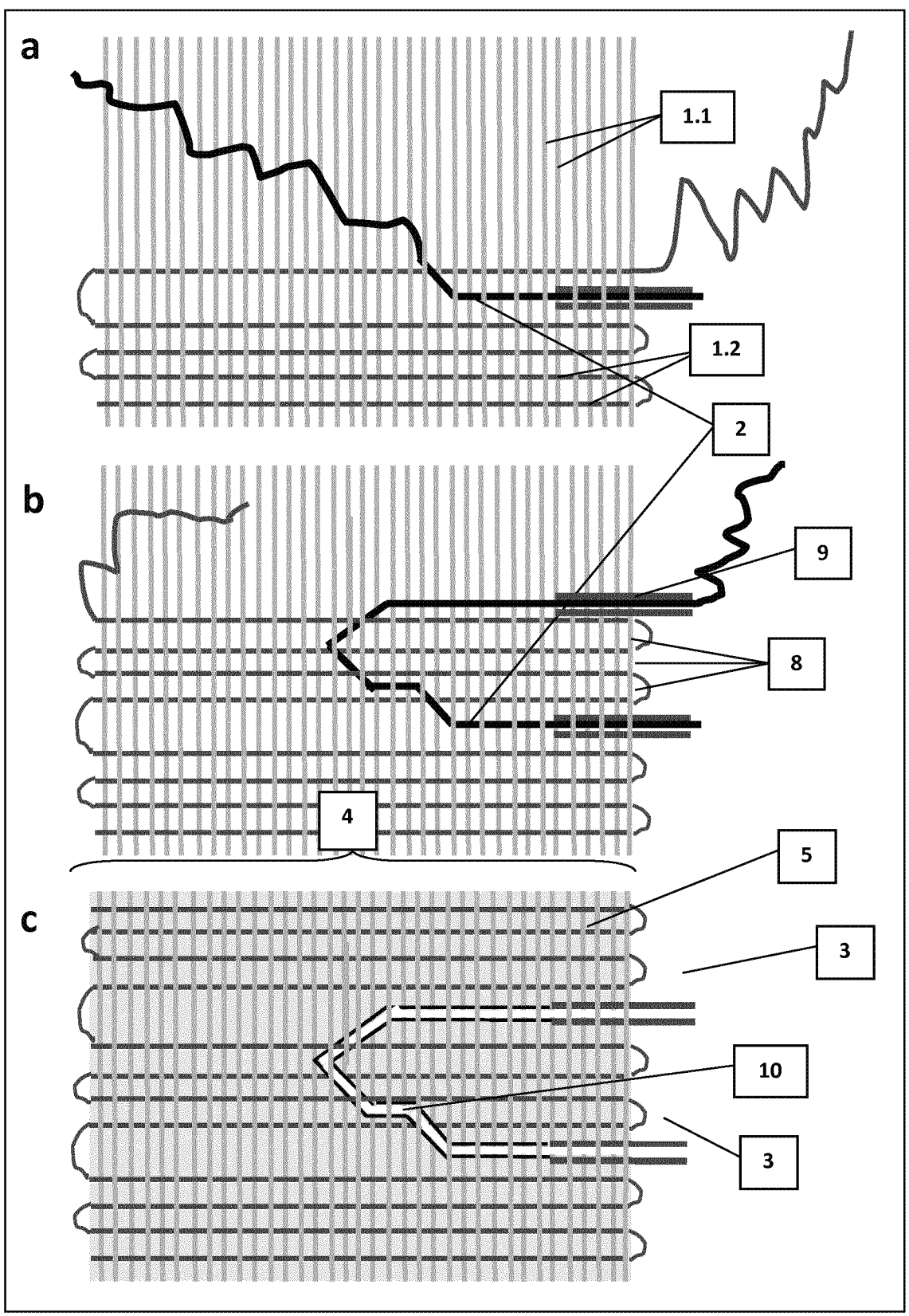
FIG. 3 shows a schematic illustration and the fabrication protocol of a microfluidic chip according to the invention comprising a microchannel with a tortuous, non-linear axis.
Figure 4:
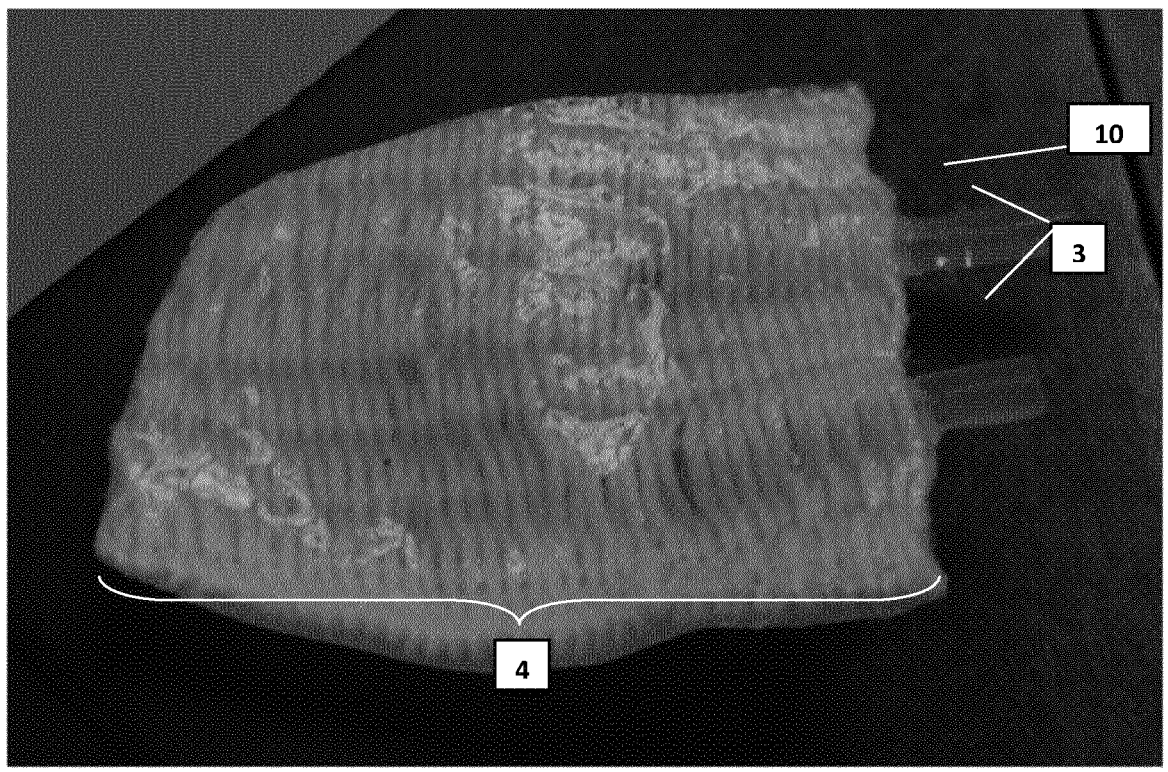
FIG. 4 shows a picture of a microfluidic chip according to the invention comprising a curved microchannel presenting an axis that rotates by 180°

This second exemplary embodiment of the invention illustrates the possibility to create a microfluidic chip with a design of microchannels presenting a predefined, non-linear, path, on a large scale. The principle of fabrication is shown in the FIG. 3 and FIG. 4. It remains identical to the one described on the first example, except that entangling of the movable fiber [2] with the support fibers [1.1] and [1.2] is performed in two steps. During the picking, the movable fiber [2] doesn't go through the entire shed as shown in FIG. 3a. FIG. 3b shows that the movable [2] fiber is partially reintroduced into the next sheds [8], until it reaches one extremity of the fabric [9]. Of course this process can be performed manually, or in an automated manner, using machines of the textile industry such as Jacquard loom. After impregnation with a matrix precursor material [5], matrix solidification and retrieval of the movable fiber [2], the microchannel [10] has a path that folds back by 180°, as shown in FIG. 3c. Two ports [3] are located at the extremities of the microchannel [10], parallel to an axis of the fabric [4]. The ports are constituted of silicon tubings coaxial with the extremities of channel [10]. FIG. 4 shows an embodiment of a device prepared by this method. This chip also comprises two ports [3] parallel to an axis of the fabric [4], constituted by silicon tubings coaxial with the extremities of channel [10].

Example 3

The third example illustrates the ability to control the flow rate of liquid flowing in a microchannel [6] created with the protocol of example 1. For this embodiment, the matrix [5] has elastic properties and the support fibers [1.1] and [1.2] are deformable. When the microfluidic chip is folded perpendicularly to the direction defined by the microchannel [6] central axis, the channel is pinched. This pinching out increases the hydrodynamic resistance of the microchannel. The dashed line [12] in FIGS. 5, 6 and 7 corresponds to the microfluidic chip folding line.

Figure 5:
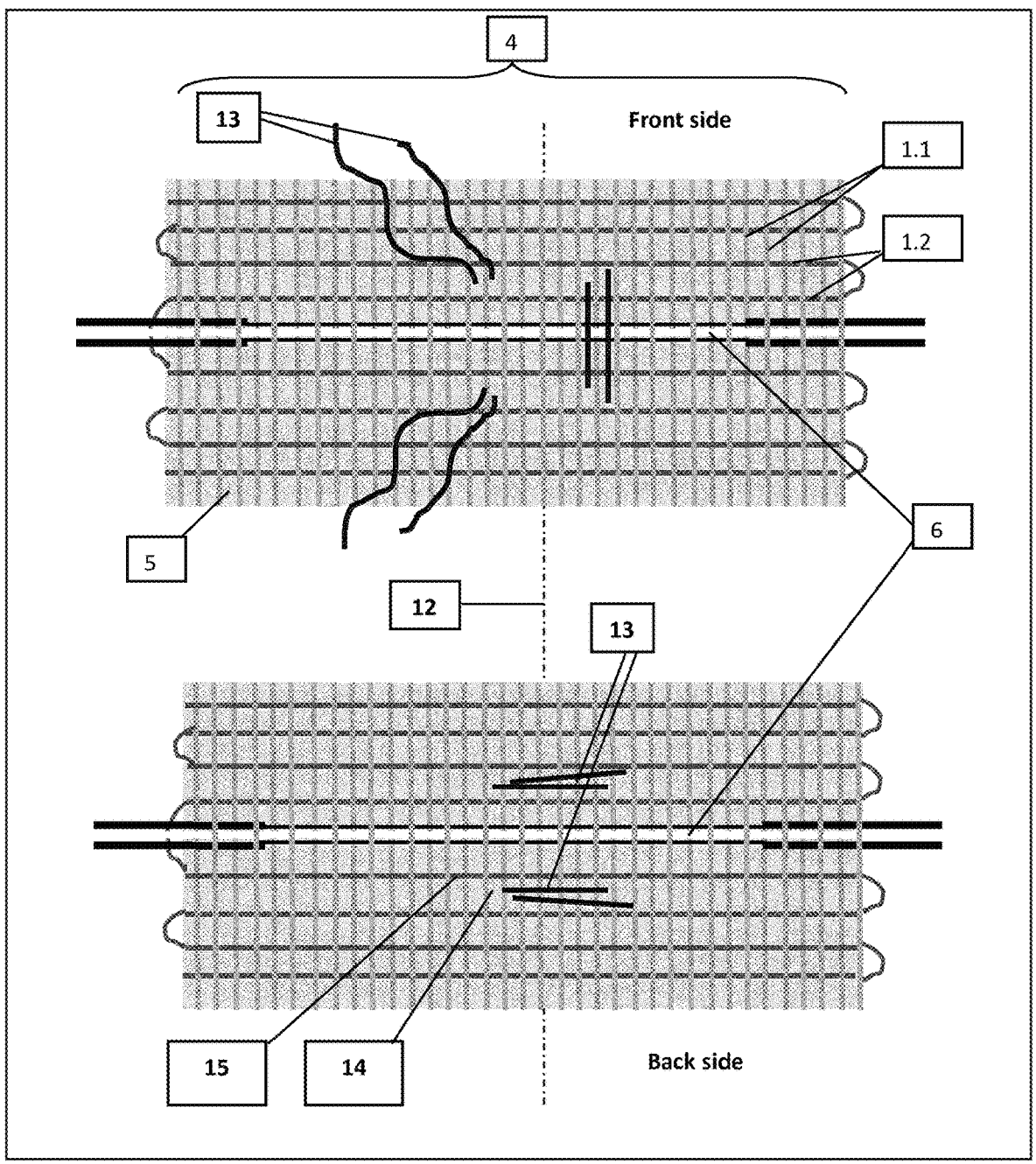
FIG. 5 shows a schematic illustration of a microfluidic chip with an integrated "folding valve".
Figure 6:
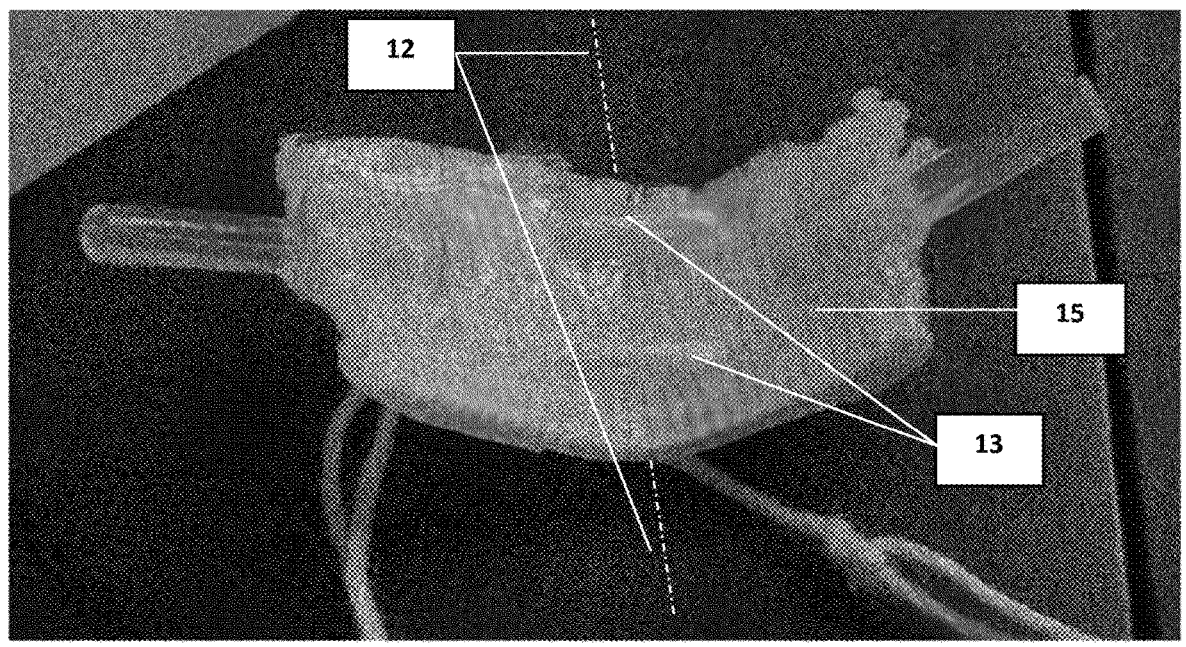
FIG. 6 shows a picture of a microfluidic chip with a "folding valve" in an open position.
Figure 7:
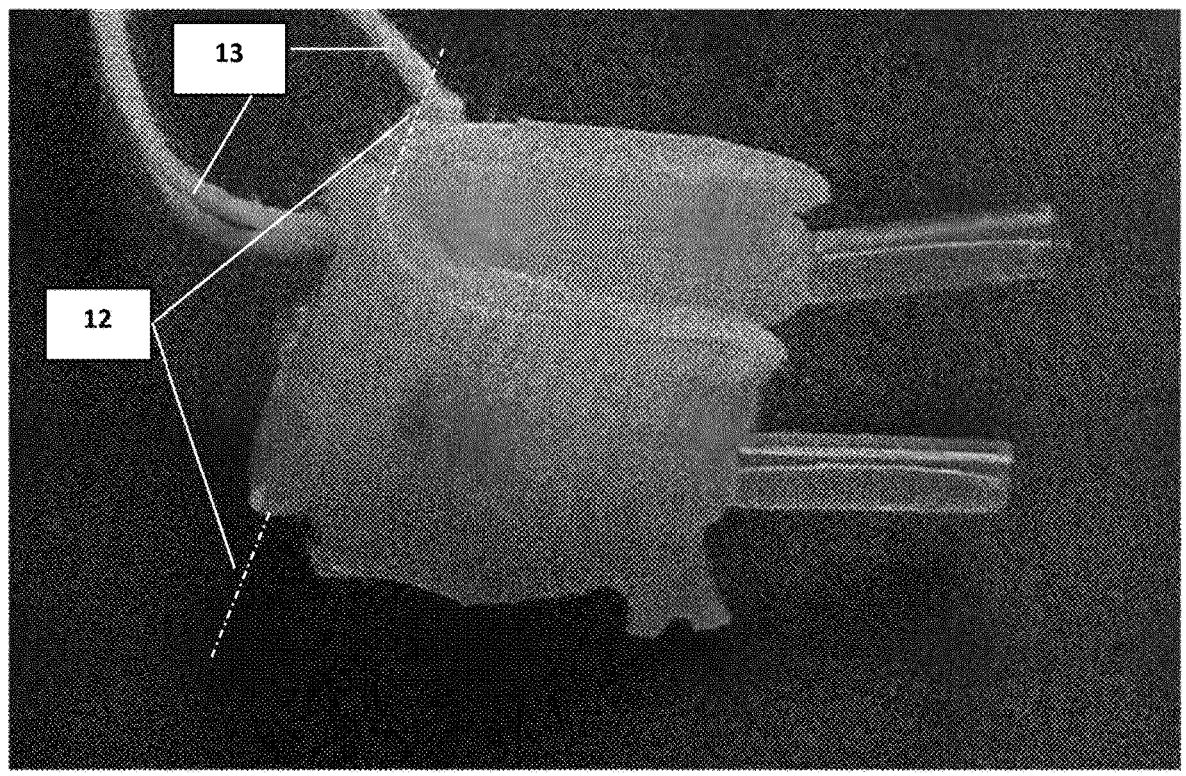
FIG. 7 shows a picture of a microfluidic chip with a "folding valve" in a closed position.

To control the folding and the unfolding of the microfluidic chip, two additional actionable fibers [13] are sewn in the fabric [4] after the matrix curing, polymerization, or hardening, as shown in FIGS. 5, 6 and 7. To keep the actionable fibers [13] from tearing the matrix [5] and the microchannel border, the actionable fibers [13] are sewn on a different mesh [14] than the microchannel [6]; a support fiber [15] is kept between the additional actionable fiber [13] and the microchannel [6]. Pulling on these actionable fibers [13] makes the fabric fold, as illustrated on the FIG. 6.

FIGS. 6 and 7 show the operation of the device. FIG. 6 shows the chip in the unfolded state, in which flow resistance in the channel is minimal ("open state"), whereas FIG. 7 shows the same system in a folded position, in which flow resistance in the channel is increased ("closed state"). The actionable fibers [13] are cotton threads, and the PDMS was chosen for its elasticity as a matrix material.

Figure 8:
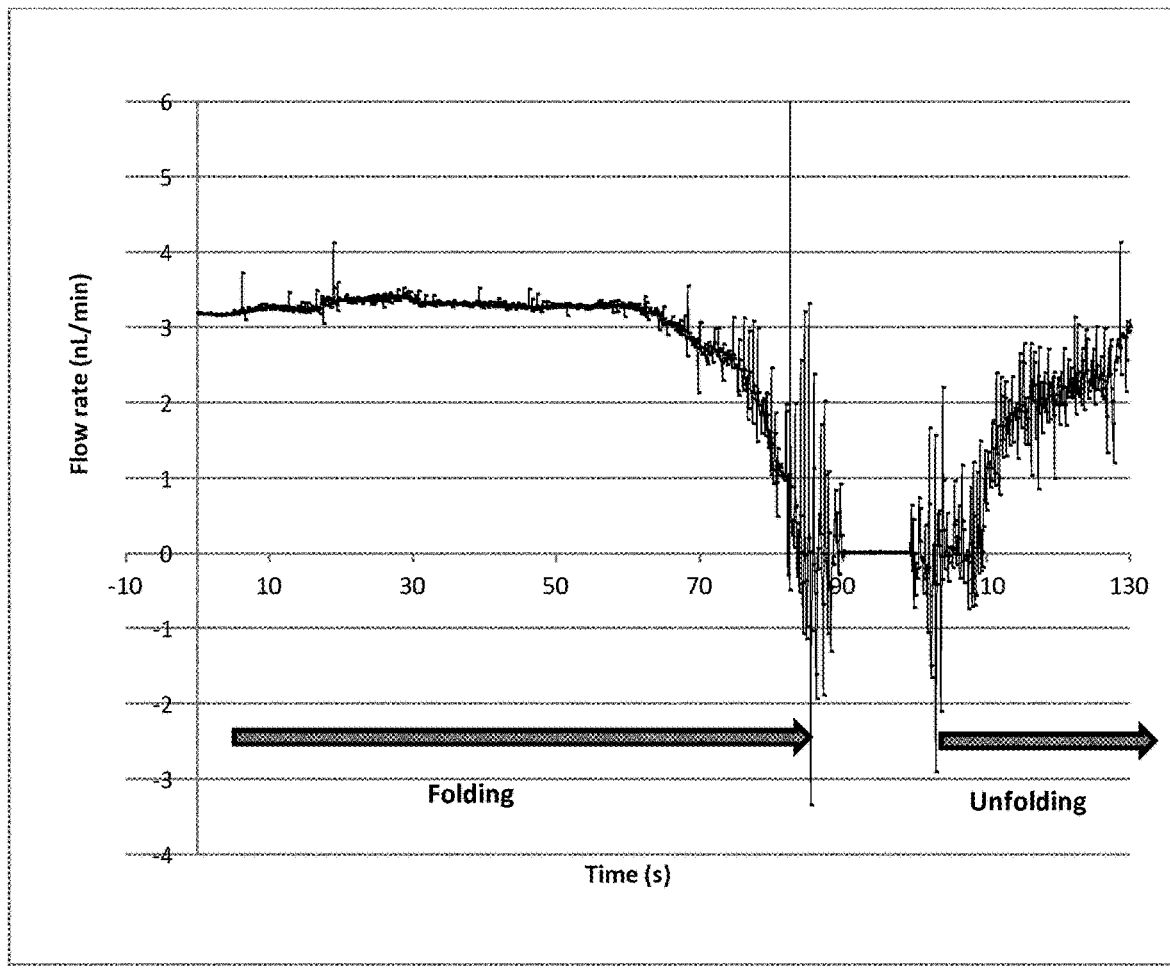
FIG. 8 shows an experimental chart, describing the variation of flow rate inside a microchannel of the microfluidic chip described in the FIG. 5 during a test of a "folding valve".

FIG. 8 illustrates the decrease (respectively the increase) of the water flow rate inside the microchannel, at constant pressure (20 mbars), when the microfluidic chip is slowly folded (respectively unfolded). In the folded state, flow rate decreases to zero within experimental error, showing the efficiency of the invention in creating integrated valves.

Example 4

Figure 9:
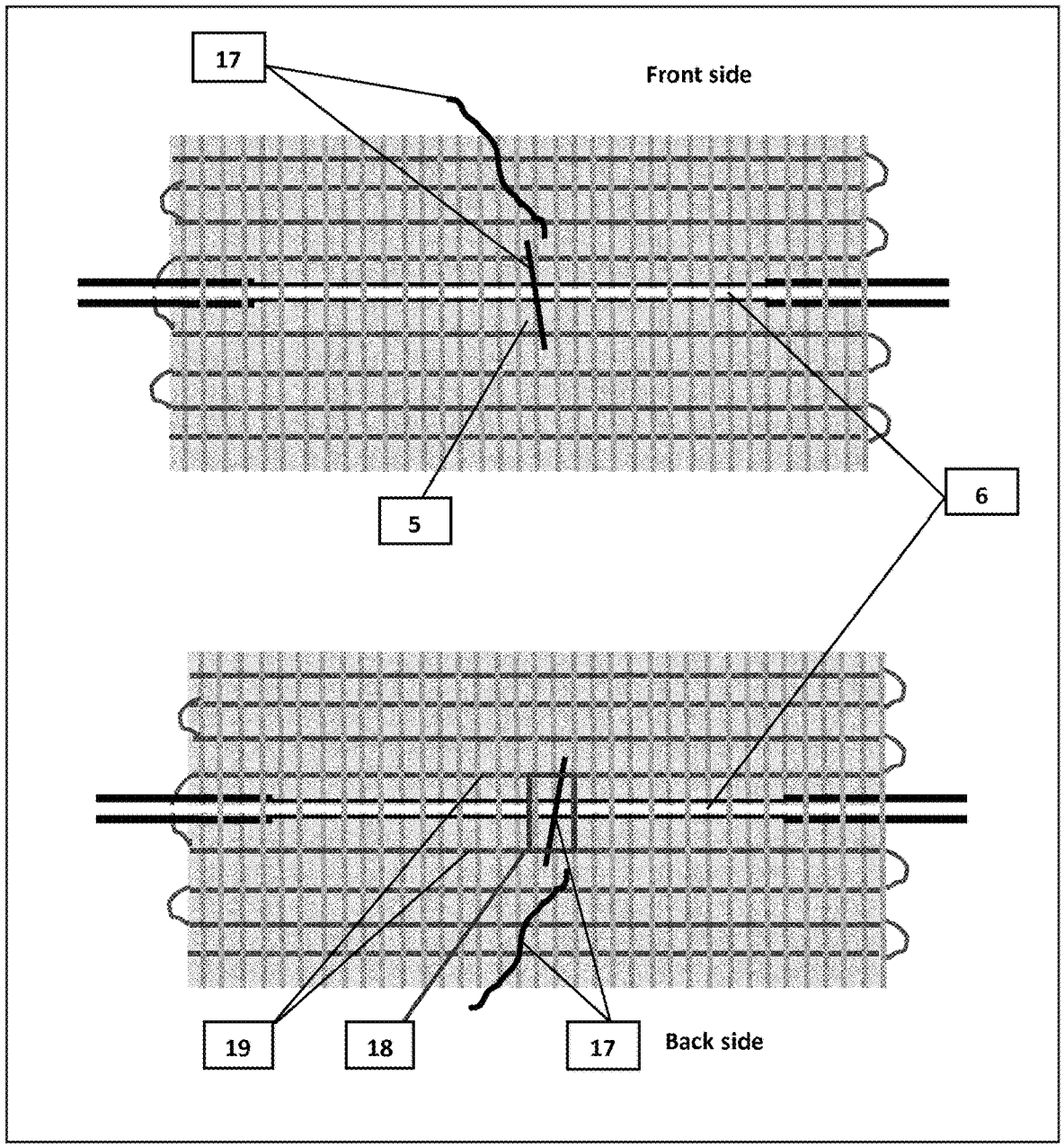
FIG. 9 shows a schematic illustration of a microfluidic chip with an integrated pinch-valve.
Figure 10:
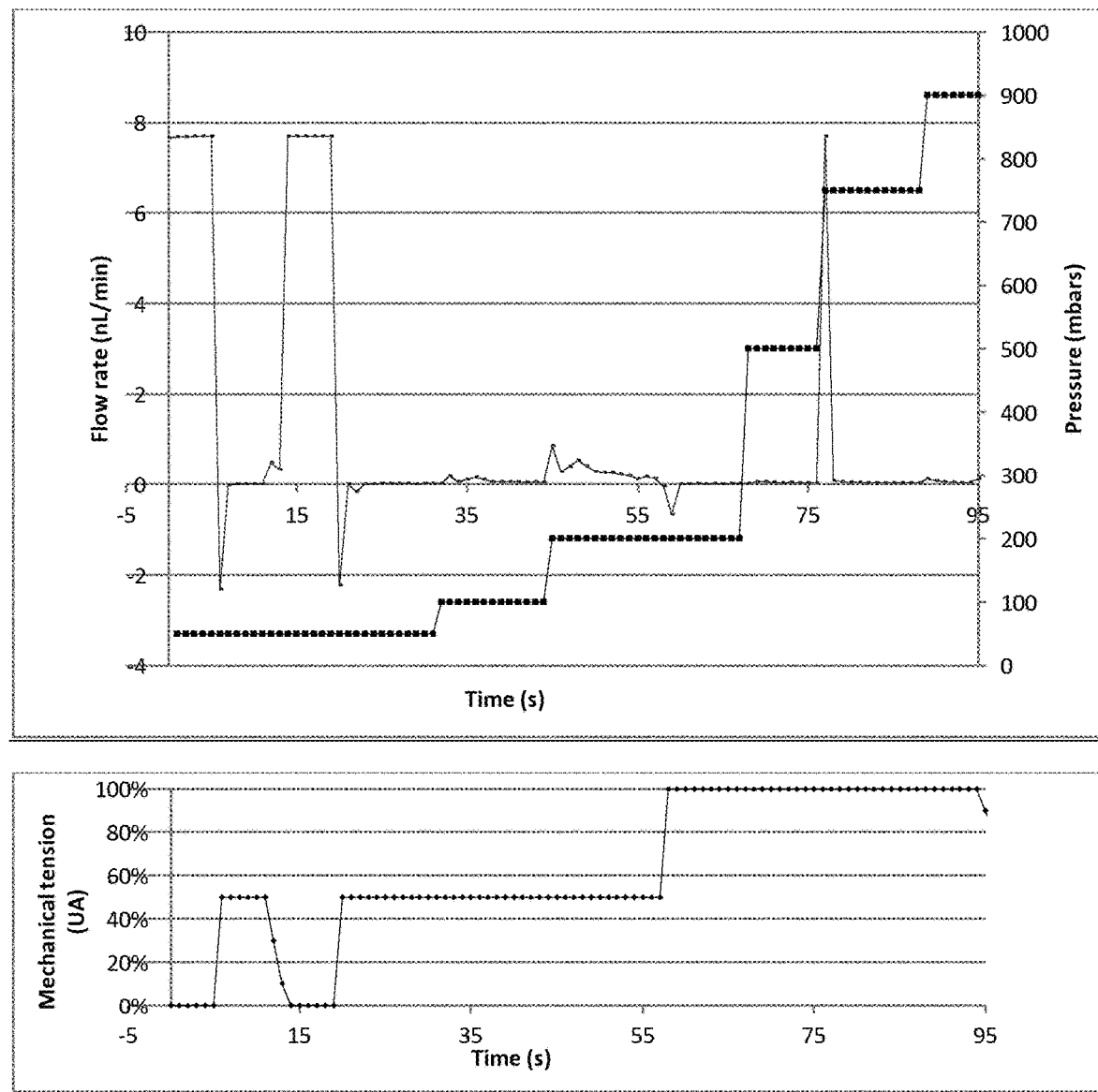
FIG. 10 shows an experimental chart, describing the variation of flow rate inside a microchannel of the microfluidic chip described in FIG. 9 during a test of a pinch-valve.

The fourth example illustrates another way to control the flow rate of liquid flowing into a microchannel [6] created with the example 1 protocol. After the matrix curing, polymerization, or hardening, an actionable fiber [17] is sewn in the fabric, as shown in FIG. 9. To keep the actionable fiber [17] from tearing the matrix [5] and the microchannel border, the actionable fiber [17] is sewn a different mesh [18] than the microchannel; a support fiber [19] is kept between the actionable fiber [17] and the microchannel [6]. Pulling on this actionable fiber [17] locally pinches the microchannel [6], without global deformation of the chip. This pinching increases the hydrodynamic resistance of the microchannel [6]. FIG. 10 illustrates the decrease (respectively the increase) of the flow rate of water inside the microchannel [6], when a cotton thread used as an actionable fiber [17] is pulled (respectively released). The upper graph shows the flow rate, in nl/mn (measured with apparatus Flowell, Fluigent, France) (thin line and left scale), and the applied pressure (thick line, right scale). Pressure is applied with a MFCS (Fluigent, France). The lower graph represents the mechanical tension applied to the movable fiber [17] pinching the channel [6] (in arbitrary units). When the tension is null, the fluid flows in the channel [6]. When tension is applied (e.g. at time 5 s), fluid flow is arrested, after a small backflow due to the change of volume of the channel [6]. When the tension is released (time 15 s), fluid flow returns to the initial value of 8 nl/mn, showing the full reversibility of the device. Following this, pressure is progressively increased. For maximal tension, event at a fluid pressure of 900 mbar, no flow occurs, showing the efficiency of the invention to create an integrated valve withstanding high operational pressures.

Example 5

Figure 11:
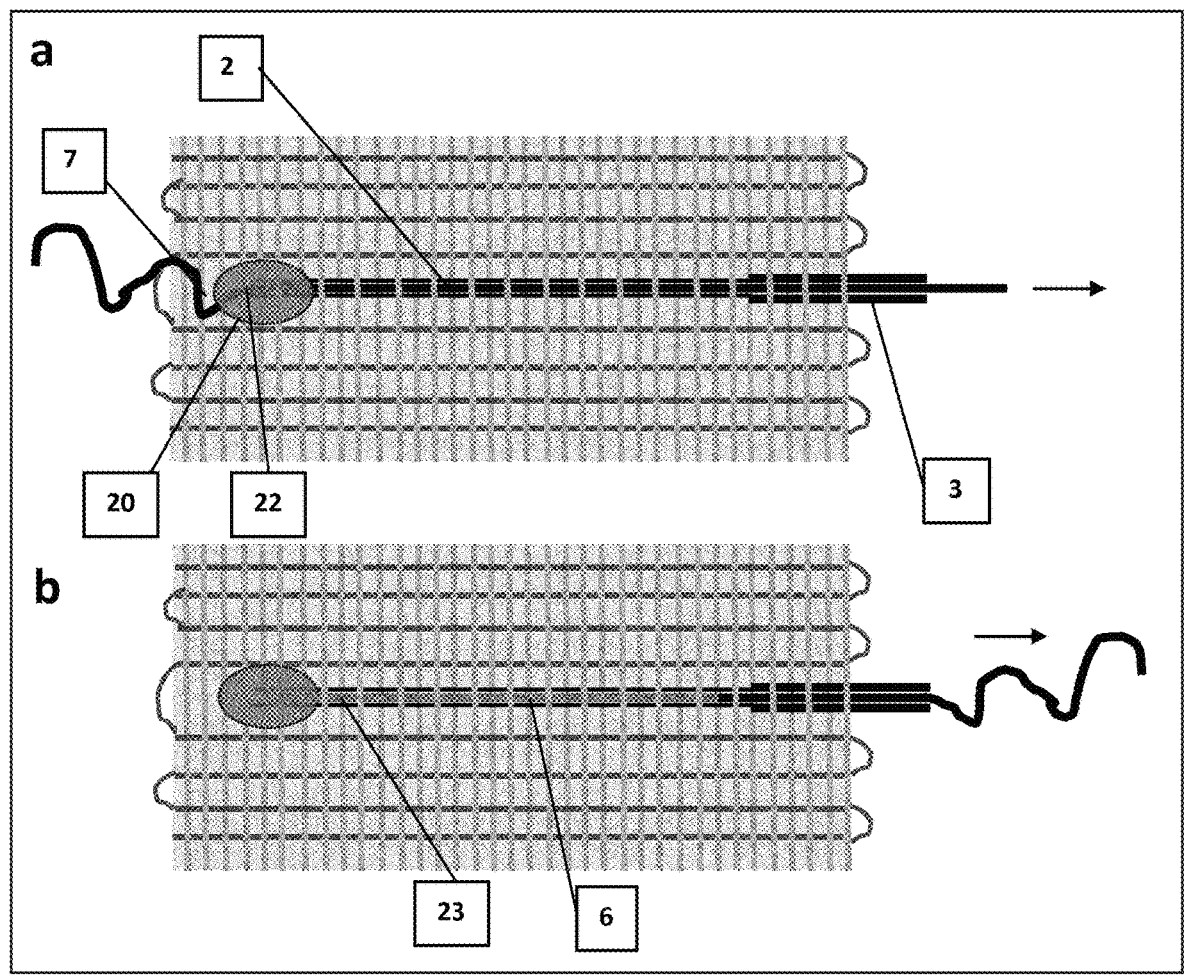
FIG. 11 shows a schematic illustration of the loading of a liquid in a channel within a chip of the invention through a port, by actuation of a fiber located inside the channel and acting as a pump.

The fifth example illustrates the possibility to fill a microfluidic channel [6] without any external syringe, pipette, pressure control or pump. The fabrication protocol remains identical to the one described in the first example, except that only one end of the movable fiber [2] is inserted into a silicone tubing [3]. The other end [7] is partially inserted into the shed during the picking. After the matrix hardening, curing or polymerization and before the movable fiber [2] removal, a drop [20] of colored water is deposited on the fabric, onto the port [22] where the movable fiber [2] exits the fabric, as shown in FIG. 11a. Then, the movable fiber [2] removal sucks [23] the liquid into the microchannel [6], thanks to a "syringe effect" (see FIG. 11b).

Example 6

Figure 12:
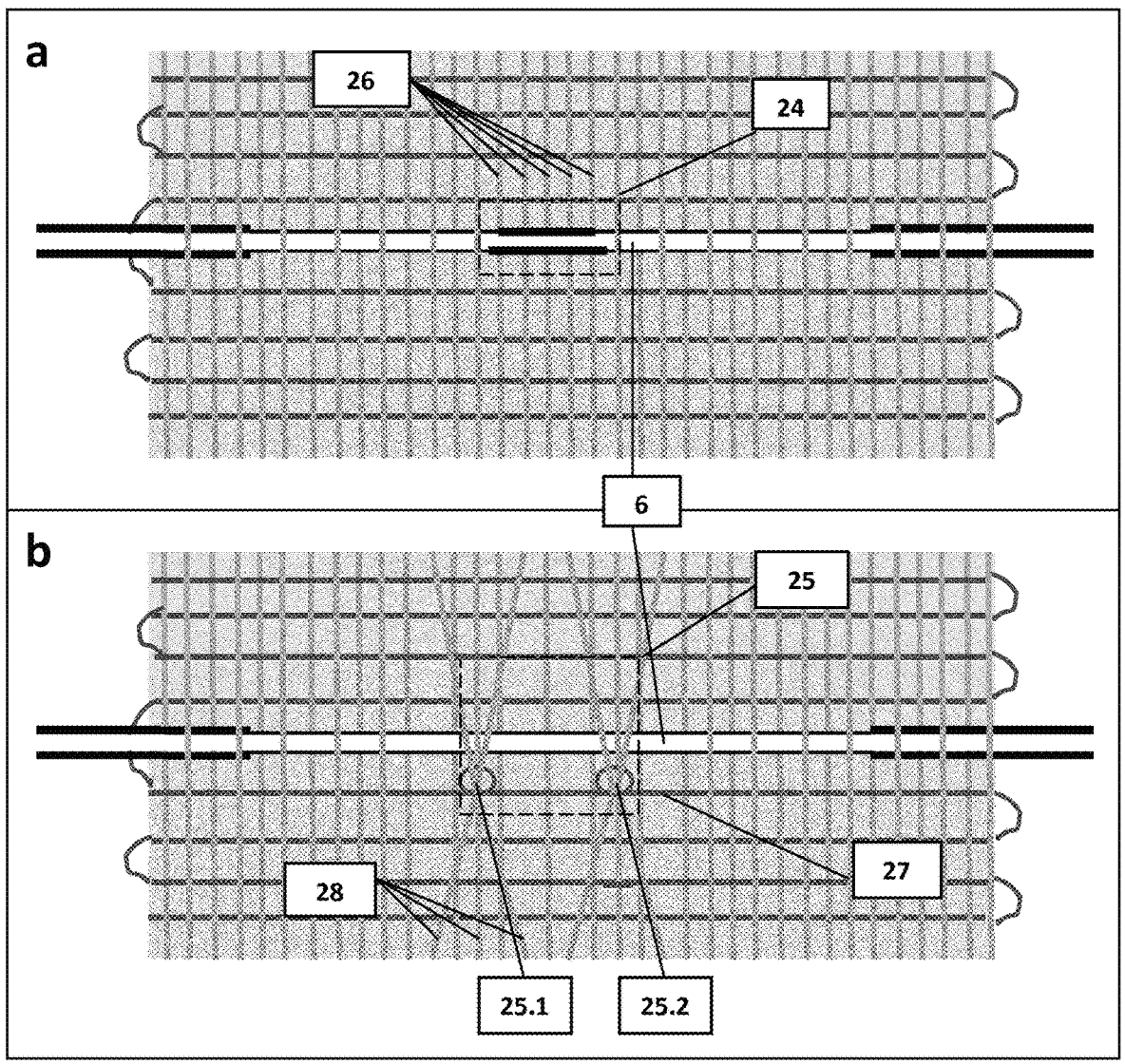
FIG. 12 shows two schematic illustrations of microfluidic chips of the invention with two different types of detection windows.
Figure 13:
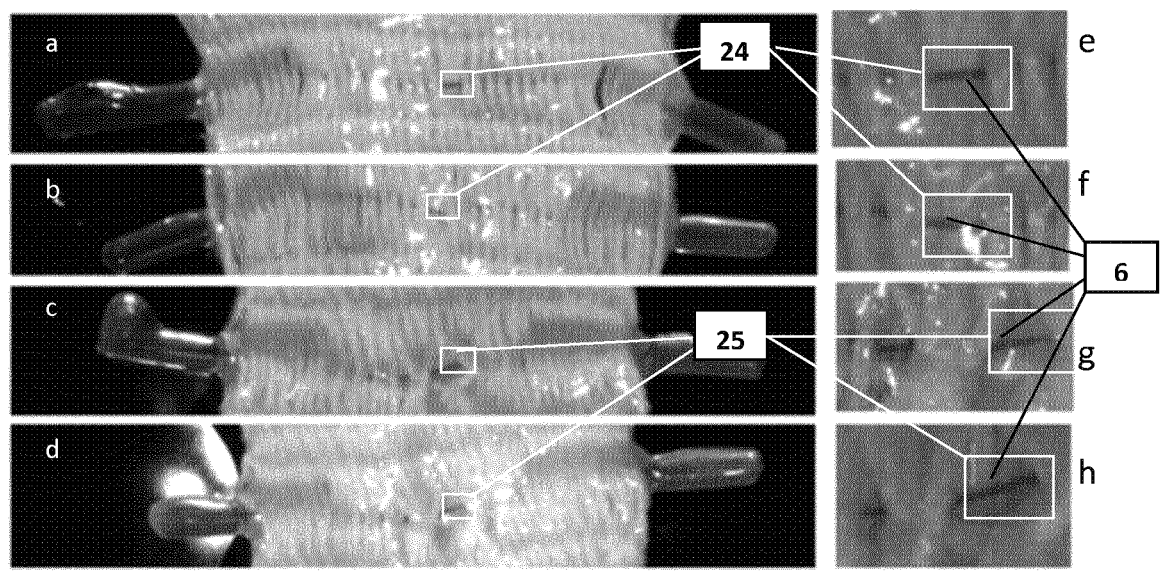
FIG. 13 shows four pictures of four different microfluidic chips with a detection window on each system, and a four zoomed picture on these detection windows.

The sixth example illustrates the possibility to have detection windows [24, 25] on the microfluidic chip of the invention, in order to visually check the content of the microchannel [6]. Two different designs are proposed: the first one is presented in the FIG. 12a and FIG. 13a,b,e,f. The second design is presented in the FIG. 12b and FIG. 13c,d,g,h. For the first design, the shed pattern is modified during the picking of the movable fiber, in order to avoid interweaving warp support fibers with the movable fiber on five consecutive passes [26], instead of interweaving at each pass, thus creating a window [24]. For the second design, the movable fiber is inserted normally during the picking phase of the looming. Then the next weft support fiber [27] is immediately inserted before the battening. This weft support fiber [27] is turned around two consecutives sets of 3 consecutives raised warp support fibers [28]. The space [25] created between the two knots [25.1], [25.2] is useful to see directly inside the microchannel [6]. In FIG. 13, showing photographs of actual realization of these embodiments, the microchannels [6] are filled with a colored solution to facilitate visualization.

Example 7

Figure 14:
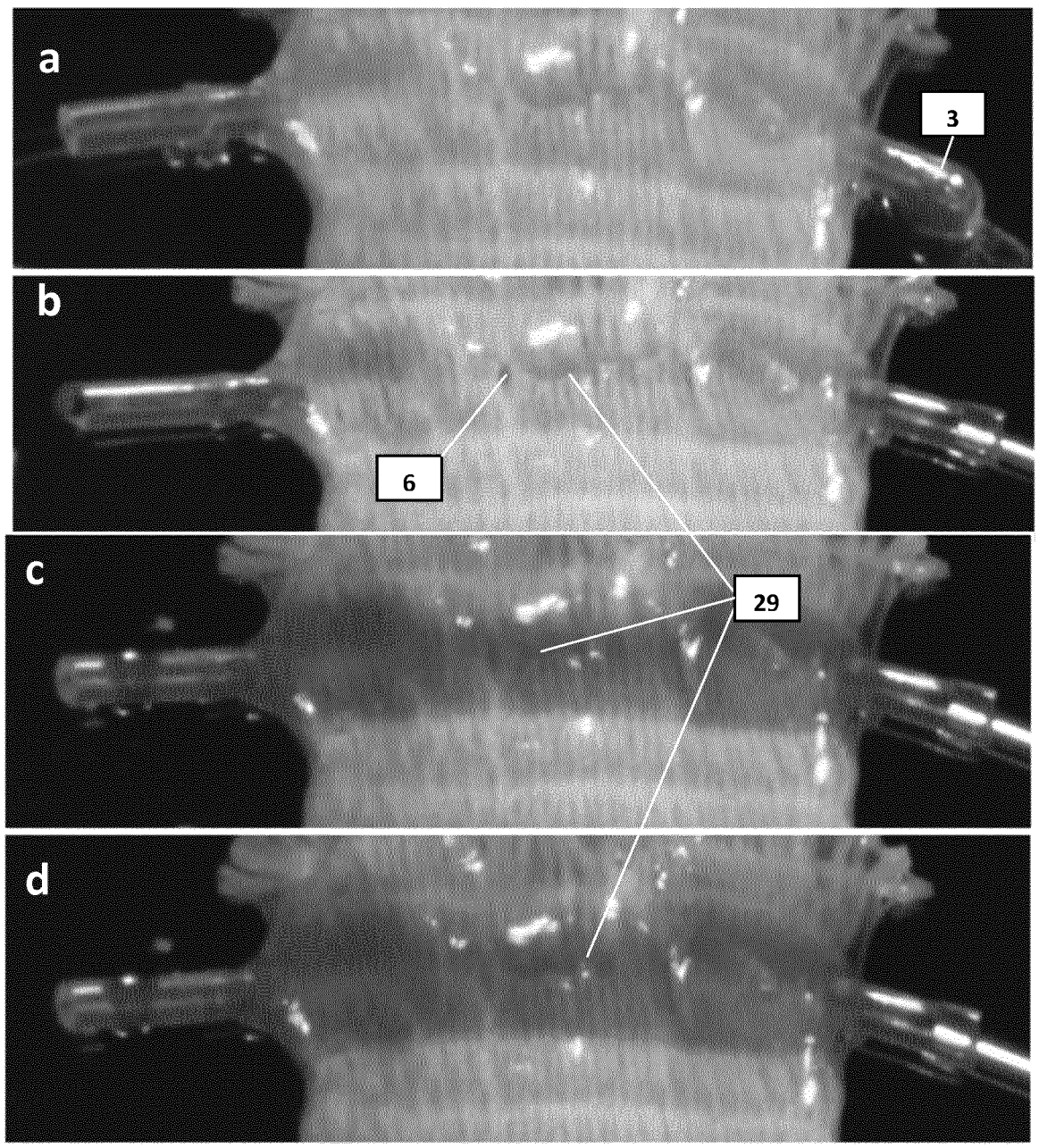
FIG. 14 shows four time-lapsed pictures of the same microfluidic chips based on a matrix made of the naturally sourced hydrogel material agarose, after colored water was loaded into the microchannel.

The seventh example illustrates the ability to use a hydrogel as a matrix. For this example, the PDMS used in previous examples is replaced with 4% agarose, as shown in FIG. 14a. A mix of 2 g of agarose (UltraPure Agarose, Invitrogen) and 50 µl of tap water is heat until agarose solubilization. The fabric is immersed rapidly into this bath of agarose before its gelling. The microfluidic chip is then left at room temperature for 20 minutes. The movable fiber is removed as in previous examples, creating a microchannel in the agarose, with an inlet and an outlet connected to the outside of the chip thanks to silicone tubings [3] protruding from the gel.

When a solution of colored water is pushed in the microchannel [6], the solution [29] follows first the microchannel, as shown in the FIG. 14b. As the injection continues, the solution diffuses slowly into the hydrogel matrix. FIG. 14b, 14c, 14d, taken with an interval of 5 minutes between each other, illustrate the time evolution of the dye in the gel.

Example 8

Figure 15:
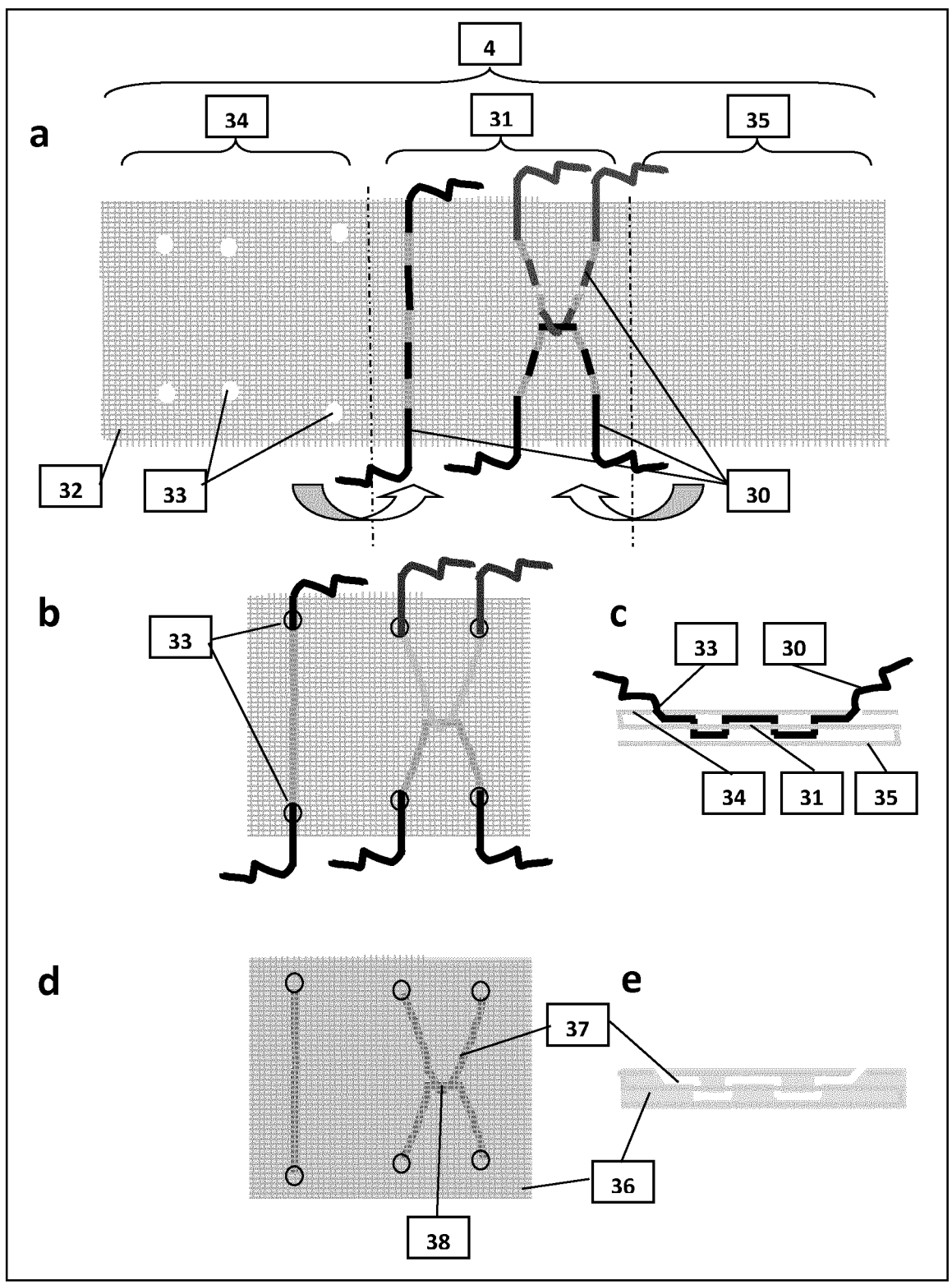
FIG. 15 shows another schematic fabrication protocol, allowing the preparation of interconnected channel networks, and channel networks in 3 dimensions

This example illustrates another fabrication method employed to create a microfluidic chip with tortuous and connected microchannels, and also illustrates the possibility to use the invention to create channel networks in 3D. This method is called for convenience a "sewn chip". First, movable fibers [30] are sewn into the central part [31] of a fabric [4] made with support fibers [32]. Holes [33] are punched in an adjacent part [34] of the fabric [4], as seen in FIG. 15 a. This part is then folded above the central part [31] of the fabric [4] and the ends of the movable fibers [30] are passed through the holes [33]. The last third of the fabric [35] is folded under the central part [31] as shown in the FIGS. 15 b and 15 c.

The fabric is then immersed into a matrix precursor material [36]. The matrix precursor material [36] wicks the support fibers [32] and its spatial extension is limited to the fabric [4]. The matrix precursor material [36] is hardened to a solid in a known manner.

To obtain a microchannel network [37] inside the matrix-impregnated fabric, the movable fibers [30] are retrieved from the fabric [4] as shown in FIGS. 15 d and 15 e.

An embodiment of the microfluidic chip was made with this protocol. For this example, the fabric used [4] is a microfiber sheet. The movable fiber [30] is a fluorocarbon monofilament fishing line (Varivas Super Tippet, 3X, Morris Co, JP) with a 200 µm diameter. The matrix precursor material used [36] is a 10:1 mix of polydimethylsiloxane (PDMS) base and curing reagent (Sylgard 184, Dow Corning, USA). The fabric [4] is immersed into a fresh mix of base and curing reagent, then put under a vacuum belt for 1 hour, and then suspended in an oven at 65° C. for 5 h. The microchannels created [37] are easily filled with a fluid by following the protocol of example 5 and the two crossing microchannels [38] are connected together.

Example 9

Figure 16:
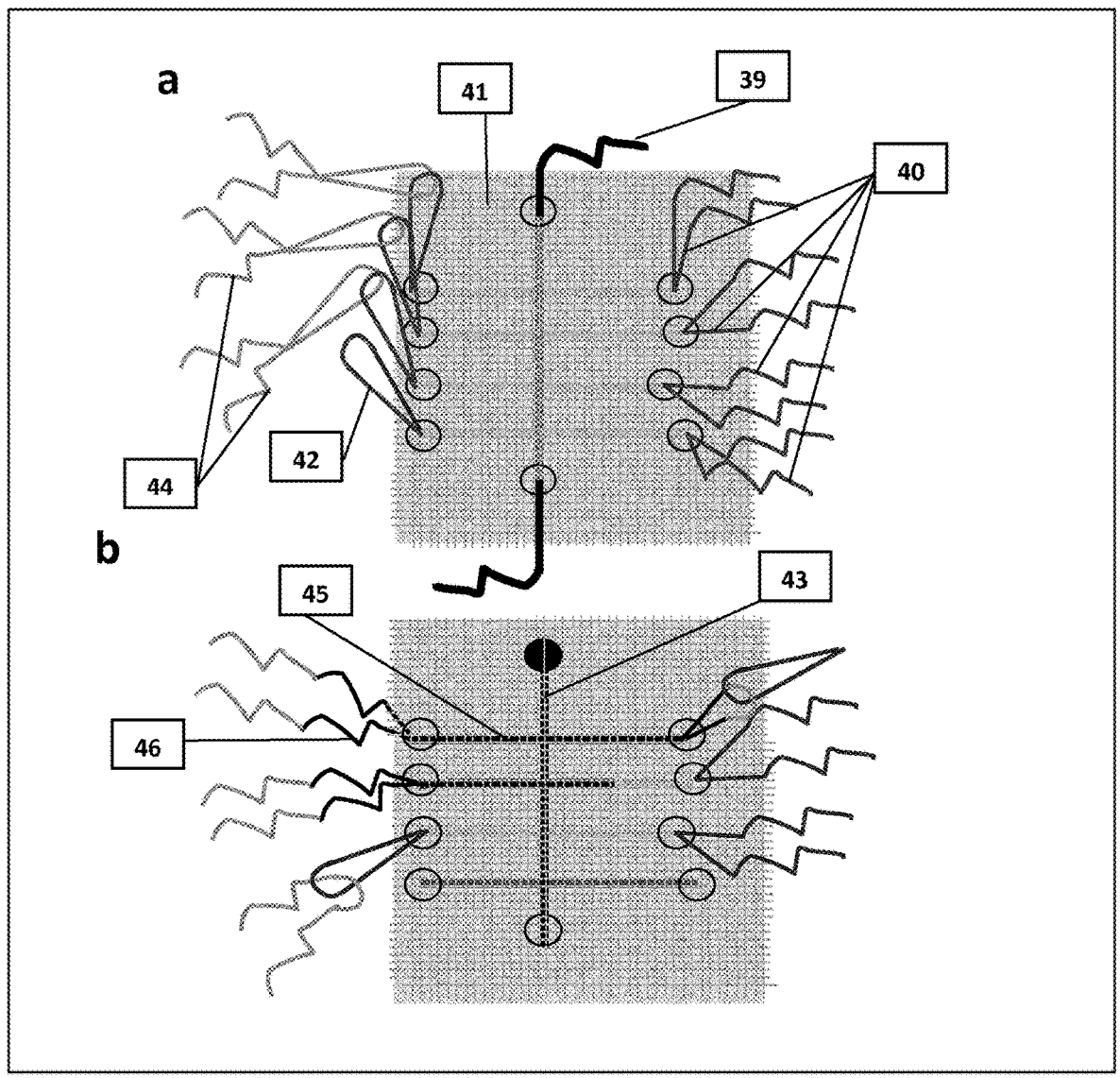
FIG. 16 shows a schematics of the fabrication of a microfluidic chip of the invention comprising a "hybrid" structure involving microchannels partly open and partly filled with a wicking material.

This example illustrates embodiments of the invention comprising partly open flow paths, comprising microchannels arrays in part fluidically open, and in part filled with a porous material, defining a wicking flow path. This also illustrates the possibility to use capillary wicking as a driving force within devices of the invention. For this example, we use a sewn chip, using a method similar to that described in example 8. This microfluidic chip contains a first movable fiber [39], here a nylon fishing line with a diameter of 200 µm, and four movable fibers [40], here nylon fishing lines with a diameter of 100 µm. Each of the latter 100 µm movable fibers [40] is sewn twice in the microfiber sheet [41], leaving a protruding loop [42] on one side of the chip, as shown in FIG. 16a.

After embedment of the microfluidic chip with a matrix precursor material, here a PDMS matrix, and hardening of the matrix, the first movable fiber [39] is removed from the microfluidic chip, and colored water is introduced in the created channel [43], for instance by following the protocol presented in example 5, or thanks to an external pumping means. Four polyester threads [44] (Gütermann, 110 yds/vgs), which have wicking properties for water and aqueous solutions, are then passed in the loops of the 4 nylon fishing lines [42]. Pulling on these nylon fishing lines allow the polyester thread to enter inside the channels [45] created by the removal of the 100 μm nylon fishing lines. These channels [45] thus play the role of guiding ducts for the polyester threads [44] (FIG. 16b).

Figure 17:
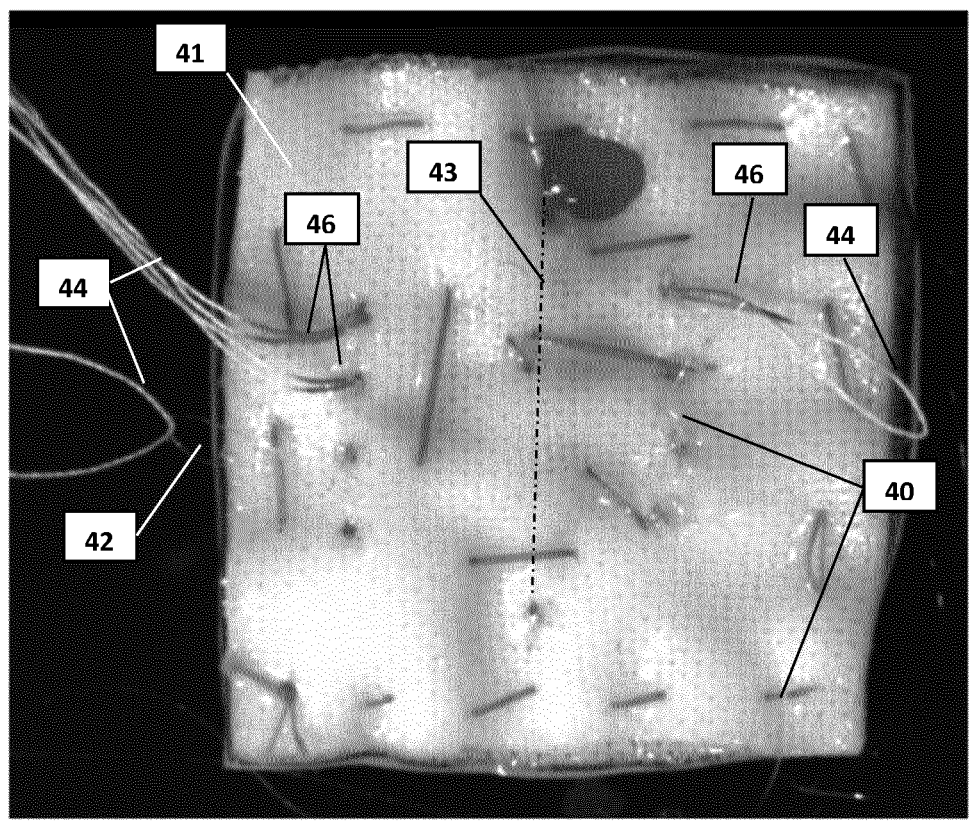
FIG. 17 shows a particular realization of an embodiment structure comprising microchannels partly open and partly filled with a wicking material, corresponding to an embodiment of FIG. 16.

FIG. 17 shows the operation of an embodiment prepared by this method. The PDMS embedded textile [41] supports the device. Colored water is introduced in channel [43], thanks to the "pumping" effect previously explained in example 5. When the liquid contacts the polyester threads, [44], it is wicked by capillary effect, and is transported by wicking along said threads [44], until it can be seen as a darker zone on the threads protruding from the chip, at location [46] on FIG. 17.

The invention claimed is:

1. A fluidic device, said fluidic device comprising:
   a/ a solid matrix (5, 36),
   b/ a textile component (4, 41) embedded in said matrix, and
   c/ at least one channel (6, 10, 37, 38, 43, 45) embedded in said solid matrix, said at least one channel having a multiplicity of underpasses and overpasses with at least some fibers of said textile component (4, 41), and said at least one channel (6, 10, 37, 38, 43, 45) being a tube or a pipe along at least part of its length,
   wherein said at least one channel includes at least one port (3) or connector,
   said at least one port or connector being selected among:
   i/ a piece of material with a lumen embedded at one of its sides in the solid matrix with its lumen fluidically connected with the at least one channel;
   ii/ a septum in connection with the at least one channel; and
   iii/ a connector providing connection of fluidic tubings or fluid transport between at least one port, and a reservoir, or a pump, or a valve.

2. The fluidic device according to claim 1, wherein said at least one channel (6, 10, 37, 38, 43, 45) is non-linear.

3. The fluidic device according to claim 1, comprising at least an actionable fiber (13, 17) or a movable fiber (2, 30, 39, 40).

4. The fluidic device according to claim 3, wherein said movable fiber (2, 30, 39, 40) has at least one part (42) protruding from said at least one channel (6, 10, 37, 43, 45) in which it is at least partly enclosed, outside of said solid matrix (5, 36).

5. The fluidic device according to claim 3, additionally comprising means for actuation of said fiber (44).

6. The fluidic device according to claim 1, wherein said at least one channel (6, 10, 37, 38, 43, 45) is in contact either with an actionable fiber (13, 17) or with a movable fiber (2, 30, 39, 40), or wherein said at least one channel is amenable to deformation.

7. The fluidic device according to claim 1, wherein the fluidic resistance of said at least one channel (6, 10, 37, 38, 43, 45) can be modified by the actuation of a movable fiber (2, 30, 39, 40), or by a deformation of said solid matrix, or by a deformation of said textile (4).

8. The fluidic device according to claim 1, comprising at least one integrated valve, or at least one integrated pump.

9. The fluidic device according to claim 1, comprising an integrated window (24, 25), in regard of at least a part of said at least one channel (6).

10. The fluidic device according to claim 1, wherein the solid matrix (5, 36), or the textile (4) or both have a zone of lesser resistance to deformation (12).

11. An instrument comprising the fluidic device according to claim 1, wherein said instrument is an analytical instrument arranged to analyze any or any combination of biological, physical or chemical agents, said agents being any of atoms, ions, molecules, macromolecules, molecular assemblies, living organisms, chemical or biological compounds, species or molecules or molecular assemblies or organelles issued from living organisms, microparticles, or nanoparticles of a liquid flowing in the at least one channel.

12. A method of analyzing any of a biological, a physical or a chemical agent using the instrument according to claim 11.

13. The fluidic device according to claim 2, comprising at least an actionable fiber (13, 17) or a movable fiber (2, 30, 39, 40).

14. The fluidic device according to claim 4, additionally comprising means for actuation of said fiber (44).

15. The method according to claim 12, wherein the at least one channel contains a biphasic system.

16. The method according to claim 12, wherein water-based droplets are carried by an oil fully wetting the walls of the at least one channel.

17. The fluidic device according to claim 1, wherein said at least one channel includes the at least one port comprised of the piece of material with the lumen embedded at one of its sides in the solid matrix with the lumen fluidically connected with the at least one channel.

18. The fluidic device according to claim 1, wherein said at least one channel includes the at least one port comprised of the septum in connection with the at least one channel.

19. The fluidic device according to claim 1, wherein said at least one channel includes the connector providing the connection of fluidic tubings or fluid transport between the at least one port, and the reservoir, or the pump, or the valve.

* * * * *